(12) United States Patent
Moore et al.

(10) Patent No.: US 11,945,964 B2
(45) Date of Patent: Apr. 2, 2024

(54) COATING COMPOSITIONS FOR APPLICATION UTILIZING A HIGH TRANSFER EFFICIENCY APPLICATOR AND METHODS AND SYSTEMS THEREOF

(71) Applicant: AXALTA COATING SYSTEMS GMBH, Basel (CH)

(72) Inventors: John R. Moore, Lansdale, PA (US); Michael R. Koerner, Media, PA (US); Christian Jackson, Wilmington, DE (US); Bradley A. Jacobs, Wilmington, NC (US); Shih-Wa Wang, Glen Mills, PA (US); Matthew Irwin, Philadelphia, PA (US); Matthew Boland, Beverly Hills, MI (US); Joanne Hardy, Hockessin, DE (US); Daniel Naugle, Macomb, MI (US); Kevin O'Connor, LaSalle (CA); Barry Snyder, Miami Beach, FL (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 775 days.

(21) Appl. No.: 16/768,318

(22) PCT Filed: Nov. 30, 2018

(86) PCT No.: PCT/US2018/063472
§ 371 (c)(1),
(2) Date: May 29, 2020

(87) PCT Pub. No.: WO2019/109037
PCT Pub. Date: Jun. 6, 2019

(65) Prior Publication Data
US 2021/0170435 A1 Jun. 10, 2021

Related U.S. Application Data

(60) Provisional application No. 62/752,340, filed on Oct. 30, 2018, provisional application No. 62/593,026, (Continued)

(51) Int. Cl.
*B05B 12/14* (2006.01)
*B05B 1/02* (2006.01)
(Continued)

(52) U.S. Cl.
CPC .............. *C09D 175/04* (2013.01); *B05B 1/02* (2013.01); *B05B 12/1472* (2013.01); *B05C 5/02* (2013.01);
(Continued)

(58) Field of Classification Search
USPC .................. 118/313–315, 321, 323; 347/47
See application file for complete search history.

(56) References Cited

U.S. PATENT DOCUMENTS

| | | |
|---|---|---|
| 3,739,742 A | 6/1973 | Racz et al. |
| 3,843,593 A | 10/1974 | Shell et al. |

(Continued)

FOREIGN PATENT DOCUMENTS

| | | |
|---|---|---|
| AU | 2667795 A | 1/1996 |
| AU | 1999015728 A1 | 12/1998 |

(Continued)

OTHER PUBLICATIONS

English Translation CN-1638877A (Year: 2005).*
(Continued)

*Primary Examiner* — Yewebdar T Tadesse
(74) *Attorney, Agent, or Firm* — Lorenz & Kopf, LLP

(57) ABSTRACT

A system for applying a first coating composition and a second coating composition is provided herein. The system
(Continued)

includes an atomizing applicator and a high transfer efficiency applicator defining a nozzle orifice. The system further includes a substrate assembly comprising a metal-containing substrate and a plastic-containing substrate. The metal-containing substrate is coupled to the plastic-containing substrate. The atomizing applicator is configured to apply the first coating composition to the metal-containing substrate. The high transfer efficiency applicator is configured to expel the second coating composition through the second nozzle orifice to the plastic-containing substrate.

17 Claims, 14 Drawing Sheets

Related U.S. Application Data filed on Nov. 30, 2017, provisional application No. 62/593,022, filed on Nov. 30, 2017.

(51) Int. Cl.
| | |
|---|---|
| B05C 5/02 | (2006.01) |
| B05C 11/10 | (2006.01) |
| B05D 1/02 | (2006.01) |
| B05D 1/26 | (2006.01) |
| B05D 5/06 | (2006.01) |
| B05D 7/00 | (2006.01) |
| B41J 2/14 | (2006.01) |
| B41M 7/00 | (2006.01) |
| C08G 18/42 | (2006.01) |
| C08G 18/44 | (2006.01) |
| C08G 18/75 | (2006.01) |
| C09D 5/08 | (2006.01) |
| C09D 5/33 | (2006.01) |
| C09D 7/20 | (2018.01) |
| C09D 7/41 | (2018.01) |
| C09D 7/43 | (2018.01) |
| C09D 7/61 | (2018.01) |
| C09D 11/102 | (2014.01) |
| C09D 11/104 | (2014.01) |
| C09D 11/322 | (2014.01) |
| C09D 11/324 | (2014.01) |
| C09D 11/328 | (2014.01) |
| C09D 167/00 | (2006.01) |
| C09D 167/02 | (2006.01) |
| C09D 175/04 | (2006.01) |
| C09D 175/06 | (2006.01) |
| B41M 5/00 | (2006.01) |
| C08K 3/04 | (2006.01) |
| C08K 3/34 | (2006.01) |
| C08K 5/3465 | (2006.01) |

(52) U.S. Cl.
CPC .......... *B05C 5/027* (2013.01); *B05C 11/1034* (2013.01); *B05D 1/02* (2013.01); *B05D 1/26* (2013.01); *B05D 5/063* (2013.01); *B05D 7/53* (2013.01); *B41J 2/14* (2013.01); *B41M 7/0036* (2013.01); *C08G 18/4216* (2013.01); *C08G 18/44* (2013.01); *C08G 18/755* (2013.01); *C09D 5/004* (2013.01); *C09D 5/084* (2013.01); *C09D 7/20* (2018.01); *C09D 7/41* (2018.01); *C09D 7/43* (2018.01); *C09D 7/61* (2018.01); *C09D 11/102* (2013.01); *C09D 11/104* (2013.01); *C09D 11/322* (2013.01); *C09D 11/324* (2013.01); *C09D 11/328* (2013.01); *C09D 167/00* (2013.01); *C09D 167/02* (2013.01); *C09D 175/06* (2013.01); *B41M 5/0023* (2013.01); *C08K 3/04* (2013.01); *C08K 3/346* (2013.01); *C08K 5/3465* (2013.01); *C08K 2201/019* (2013.01)

(56) References Cited

U.S. PATENT DOCUMENTS

| | | | |
|---|---|---|---|
| 4,512,518 A * | 4/1985 | Inukai | B05B 3/1014 239/223 |
| 4,785,760 A | 11/1988 | Tholome | |
| 5,453,451 A | 9/1995 | Sokol | |
| 5,578,345 A | 11/1996 | Moy | |
| 5,863,613 A * | 1/1999 | Emch | B05B 5/001 118/302 |
| 5,935,657 A | 8/1999 | Melendez | |
| 6,376,016 B1 | 4/2002 | Farquhar et al. | |
| 6,720,384 B1 | 4/2004 | Mayer et al. | |
| 7,368,487 B2 | 5/2008 | Wu et al. | |
| 9,187,364 B2 | 11/2015 | Joos et al. | |
| 9,339,839 B2 | 5/2016 | Fliess et al. | |
| 9,499,718 B2 | 11/2016 | Enkisch-Krug et al. | |
| 9,636,703 B2 | 5/2017 | Iwata et al. | |
| 9,744,560 B2 | 8/2017 | Fritz et al. | |
| 10,610,889 B2 | 4/2020 | Itoh et al. | |
| 11,649,374 B2 * | 5/2023 | Moore | C09D 7/43 118/313 |
| 2003/0131791 A1 | 7/2003 | Schultz et al. | |
| 2003/0161961 A1 | 8/2003 | Barsotti et al. | |
| 2004/0028822 A1 | 2/2004 | Dutt | |
| 2004/0239150 A1 | 12/2004 | Fukudome et al. | |
| 2006/0063862 A1 | 3/2006 | Luer et al. | |
| 2006/0234036 A1 | 10/2006 | December et al. | |
| 2007/0082211 A1 | 4/2007 | Hazan et al. | |
| 2008/0081124 A1 | 4/2008 | Sano et al. | |
| 2008/0134941 A1 | 6/2008 | Sanada | |
| 2009/0162555 A1 | 6/2009 | Halfyard et al. | |
| 2009/0304930 A1 | 12/2009 | Chaimberg | |
| 2010/0063203 A1 | 3/2010 | Sato et al. | |
| 2010/0151142 A1 | 6/2010 | Cornell et al. | |
| 2010/0152316 A1 | 6/2010 | Cornell et al. | |
| 2010/0304009 A1 | 12/2010 | Bausen et al. | |
| 2011/0032304 A1 | 2/2011 | Mozel et al. | |
| 2011/0045253 A1 | 2/2011 | Nielsen et al. | |
| 2011/0100546 A1 | 5/2011 | Jang et al. | |
| 2011/0172611 A1 | 7/2011 | Yoo et al. | |
| 2011/0187798 A1 | 8/2011 | Rogers et al. | |
| 2011/0262622 A1 | 10/2011 | Herre et al. | |
| 2011/0274891 A1 | 11/2011 | De Rossi et al. | |
| 2011/0281019 A1 | 11/2011 | Gong et al. | |
| 2011/0305843 A1 | 12/2011 | Flosbach et al. | |
| 2012/0249679 A1 | 10/2012 | Beier et al. | |
| 2013/0084403 A1 | 4/2013 | Tessari et al. | |
| 2014/0227534 A1 | 8/2014 | Iwata et al. | |
| 2014/0295091 A1 | 10/2014 | Stoffel et al. | |
| 2015/0093512 A1 | 4/2015 | Brunner et al. | |
| 2015/0122409 A1 | 5/2015 | Roper | |
| 2015/0315414 A1 | 11/2015 | Flosbach et al. | |
| 2016/0032141 A1 | 2/2016 | Maghsoodi et al. | |
| 2016/0074882 A1 | 3/2016 | Bstgens | |
| 2016/0208111 A1 | 7/2016 | Hurley | |
| 2017/0106647 A1 | 4/2017 | Inoue | |
| 2017/0158908 A1 | 6/2017 | Doss | |
| 2017/0239685 A1 | 8/2017 | Kawabe et al. | |
| 2017/0252765 A1 | 9/2017 | Medard et al. | |
| 2018/0015730 A1 * | 1/2018 | Essien | B41J 2/17596 |
| 2018/0141084 A1 | 5/2018 | Bauer et al. | |
| 2018/0346740 A1 | 12/2018 | Andersen et al. | |
| 2020/0010721 A1 | 1/2020 | Corten et al. | |
| 2020/0291261 A1 | 9/2020 | Moore et al. | |
| 2020/0360963 A1 | 11/2020 | Moore et al. | |
| 2021/0032494 A1 | 2/2021 | Moore et al. | |
| 2021/0170435 A1 | 6/2021 | Moore et al. | |
| 2021/0170440 A1 | 6/2021 | Moore et al. | |
| 2021/0170444 A1 | 6/2021 | Moore et al. | |

(56) References Cited

U.S. PATENT DOCUMENTS

| | | | |
|---|---|---|---|
| 2021/0170776 | A1 | 6/2021 | Moore et al. |
| 2021/0187542 | A1 | 6/2021 | Moore et al. |

FOREIGN PATENT DOCUMENTS

| | | |
|---|---|---|
| AU | 2007324072 A1 | 5/2008 |
| CA | 2041522 A1 | 11/1991 |
| CA | 2101236 A1 | 1/1994 |
| CA | 2185453 A1 | 8/1996 |
| CA | 2493290 A1 | 3/2004 |
| CA | 2620917 A1 | 4/2007 |
| CA | 2572900 A1 | 7/2007 |
| CA | 2825008 A1 | 7/2012 |
| CA | 2982027 A1 | 11/2016 |
| CA | 2983892 A1 | 11/2016 |
| CN | 1281390 A | 1/2001 |
| CN | 1354697 A | 6/2002 |
| CN | 1379857 A | 11/2002 |
| CN | 1413239 A | 4/2003 |
| CN | 1511898 A | 7/2004 |
| CN | 1638877 A | 7/2005 |
| CN | 1668386 A | 9/2005 |
| CN | 1692147 A | 11/2005 |
| CN | 1759150 A | 4/2006 |
| CN | 1802409 A | 7/2006 |
| CN | 1840240 A | 10/2006 |
| CN | 101022891 A | 8/2007 |
| CN | 101128267 A | 2/2008 |
| CN | 101160180 A | 4/2008 |
| CN | 101175576 A | 5/2008 |
| CN | 101248145 A | 8/2008 |
| CN | 101273103 A | 9/2008 |
| CN | 101353546 A | 1/2009 |
| CN | 101372537 A | 2/2009 |
| CN | 101384375 A | 3/2009 |
| CN | 101490182 A | 7/2009 |
| CN | 101790695 A | 7/2010 |
| CN | 101835850 A | 9/2010 |
| CN | 101880498 A | 11/2010 |
| CN | 102471614 A | 5/2012 |
| CN | 101248145 B | 7/2012 |
| CN | 101490182 B | 7/2012 |
| CN | 102574154 A | 7/2012 |
| CN | 102574406 A | 7/2012 |
| CN | 102649882 A | 8/2012 |
| CN | 102686681 A | 9/2012 |
| CN | 102959019 A | 3/2013 |
| CN | 102971080 A | 3/2013 |
| CN | 103317846 A | 9/2013 |
| CN | 103354828 A | 10/2013 |
| CN | 103547458 A | 1/2014 |
| CN | 103717683 A | 4/2014 |
| CN | 103732631 A | 4/2014 |
| CN | 103842095 A | 6/2014 |
| CN | 103857475 A | 6/2014 |
| CN | 104057681 A | 9/2014 |
| CN | 104114597 A | 10/2014 |
| CN | 104136137 A | 11/2014 |
| CN | 104250498 A | 12/2014 |
| CN | 102686681 B | 1/2015 |
| CN | 104812501 A | 7/2015 |
| CN | 104822725 A | 8/2015 |
| CN | 104861903 A | 8/2015 |
| CN | 105008463 A | 10/2015 |
| CN | 105086560 A | 11/2015 |
| CN | 105377450 A | 3/2016 |
| CN | 105473668 A | 4/2016 |
| CN | 105531118 A | 4/2016 |
| CN | 103317846 B | 5/2016 |
| CN | 104114597 B | 6/2016 |
| CN | 105934280 A | 9/2016 |
| CN | 102649882 B | 10/2016 |
| CN | 106414632 A | 2/2017 |
| CN | 106634283 A | 5/2017 |
| CN | 106661174 A | 5/2017 |
| CN | 106661346 A | 5/2017 |
| CN | 106714975 A | 5/2017 |
| CN | 106794625 A | 5/2017 |
| CN | 103842095 B | 8/2017 |
| CN | 107073494 A | 8/2017 |
| CN | 107075304 A | 8/2017 |
| CN | 107109113 A | 8/2017 |
| CN | 107115989 A | 9/2017 |
| CN | 107207900 A | 9/2017 |
| CN | 106883746 B | 12/2019 |
| DE | 3239864 A1 | 5/1984 |
| DE | 3737455 A1 | 5/1988 |
| DE | 10234794 A1 | 4/2004 |
| DE | 102005030488 A1 | 1/2007 |
| DE | 102004044655 B4 | 6/2009 |
| DE | 102008053178 A1 | 5/2010 |
| DE | 102009021608 A1 | 12/2010 |
| DE | 102010047808 A1 | 5/2011 |
| DE | 102010019612 A1 | 11/2011 |
| DE | 102012006371 A1 | 7/2012 |
| DE | 102014006991 A1 | 12/2014 |
| DE | 102009021608 B4 | 10/2015 |
| DE | 102014013158 A1 | 3/2016 |
| DE | 102015007763 A1 | 12/2016 |
| EP | 0335801 A2 | 10/1989 |
| EP | 0335801 A3 | 12/1989 |
| EP | 335801 B1 | 5/1993 |
| EP | 0335801 B1 | 5/1993 |
| EP | 581211 A1 | 2/1994 |
| EP | 1619029 A1 | 1/2006 |
| EP | 1810754 A1 | 7/2007 |
| EP | 2073064 A1 | 6/2009 |
| EP | 2094398 A2 | 9/2009 |
| EP | 2208541 A2 | 7/2010 |
| EP | 2641661 A1 | 9/2013 |
| EP | 2208541 A3 | 10/2013 |
| EP | 2641661 B1 | 5/2016 |
| EP | 3178636 A1 | 6/2017 |
| EP | 3178636 A4 | 4/2018 |
| EP | 3320980 A1 | 5/2018 |
| EP | 3335801 A1 | 6/2018 |
| FR | 3010918 A1 | 3/2015 |
| FR | 3010920 A1 | 3/2015 |
| GB | 2553300 A | 3/2018 |
| GB | 2553302 A | 3/2018 |
| JP | 853116776 A | 10/1978 |
| JP | 5732851 U | 2/1982 |
| JP | 63116776 A | 5/1988 |
| JP | H03211057 A | 9/1991 |
| JP | 06121944 A | 5/1994 |
| JP | 08225758 A | 9/1996 |
| JP | 0967531 A | 3/1997 |
| JP | 09262977 A | 10/1997 |
| JP | H09262977 A | 10/1997 |
| JP | 1199360 A | 4/1999 |
| JP | 11106680 A | 4/1999 |
| JP | 2002170484 A | 6/2002 |
| JP | 2003103216 A | 4/2003 |
| JP | 2003063126 A | 9/2004 |
| JP | 2005279485 A | 10/2005 |
| JP | 2005307353 A | 11/2005 |
| JP | 2006007164 A | 1/2006 |
| JP | 2007070448 A | 3/2007 |
| JP | 2007216220 A | 8/2007 |
| JP | 2008137187 A | 6/2008 |
| JP | 2008311231 A | 12/2008 |
| JP | 2010214305 A | 9/2010 |
| JP | 2011213809 A | 10/2011 |
| JP | 2013052348 A | 3/2013 |
| JP | 2014193533 A | 10/2014 |
| JP | 2015187248 A | 10/2015 |
| JP | 2016175077 A | 10/2016 |
| KR | 100238050 B1 | 1/2000 |
| KR | 20030003104 A | 1/2003 |
| KR | 102006013395 A | 5/2004 |
| KR | 1020120046166 A | 5/2012 |
| KR | 20130106785 A | 9/2013 |
| KR | 1020130106785 A | 9/2013 |
| KR | 1020130121383 A | 11/2013 |

(56) References Cited

FOREIGN PATENT DOCUMENTS

| | | |
|---|---|---|
| KR | 20150123867 A | 11/2015 |
| KR | 1020150123867 A | 11/2015 |
| KR | 20160018910 A | 2/2016 |
| KR | 1020160018910 A | 2/2016 |
| KR | 20170060683 A | 6/2017 |
| WO | 9930832 A1 | 6/1999 |
| WO | 9946057 A1 | 9/1999 |
| WO | 02061163 A2 | 8/2002 |
| WO | 2004087336 A2 | 10/2004 |
| WO | 2006100273 A1 | 9/2006 |
| WO | 2007034676 A1 | 3/2007 |
| WO | 2008053966 A1 | 5/2008 |
| WO | 2011085225 A1 | 7/2011 |
| WO | 2012039380 A1 | 3/2012 |
| WO | 2012098580 A1 | 7/2012 |
| WO | 2012105704 A1 | 8/2012 |
| WO | 2013047209 A1 | 4/2013 |
| WO | 2013067452 A1 | 5/2013 |
| WO | 2014064432 A1 | 5/2014 |
| WO | 2013047209 A1 | 3/2015 |
| WO | 2015036267 A1 | 3/2015 |
| WO | 2015090801 A1 | 6/2015 |
| WO | 2016204636 A1 | 12/2016 |
| WO | 2017022698 A1 | 2/2017 |
| WO | 2017070070 A1 | 4/2017 |
| WO | 2017097638 A1 | 6/2017 |
| WO | 2017097640 A1 | 6/2017 |
| WO | 2017103797 A1 | 6/2017 |
| WO | 2017116547 A1 | 7/2017 |
| WO | 2007034674 A1 | 3/2018 |
| WO | 2018102846 A1 | 6/2018 |
| WO | 2018141511 A1 | 8/2018 |

OTHER PUBLICATIONS

Talbert, R, 'Paint Technology Handbook', 2008, pp. 143, CRC Press, Taylor and Francis Group, Boca Raton, Florida, U.

Wikipedia.com. Inkjet Printer. 2014, S. 1-13. URL: https://de.wikipedia.org/wiki/Tintenstrahldrucker Archiviert in https://archive.org/web/ am Aug. 7, 2014 [abgerufen am Nov. 25, 2021].

Honghzhi, H. "Research on Key Technologies of High Quality Automobile Coating Process and Equipment" Doctoral Dissertation, Chapter III Study on Atomization Mechanism of Paint, Tianjin University.

Greiciunas, E., et al., "Design and Operation of a Rayleigh Ohnesorge Jetting Extensional Rheometer (ROJER) to Study Extensional Properties of Low Viscosity Polymersolutions", In: Journal of Rheology, vol. 61, 2017, No. 3, S. 467-476.—ISSN 0148-6055.

Hoath, Stephen, D.: Fundamentals of Inkjet Printing—The Science of Inkjet and Droplets; S. 6-10, 15, 16, 29, 125, 126, 128, 152, 159, 192, 342, 377, 378, 399; Weinheim: Wiley-VCH, 2016—ISBN: 978-3-527-33785-9.

Andersson, B. "Droplet Breakup in Automotive Spray Painting", Thesis for the degree of Licentiate of Engineering in Thermo and Fluid Dynamics, Department of Computational Engineering and Design, Dec. 31, 2011.

Shen, X-F, "influence of Ink Characteristics and Residual Fluctuation on Droplet Formation", Jul. 31, 2012, Packaging Engineering, vol. 33, No. 13, pp. 123-127. (English Abstract Included).

ASTM International, Annual Book of ASTM Standards, Designation: D2196-15, "Standard Test Methods For Rheological Properties of Non-Newtonian Materials By Rotational Viscometer", Section 6, vol. 06.01., pp. 240-243.

Keshavarz, Bavand et al.,Studying the Effects of Elongational Properties on Atomization of Weakly Viscoelastic Solutions using Rayleigh Ohnesorge Jetting Extensional Rheometry (ROJER). In: Journal of non-Newtonian fluid mechanics, vol. 222, 2015, S. 171-189.—ISSN 033-0257.

Honghzhi Han, Research on High-Quality Automotive Coating Process and Equipment Key Technologies, Chapter Three: Research on the Mechanism of Coating Atomization, May 15, 2021.

Derby, Inkjet Printing of Functional and Structural Materials: Fluid property Requirements, Feature Stability, and Resolution, Annu. Rev. Mater. Res., Mar. 9, 2010 vol. 40, 09, p. 395-414, Manchester, United Kingdom.

Foresti et al, Acoustophoretic Printing, Science Advances, Material Science, Nov. 5, 2018, American Association for the Advancement of Science, New York, New York.

McKinley et al., Wolfgang Von Ohnesorge, Physics of Fluids, Dec. 2011, vol. 23, No. 12, p. 127101, American Institute of Physics, Woodbury, New York.

Nasr et al., Chapter 2—Background on Sprays and Their Production, Industrial Sprays and Atomization: Design, Analysis And Applications, Jan. 2002, pp. 7-33, Springer, London.

Journal of Mechanical Engineering; Title: Study on the Characteristics of Mist Cone in Ultrasonic Atomizing Spraying Process of Photoresist Saving; Author: Xiang Dong; Qu Degang; Mu Peng; Wang Han; Liu Nan; Date: Apr. 5, 2013.

Coating Industry; Title: Key points of formulation design of high solid polyurethane aeronautical coatings; Author: Ou Wen; Zou Xinyang; Zhou Rudong; Wang Lijun; Zhu Yajun; Lu Wenming; Li Wenkai; Date: Aug. 1, 2015; Issue: No. 8.

Magdasse, S.: The Chemistry of Inkjet Inks; World Scientific Publishing Co. Pte. Ltd., 2010; Kapitel 9.: Formulating UV Curable Inkjet Inks, S. 167—ISBN: 13 978-981-281-821-8.

Fujifilm Dimatix, Inc.: Dimatix Material Printer DMP-2831, Apr. 2013—Firmenschrift.

Kckinley et al., Wolfgang Von Ohnesorge, Physics of Fluids, Dec. 2011, vol. 23, No. 12, p. 127101, American Institute of Physics, Woodbury, New York.

Andersson, Droplet Breakup in Automotive Spray Painting, Department of Applied Mechanics, Division of Fluid Dynamics, Jan. 2011, Chalmers University of Technology, Gothenburg, Sweden.

E. Greiciunas et al., Design and operation of a Rayleigh Ohnesorge Jetting Extensional Rheometer (ROJER) to study extensional properties of low viscosity polymer solutions, Journal of Rheology, (2017).

* cited by examiner

COATING COMPOSITIONS FOR APPLICATION UTILIZING A HIGH TRANSFER EFFICIENCY APPLICATOR AND METHODS AND SYSTEMS THEREOF

CROSS-REFERENCE TO RELATED APPLICATION

This application claims the benefit of U.S. Provisional Application No. 62/593,022, filed Nov. 30, 2017, U.S. Provisional Application No. 62/593,026, filed Nov. 30, 2017, and U.S. Provisional Application No. 62/752,340, filed Oct. 30, 2018, which are all hereby incorporated in their entirety by reference.

TECHNICAL FIELD

The technical field generally relates to coating compositions for application to a substrate, and more particularly, to coating compositions for application to substrates utilizing high transfer efficiency applicators.

BACKGROUND

Ink jet printing is a non-impact printing process in which droplets of ink are deposited on a substrate, typically paper or textile fabrics, in response to an electronic signal. This application process has the advantage of allowing digital printing of the substrate which can be tailored to individual requirements.

The drops can be jetted onto the substrate by a variety of inkjet application methods including continuous and drop-on-demand printing. In drop-on-demand printing the energy to eject a drop of ink can be from a thermal resistor, a piezoelectric crystal, acoustic or a solenoid valve.

In the automotive industry, the vehicle body is typically covered with a series of finishes including an electrocoat, a primer, a colored basecoat providing the color and a clear topcoat to provide addition protection and a glossy finish.

Currently most automobile bodies are painted in a single color with the basecoat being applied in a single spray operation. The coating is applied with pneumatic spray or rotary equipment producing a broad jet of paint droplets with a wide droplet size distribution. This has the advantage of producing a uniform high-quality coating in a relatively short time by an automated process.

However, this process has a number of disadvantages. If the vehicle body is to be painted with multiple colors, for example a second color is used for a pattern such as a stripe, or a whole section of the vehicle body such as the roof is painted a different color, this requires masking the first coating and then passing the vehicle body through the paint spray process a second time to add the second color. After this second paint operation the masking must be removed. This is both time-consuming and labor-intensive adding significant cost to the operation.

A second disadvantage of the current spraying technology is that the drops of paint are sprayed in a wide jet of droplets which has a wide range of droplet sizes. As a result many of the droplets do not land on the vehicle, either because they are sprayed near the edges and so overspray the substrate, or because the smaller droplets have too low a momentum to reach the vehicle body. This excess overspray must be removed from the spray operation and disposed of safely leading to significant waste and also additional cost.

Accordingly, it is desirable to provide coating compositions suitable for application to a substrate utilizing a high transfer efficiency applicator. Furthermore, other desirable features and characteristics will become apparent from the subsequent detailed description and the appended claims, taken in conjunction with this background.

BRIEF SUMMARY

A system for applying a first coating composition and a second coating composition is provided herein. The system includes an atomizing applicator and a high transfer efficiency applicator defining a nozzle orifice. The system further includes a substrate assembly comprising a metal-containing substrate and a plastic-containing substrate. The metal-containing substrate is coupled to the plastic-containing substrate. The atomizing applicator is configured to apply the first coating composition to the metal-containing substrate. The high transfer efficiency applicator is configured to expel the second coating composition through the second nozzle orifice to the plastic-containing substrate.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

The following detailed description is merely exemplary in nature and is not intended to limit coating compositions as described herein. Furthermore, there is no intention to be bound by any theory presented in the preceding background or the following detailed description.

Applying coatings using a printhead, similar to an inkjet printhead, may provide a solution for applying two colors to a vehicle and for minimizing overspray by generating drops of a uniform size that can be directed to a specific point on the substrate, in this case a specific location the vehicle body, thus minimizing, or completely eliminating oversprayed droplets. In addition, digital printing can be used to print patterns or two tones on the vehicle body, either as a second color digitally printed on the top of a previously sprayed basecoat of a different color, or directly onto the primed or clearcoated vehicle substrate.

However, conventional inkjet inks have typically been formulated to print on porous substrates such as paper and textiles where the ink is rapidly absorbed into the substrate thus facilitating drying and handling of the substrate shortly after printing. In addition, although the printed articles have sufficient durability for these applications, such as printed text and pictures, or patterned fabrics, the durability requirements of an automotive coating are far greater in terms of both physical durability, such as resistance to abrasion and chipping, and long-term durability to weathering and light resistance. Furthermore, ink jet inks known in the art are formulated to have a low and generally shear-rate independent, or Newtonian, viscosity, typically below 20 cps. This is because of the limited amount of energy available in each nozzle of a printhead to eject a drop and also to avoid thickening of the ink in the channels of the printhead potentially leading to clogging.

In some embodiments, by contrast an automotive coating typically has a significant non-Newtonian shear behavior with extremely high viscosity at low-shear to help avoid pigment settling and to ensure rapid and even set-up of the coating immediately after application, but relatively low viscosity at high shear rates to facilitate spraying and atomization of the spray into droplets.

A greater understanding of the coating composition described above and of the systems and method for applying the coating composition to the substrate utilizing the high transfer efficiency applicator may be obtained through a review of the illustrations accompanying this application together with a review of the detailed description that follows.

Figure 1:
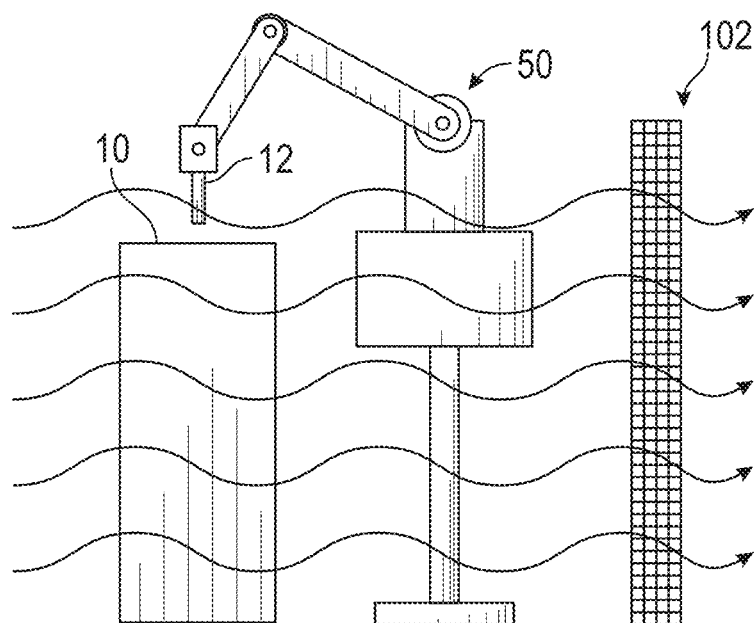
FIG. 1 is a perspective view illustrating a non-limiting embodiment of a system for applying the coating composition to the substrate utilizing the high transfer efficiency applicator.

With reference to FIG. 1, a coating composition suitable for application to a substrate 10 utilizing a high transfer efficiency applicator 12 is provided herein. The coating composition exhibits properties rendering the coating composition suitable for application utilizing the high transfer efficiency applicator 12 including, but not limited to, viscosity ($\eta_0$), density ($\rho$), surface tension ($\sigma$), and relaxation time ($\lambda$). Further, the coating composition as applied to the substrate 10 utilizing the high transfer efficiency applicator 12 forms a coating layer having precise boundaries, improved hiding, and reduced drying time. In certain embodiments, the coating composition exhibits non-Newtonian fluid behavior which is in contrast to conventional ink.

Identifying suitable properties of the coating composition for use in the high transfer efficiency applicator 12 may be dependent on properties of the high transfer efficiency applicator 12. Properties of the high transfer efficiency applicator 12 may include, but are not limited to, nozzle diameter (D) of the high transfer efficiency applicator 12, impact velocity (v) of the coating composition by the high transfer efficiency applicator 12, speed of the high transfer efficiency applicator 12, distance of the high transfer efficiency applicator 12 from the substrate 10, droplet size of the coating composition by the high transfer efficiency applicator 12, firing rate of the high transfer efficiency applicator 12, and orientation of the high transfer efficiency applicator 12 relative to the force of gravity.

In view of the various properties of the coating composition and the high transfer efficiency applicator 12, one or more relationships may be established between these properties for forming the coating composition having properties suitable for application utilizing the high transfer efficiency applicator 12. In various embodiments, various equations may be applied to one or more of these properties of the coating composition and the high transfer efficiency applicator 12 to determine boundaries for these properties rendering the coating composition suitable for application utilizing the high transfer efficiency applicator 12. In certain embodiments, the boundaries for the properties of the coating composition may be determined by establishing an Ohnesorge number (Oh) for the coating composition, a Reynolds number (Re) for the coating composition, a Deborah number (De) for the coating composition, or combinations thereof.

In certain embodiments, the Ohnesorge number (Oh) is a dimensionless constant that generally relates to the tendency for a drop of the coating composition, upon contact with the substrate, to either remain as a single drop or separate into many droplets (i.e., satellite droplets), by considering viscous and surface tension forces of the coating composition. The Ohnesorge number (Oh) may be determined in accordance with equation I, as follows:

$$Oh = (\eta/\sqrt{\rho \sigma D}) \qquad (I),$$

wherein $\eta$ represents viscosity of the coating composition in pascal-seconds (Pa*s), $\rho$ represents density of the coating composition in kilograms per cubic meter (kg/m$^3$), $\sigma$ represents surface tension of the coating composition in newtons per meter (N/m), and D represents nozzle diameter of the high transfer efficiency applicator in meters (m). The Ohnesorge number (Oh) may be in a range of from about 0.01 to about 50, alternatively from about 0.05 to about 10, or alternatively from about 0.1 to about 2.70. The Ohnesorge number (Oh) may be at least 0.01, alternatively at least 0.05, or alternatively at least 0.1. The Ohnesorge number (Oh) may be no greater than 50, alternatively no greater than 10, or alternatively no greater than 2.70.

In various embodiments, the Reynolds number (Re) is a dimensionless constant that generally relates to the flow pattern of the coating composition and, in certain embodiments, relates to flow patterns extending between laminar flow and turbulent flow by considering viscous and inertial forces of the coating composition. The Reynolds number (Re) may be determined in accordance with equation II, as follows:

$$Re = (\rho v D / \eta) \quad \text{(II)},$$

wherein $\rho$ represents density of the coating composition in $kg/m^3$, v represents impact velocity of the high transfer efficiency applicator in meters per second (m/s), D represents nozzle diameter of the high transfer efficiency applicator 12 in m, and represents viscosity of the coating composition in Pa*s. The Reynolds number (Re) may be in a range of from about 0.01 to about 1,000, alternatively from about 0.05 to about 500, or alternatively from about 0.34 to about 258.83. The Reynolds number (Re) may be at least 0.01, alternatively at least 0.05, or alternatively at least 0.34. The Reynolds number (Re) may be no greater than 1,000, alternatively no greater than 500, or alternatively no greater than 258.83.

In other embodiments, the Deborah number (De) is a dimensionless constant that generally relates to the elasticity of the coating composition and, in certain embodiments, relates to structure of a visco-elastic material by considering relaxation time of the coating composition. The Deborah number (De) may be determined in accordance with equation III, as follows:

$$De = \lambda \sqrt{\rho D^3 / \sigma} \quad \text{(III)},$$

wherein $\lambda$ represents relaxation time of the coating composition in seconds (s), $\rho$ represents density of the coating composition in $kg/m^3$, D represents nozzle diameter of the high transfer efficiency applicator 12 in m, and $\sigma$ represents surface tension of the coating composition in N/m. The Deborah number (De) may be in a range of from about 0.01 to about 2,000, alternatively from about 0.1 to about 1,000, or alternatively from about 0.93 to about 778.77. The Deborah number (De) may be at least 0.01, alternatively at least 0.1, or alternatively at least 0.93. The Deborah number (De) may be no greater than 2,000, alternatively no greater than 1,000, or alternatively no greater than 778.77.

In other embodiments, the Weber number (We) is a dimensionless constant that generally relates to fluid flows where there is an interface between two different. The Weber number (We) may be determined in accordance with equation IV, as follows:

$$We = (D v^2 \rho) / \sigma \quad \text{(IV)},$$

wherein D represents nozzle diameter of the high transfer efficiency applicator 12 in m, v represents impact velocity of the high transfer efficiency applicator in meters per second (m/s), $\rho$ represents density of the coating composition in $kg/m^3$, and $\sigma$ represents surface tension of the coating composition in N/m. The Deborah number (De) may be in a range of from greater than 0 to about 16,600, alternatively from about 0.2 to about 1,600, or alternatively from about 0.2 to about 10. The Deborah number (We) may be at least 0.01, alternatively at least 0.1, or alternatively at least 0.2. The Deborah number (De) may be no greater than 16,600, alternatively no greater than 1,600, or alternatively no greater than 10.

In certain embodiments, a coating composition for application to a substrate utilizing a high transfer efficiency applicator is provided herein. The coating composition includes a carrier and a binder. The coating composition may have an Ohnesorge number (Oh) of from about 0.01 to about 12.6, alternatively from about 0.05 to about 1.8, or alternatively about 0.38. The coating composition may have a Reynolds number (Re) of from about 0.02 to about 6,200, alternatively from about 0.3 to about 660, or alternatively about 5.21. The coating composition may have a Deborah number (De) of from greater than 0 to about 1730, alternatively from greater than 0 to about 46, or alternatively about 1.02. The coating composition may have a Weber number (We) of from greater than 0 to about 16,600, alternatively from about 0.2 to about 1,600, or alternatively about 3.86.

In view of one or more of the equations described above, the coating composition may have a viscosity ($\eta$) in an amount of from about 0.001 to about 1, alternatively from about 0.005 to about 0.1, or alternatively from about 0.01 to about 0.06, pascal-seconds (Pa·s). The coating composition may have a viscosity ($\eta$) in an amount of at least 0.001, alternatively at least 0.005, or alternatively at least 0.01, Pa·s. The coating composition may have a viscosity ($\eta$) in an amount of no greater than 1, alternatively no greater than 0.1, or alternatively no greater than 0.06, Pa·s. The viscosity ($\eta$) may be determined in accordance with ASTM D2196-15. The viscosity ($\eta$) is determined at a high shear viscosity of 10,000 reciprocal seconds (1/sec). Printing a non-Newtonian fluid is generally represented at the high shear viscosity of 10,000 1/sec.

Further, in view of one or more of the equations described above, the coating composition may have a density ($\rho$) in an amount of from about 700 to about 1500, alternatively from about 800 to about 1400, or alternatively from about 1030 to about 1200, kilograms per cubic meter ($kg/m^3$). The coating composition may have a density ($\rho$) in an amount of at least 700, alternatively at least 800, or alternatively at least 1030, $kg/m^3$. The coating composition may have a density ($\rho$) in an amount of no greater than 1500, alternatively no greater than 1400, or alternatively no greater than 1200, $kg/m^3$. The density ($\rho$) may be determined in accordance with ASTM D1475.

Also, in view of one or more of the equations described above, the coating composition may have a surface tension ($\sigma$) in an amount of from about 0.001 to about 1, alternatively from about 0.01 to about 0.1, or alternatively from about 0.024 to about 0.05, newtons per meter (N/m). The coating composition may have a surface tension ($\sigma$) in an amount of at least 0.001, alternatively at least 0.01, or alternatively at least 0.015, N/m. The coating composition may have a surface tension ($\sigma$) in an amount of no greater than 1, alternatively no greater than 0.1, or alternatively no greater than 0.05, N/m. The surface tension ($\sigma$) may be determined in accordance with ASTM D1331-14.

Moreover, in view of one or more of the equations described above, the coating composition may have a relaxation time ($\lambda$) in an amount of from about 0.00001 to about 1, alternatively from about 0.0001 to about 0.1, or alternatively from about 0.0005 to about 0.01, seconds (s). The coating composition may have a relaxation time ($\lambda$) in an amount of at least 0.00001, alternatively at least 0.0001, or alternatively at least 0.01, s. The coating composition may have a relaxation time (λ) in an amount of no greater than 1, alternatively no greater than 0.1, or alternatively no greater than 0.01, s. The relaxation time (λ) may be determined by a stress relaxation test performed in a strain controlled rheometer. The viscoelastic fluid is held between parallel plates, and an instantaneous strain is applied to one side of the sample. The other side is held constant while stress (proportional to torque) is being monitored. The resulting stress decay is measured as a function of time yielding stress relaxation modulus (stress divided by applied strain). For many fluids, stress relaxation modulus decays in an exponential fashion with relaxation time as the decay constant.

In certain embodiments, a coating composition for application to a substrate 10 utilizing a high transfer efficiency applicator 12 is provided herein. The coating composition includes a carrier and a binder. The coating composition may have a viscosity (η) of from about 0.002 Pa*s to about 0.2 Pa*s, the coating composition may have a density (ρ) of from about 838 kg/m³ to about 1557 kg/m³, the coating composition may have a surface tension (σ) of from about 0.015 N/m to about 0.05 N/m, and the coating composition may have a relaxation time (λ) of from about 0.0005 s to about 0.02 s.

In various embodiments, the coating composition may have a viscosity (η) of from about 0.005 Pa*s to about 0.05 Pa*s, the coating composition may have a density (ρ) of from about 838 kg/m³ to about 1557 kg/m³, the coating composition may have a surface tension (σ) of from about 0.015 N/m to about 0.05 N/m, and the coating composition may have a relaxation time (λ) of from about 0.0005 s to about 0.02 s.

In various embodiments, boundaries are determined for at least one of the following parameters: viscosity (η) of the coating composition, the surface tension (σ) of the coating composition, the density (ρ) of the coating composition, the relaxation time (λ) of the coating composition, the nozzle diameter (D) of the high transfer efficiency applicator 12, and the impact velocity (v) of the high transfer efficiency applicator 12 by analyzing the Ohnesorge number (Oh), the Reynolds number (Re), and the Deborah number (De). In certain embodiments, the coating compositing having one or more of these properties within the determined boundaries results in the coating composition being suitable for application to the substrate 10 utilizing the high transfer efficiency applicator 12.

Figure 2:
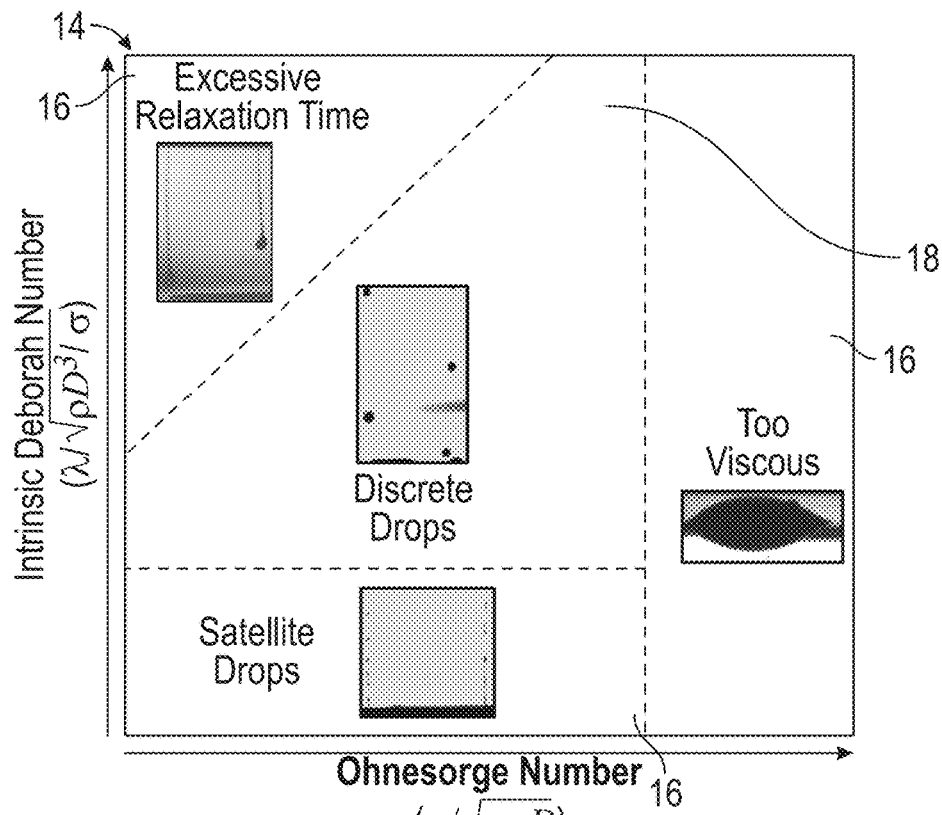
FIG. 2 is a chart illustrating a non-limiting embodiment of a general relationship between the Ohnesorge number (Oh) and the Deborah number (De) for the coating composition.

With reference to FIG. 2, the Ohnesorge number (Oh) and the intrinsic Deborah number (De) may be utilized to determine boundaries for at least one of the following: viscosity (η) of the coating composition, the surface tension (σ) of the coating composition, the density (ρ) of the coating composition, the nozzle diameter (D) of the high transfer efficiency applicator 12, and the relaxation time of the polymer (λ). A first chart 14 of FIG. 2 shows a general relationship between the Ohnesorge number (Oh) and the Deborah number (De). The first chart 14 includes an unsuitable zone 16 relating to properties of the coating composition that may render the coating composition undesirable for application to the substrate 10 utilizing the high transfer efficiency applicator 12. These undesirable properties may include, but are not limited to, an excessively long relaxation time, formation of satellite droplets from the coating composition, and a too high shear viscosity. Further, the first chart 14 includes a suitable zone 18, adjacent to the undesirable zones 14 relating to properties of the coating composition that may render the coating composition suitable for application to the substrate 10 utilizing the high transfer efficiency applicator 12. In this embodiment, the suitable zone 18 for the Ohnesorge number (Oh) extends along the y-axis of the first chart 14 in a range of from about 0.10 to about 2.70 and the suitable zone 18 for the Deborah number (De) extends along the x-axis of the first chart 14 in a range of from about 0.93 to about 778.8. The Ohnesorge number (Oh) and the Deborah number (De) corresponding to the suitable zone 18 can be applied to equations I and III, respectively, for determining the suitable properties for the coating composition. It is to be appreciated that the ranges for the Ohnesorge number (Oh) and the Deborah number (De) corresponding to the suitable zone 18 may be narrowed by defining one or more of the viscosity (η) of the coating composition, the surface tension (σ) of the coating composition, the density (ρ) of the coating composition, the nozzle diameter (D) of the high transfer efficiency applicator 12, or the relaxation time (λ) of the coating composition.

Figure 3:
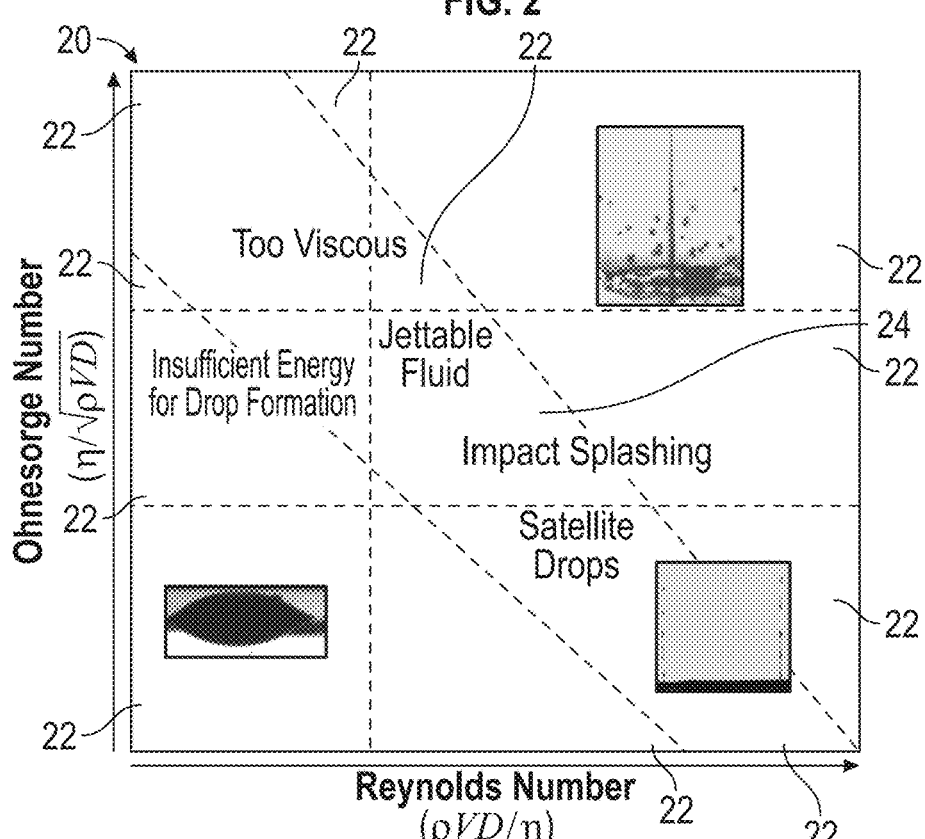
FIG. 3 is a chart illustrating a non-limiting embodiment of a general relationship between the Reynolds Number (Re) and the Ohnesorge number (Oh) for the coating composition.

With reference to FIG. 3, the Ohnesorge number (Oh) and the Reynolds number (Re) may be utilized to determine boundaries for at least one of the following: the density (ρ) of the coating composition, the nozzle diameter (D) of the high transfer efficiency applicator 12, the impact velocity (v) of the high transfer efficiency applicator 12, the surface tension (σ) of the coating composition, and the viscosity (η) of the coating composition. A second chart 20 of FIG. 3 shows a general relationship between the Reynolds number (Re) and the Ohnesorge number (Oh). The second chart 20 includes an unsuitable zone 22 relating to properties of the coating composition that may render the coating composition undesirable for application to the substrate 10 utilizing the high transfer efficiency applicator 12. These undesirable properties may include, but are not limited to, a too viscous coating composition, insufficient energy by the high transfer efficiency applicator 12, formation of satellite droplets from the coating composition, and splashing of the coating composition. Further, the second chart 20 includes a suitable zone 24, adjacent to the undesirable zones 22 relating to properties of the coating composition that may render the coating composition suitable for application to the substrate 10 utilizing the high transfer efficiency applicator 12. In this embodiment, the suitable zone 24 for the Reynolds number (Re) extends along the x-axis of the second chart 20 in a range of from about 0.34 to about 258.8 and the suitable zone 24 for the Ohnesorge number (Oh) extends along the y-axis of the second chart 20 in a range of from about 0.10 to about 2.7. The Reynolds number (Re) and the Ohnesorge number (Oh) corresponding to the suitable zone 24 can be applied to equations II and I, respectively, for determining the suitable properties for the coating composition. It is to be appreciated that the ranges for the Reynolds number (Re) and the Ohnesorge number (Oh) corresponding to the suitable zone 24 may be narrowed by defining one or more of the impact velocity of the print head (v), the density (ρ) of the coating composition, the nozzle diameter (D) of the high transfer efficiency applicator 12, the surface tension (σ) of the coating composition, and the viscosity (f) of the coating composition.

Figure 4A:
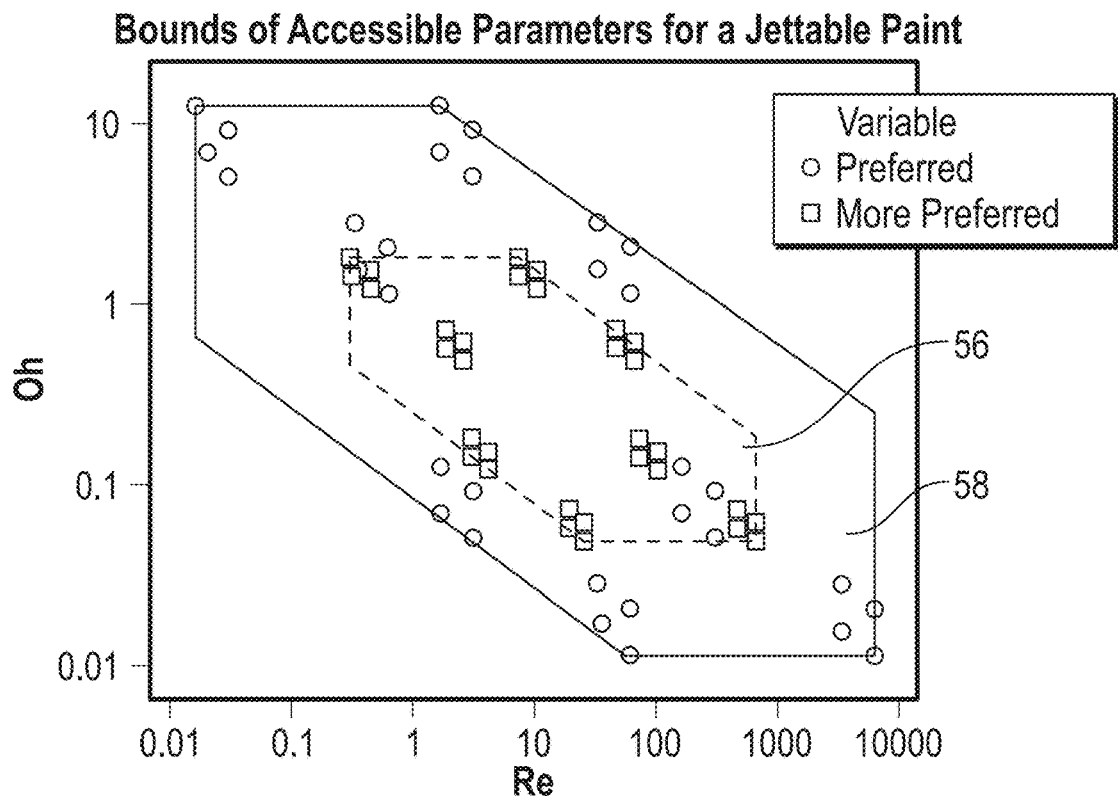
FIGS. 4A and 4B are chart illustrating a non-limiting embodiment of a general relationship between the Reynolds Number (Re) and the Ohnesorge number (Oh) for the coating composition.

With reference to FIG. 4A, the Ohnesorge number (Oh) and the Reynolds number (Re) may be utilized to determine boundaries for at least one of the following: the density (ρ) of the coating composition, the nozzle diameter (D) of the high transfer efficiency applicator 12, the impact velocity (v) of the high transfer efficiency applicator 12, the surface tension (σ) of the coating composition, and the viscosity (η) of the coating composition. The plot of FIG. 4A shows a general relationship between the Reynolds number (Re) and the Ohnesorge number (Oh). The plot of FIG. 4A includes an unsuitable zone 52 relating to properties of the coating composition that may render the coating composition undesirable for application to the substrate 10 utilizing the high transfer efficiency applicator 12. These undesirable properties may include, but are not limited to, a too viscous coating composition, insufficient energy by the high transfer efficiency applicator 12, formation of satellite droplets from the coating composition, and splashing of the coating composition. Further, the plot of FIG. 4A includes a suitable zone 54, adjacent to the undesirable zones 52 relating to properties of the coating composition that may render the coating composition suitable for application to the substrate 10 utilizing the high transfer efficiency applicator 12.

In certain embodiments, with continued reference to FIG. 4A, the Ohnesorge number (Oh) is from 0.01 to 12.6 and is defined based upon the following equations V and VI, in view of the Reynolds number (Re), $$Oh \text{ is no greater than } 10^{\wedge}(-0.5006 * \log(Re) + 1.2135) \quad (V), \text{ and}$$

$$Oh \text{ is at least } 0^{\wedge}(-0.5435 * \log(Re) - 1.0324) \quad (VI),$$

wherein the Reynolds number (Re) is from 0.02 to 6,200. Equations V and VI can be utilized to define boundary 56 in the plot of FIG. 4A between the undesirable zones 22 and the suitable zone 24.

In other embodiments, with continued reference to FIG. 4A, the Ohnesorge number (Oh) is from 0.05 to 1.8 and is defined based upon the following equations VII and VIII, in view of the Reynolds number (Re), $$Oh \text{ is no greater than } 10^{\wedge}(-0.5067 * \log(Re) + 0.706) \quad (VII), \text{ and}$$

$$Oh \text{ is at least } 10^{\wedge}(-0.5724 * \log(Re) - 0.4876) \quad (VIII),$$

wherein the Reynolds number (Re) is from 0.3 to 660. Equations VII and VIII can be utilized to further define boundary 58 in the plot of FIG. 4A within the suitable zone 24.

Figure 4B:
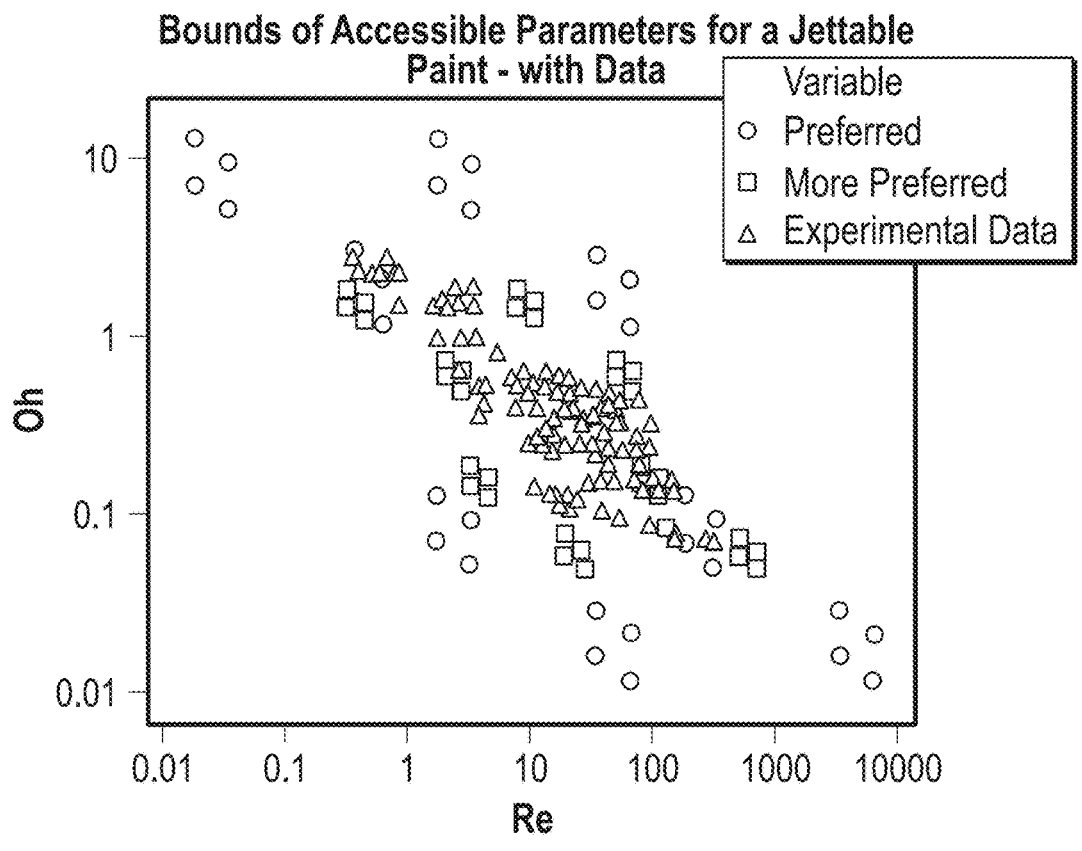

With reference to FIG. 4B, the Ohnesorge number (Oh) and the Reynolds number (Re) of various exemplary coating compositions are plotted along with the boundaries 56 and 58 of FIG. 4A thereby further showing the relevance of the boundaries 56 and 58.

In certain embodiments, a coating composition that is suitable for application utilizing the high transfer efficiency application 12 exhibits minimal to no splashing at contact with the substrate 10. The coating composition exhibiting minimal to no splashing via application by the high transfer efficiency application 12 satisfies the following equation IX, $$0 < v * D < 0.0021 \text{ m}^2/\text{s} \quad (IX),$$

wherein v represents impact velocity as defined above and D represents the nozzle diameter as defined above.

Figure 5A:
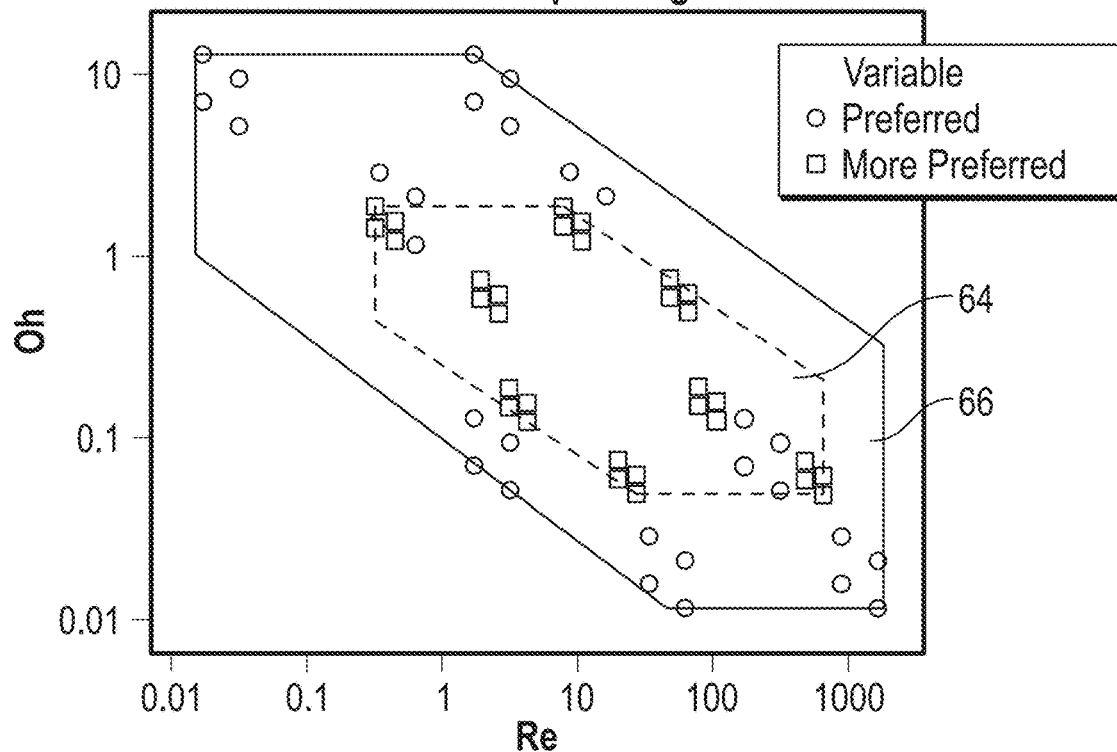
FIGS. 5A and 5B are chart illustrating a non-limiting embodiment of a general relationship between the Reynolds Number (Re) and the Ohnesorge number (Oh) for the coating composition.

With reference to FIG. 5A, the Ohnesorge number (Oh) and the Reynolds number (Re), in view of equation (IX), may be utilized to determine boundaries for at least one of the following: the density ($\rho$) of the coating composition, the nozzle diameter (D) of the high transfer efficiency applicator 12, the impact velocity (v) of the high transfer efficiency applicator 12, the surface tension ($\sigma$) of the coating composition, and the viscosity ($\eta$) of the coating composition. The plot of FIG. 5A shows a general relationship between the Reynolds number (Re) and the Ohnesorge number (Oh). The plot of FIG. 5A includes an unsuitable zone 60 relating to properties of the coating composition that may render the coating composition undesirable for application to the substrate 10 utilizing the high transfer efficiency applicator 12. These undesirable properties may include, but are not limited to, a too viscous coating composition, insufficient energy by the high transfer efficiency applicator 12, formation of satellite droplets from the coating composition, and splashing of the coating composition. Further, the plot of FIG. 5A includes a suitable zone 62, adjacent to the undesirable zones 60 relating to properties of the coating composition that may render the coating composition suitable for application to the substrate 10 utilizing the high transfer efficiency applicator 12.

In certain embodiments, with continued reference to FIG. 5A, the Ohnesorge number (Oh) is from 0.01 to 12.6 and is defined based upon the equations V and VI above, in view of the Reynolds number (Re), wherein the Reynolds number (Re) is from 0.02 to 1,600. equations V and VI can be utilized to define boundary 64 in the plot of FIG. 5A between the undesirable zones 22 and the suitable zone 24.

In other embodiments, with continued reference to FIG. 5A, the Ohnesorge number (Oh) is from 0.05 to 1.8 and is defined based upon the equations VII and VIII above, in view of the Reynolds number (Re), wherein the Reynolds number (Re) is from 0.3 to 660. Equations VII and VIII can be utilized to further define boundary 66 in the plot of FIG. 5A within the suitable zone 24.

Figure 5B:
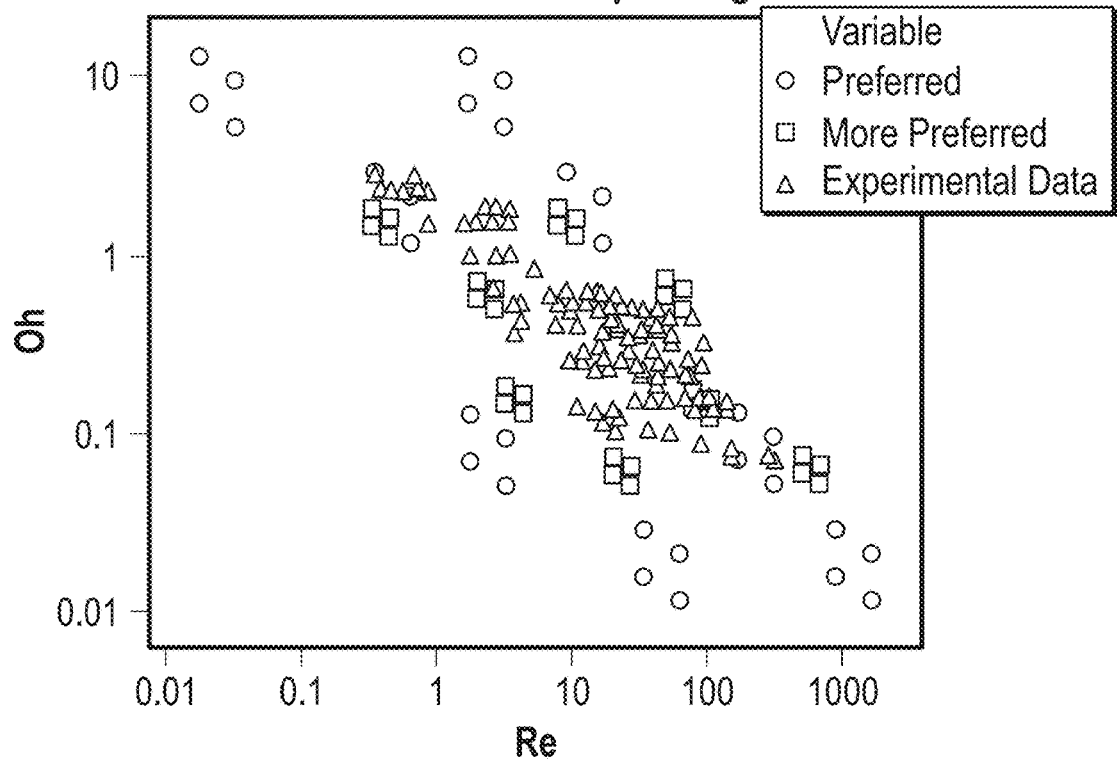

With reference to FIG. 5B, the Ohnesorge number (Oh) and the Reynolds number (Re) of various exemplary coating compositions are plotted along with the boundaries 64 and 64 of FIG. 5A thereby further showing the relevance of the boundaries 64 and 66.

A method of forming a coating composition for application to the substrate 10 utilizing the high efficiency transfer applicator 12 is provided herein. The method includes the step of identifying at least one of an Ohnesorge number (Oh) for the coating composition, a Reynolds number (Re) for the coating composition, or a Deborah number (De) for the coating composition. The method further includes the step of obtaining at least one of a viscosity ($\eta$) of the coating composition, a surface tension ($\sigma$) of the coating composition, a density ($\rho$) of the coating composition, a relaxation time ($\lambda$) of the coating composition, a nozzle diameter (D) of the high efficiency transfer applicator 12, or an impact velocity (v) of the high efficiency transfer applicator 12.

At least one of the viscosity ($\eta$), the surface tension ($\sigma$), the density ($\rho$), or the nozzle diameter (D) is determined based upon the following equation I in view of the Ohnesorge number (Oh), $$Oh = (\eta / \sqrt{\rho \sigma D}) \quad (I).$$

At least one of the impact velocity (v), the density ($\rho$), the nozzle diameter D), or the viscosity ($\eta$)) is determined based upon the following equation II in view of the Reynolds number (Re).

$$Re = (\rho v D / \eta) \quad (II).$$

At least one of the relaxation time ($\lambda$), the density ($\rho$), the nozzle diameter (D), or the surface tension ($\sigma$) is determined based upon the following equation III in view of the Deborah number (De).

$$De = \lambda \sqrt{\rho D^3 / \sigma} \quad \text{(III).}$$

The method further includes the step of forming the coating composition having at least one of the viscosity (η), the surface tension (σ), or the density (ρ). The coating composition is configured to be applied to the substrate 10 utilizing the high efficiency transfer applicator 12 having at least one of the nozzle diameter (D) or the impact velocity (v).

In embodiments, the step of obtaining the viscosity (η) of the coating composition further includes the step of performing a viscosity analysis on the coating composition according to ASTM 7867-13 with cone-and-plate or parallel plates wherein, when the viscosity is from 2 to 200 mPa-s, the viscosity is measured at a 1000 sec-1 shear rate. In embodiments, the step of obtaining the surface tension (σ) of the coating composition further includes the step of performing a surface tension analysis on the coating composition according to ASTM 1331-14. In embodiments, the step of obtaining the density (ρ) of the coating composition further includes the step of performing a density analysis on the coating composition according to ASTM D1475-13. In embodiments, the step of obtaining the relaxation time (λ) of the coating composition further includes the step of performing a relaxation time analysis on the coating composition according to the methods described in Keshavarz B. et al. (2015) Journal of Non-Newtonian Fluid Mechanics, 222, 171-189 and Greiciunas E. et al. (2017) Journal of Rheology, 61, 467. In embodiments, the step of obtaining the nozzle diameter (D) of the high efficiency transfer applicator further includes the step of measuring a diameter of a nozzle orifice of the high efficiency transfer applicator. In embodiments, the step of obtaining the impact velocity (v) of the droplet expelled from the high efficiency transfer applicator further comprises the step of performing an impact velocity (v) analysis on the droplet of the coating composition as the droplet is expelled from the high efficiency transfer applicator when the droplet is within 2 millimeters distance from the substrate.

Another method of forming the coating composition for application to the substrate 10 utilizing the high transfer efficiency applicator 12 is also provided herein. The method includes identifying a drop contact value that relates to the tendency for a drop of the coating composition, upon contact with the substrate 10, to either remain as a single drop or separate into many droplets, by considering viscous and surface tension forces of the coating composition. The method further includes identifying a flow pattern value that relates to the flow pattern of the coating composition extending between laminar flow and turbulent flow by considering viscous and inertial forces of the coating composition. The method further includes identifying a fluidity value that relates to the fluidity of the coating composition extending beyond Newtonian viscous flow and non-Newtonian viscous flow by considering relaxation time of the coating composition. The coating composition is configured to be applied to the substrate 10 utilizing the high transfer efficiency applicator 12 based on one or more of the drop contact value, the flow pattern value, and fluidity value.

In embodiments, the step of identifying the drop contact value includes the step of identifying the Ohnesorge number (Oh) for the coating composition. In embodiments, the step of identifying the flow pattern value includes the step of identifying the Reynolds number (Re) for the coating composition. In embodiments, the step of identifying the fluidity value includes the step of identifying the Deborah number (De) for the coating composition.

A method for determining suitability of the coating composition for application to the substrate 10 utilizing the high transfer efficiency applicator 12 is also provided herein. The method may be useful for studying the effects of shear viscosity and extensional relaxation on droplet formation. The method includes the step of providing the coating composition. The method further includes the step of forming a droplet 26 of the coating composition. The method further includes dropping the droplet 26 from an elevated position 28 to a specimen substrate 30 spaced from the elevated position 28. The method further includes the step of the capturing, with a camera, the droplet 26 as the droplet 26 extends from the elevated position 28 toward the specimen substrate 30 to form a specimen image 32. The method further includes the step of forming a specimen coating layer 34 on the specimen substrate 30. The method further includes the step of analyzing the droplet 26 during extension on the specimen image 32 and the specimen coating layer 34 on the specimen substrate 30.

Figures 7A, 7B:
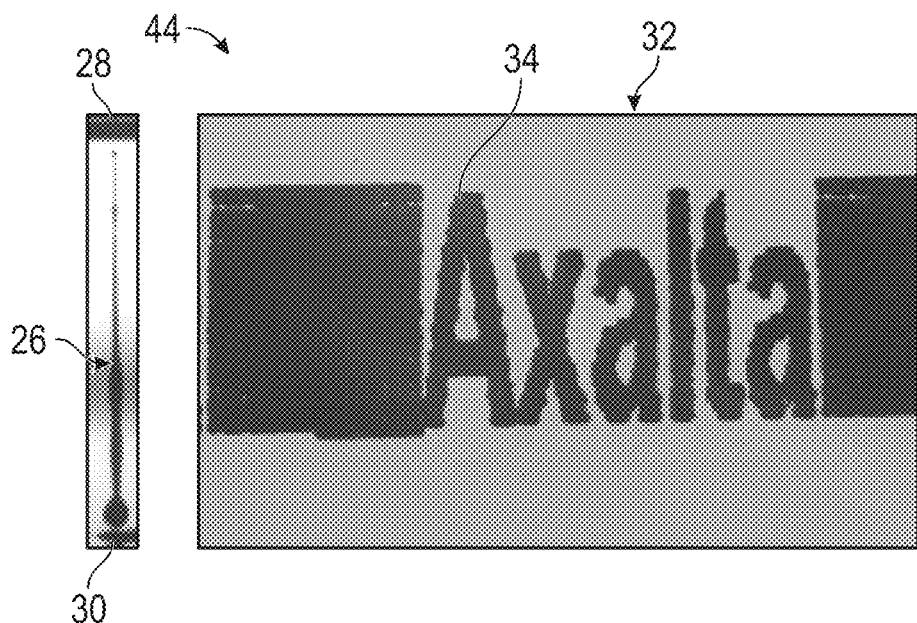
FIGS. 7A and 7B are images illustrating a non-limiting embodiment of another general effect of extensional relaxation and shear viscosity of the coating composition.
Figures 8A, 8B:
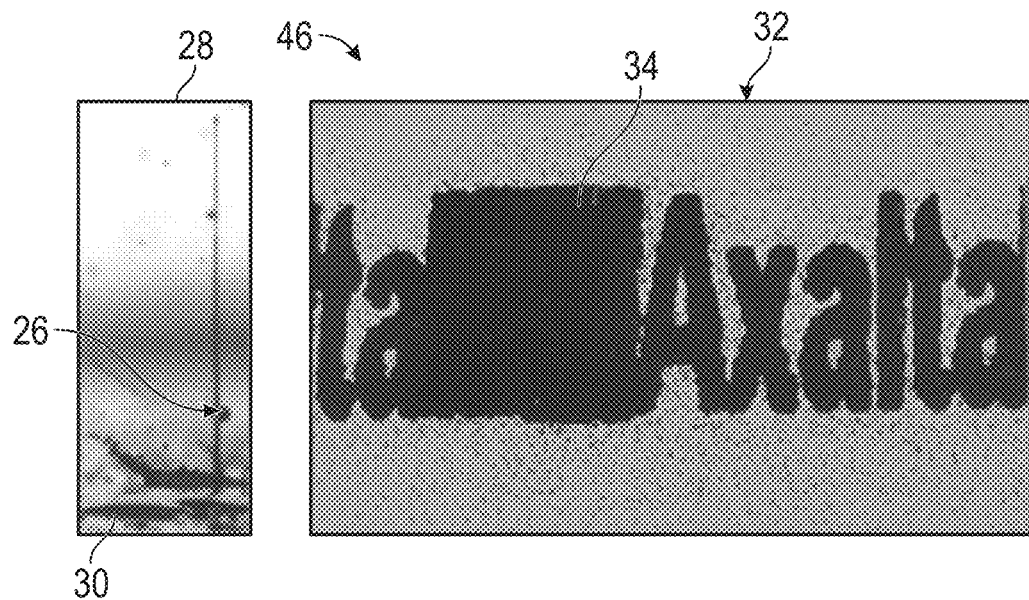
FIGS. 8A and 8B are images illustrating a non-limiting embodiment of another general effect of extensional relaxation and shear viscosity of the coating composition.
Figures 9A, 9B:
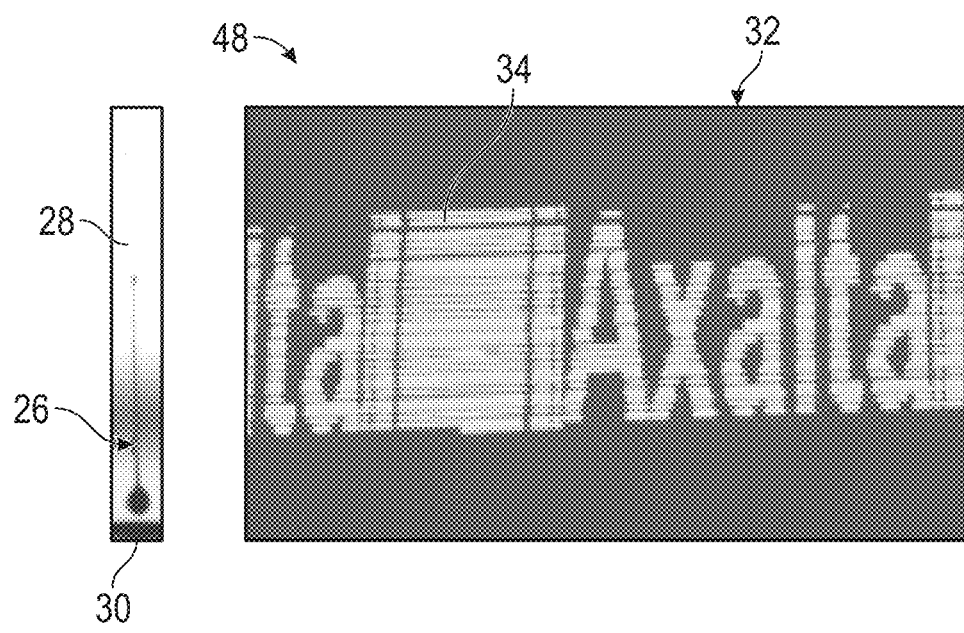
FIGS. 9A and 9B are images illustrating a non-limiting embodiment of another general effect of extensional relaxation and shear viscosity of the coating composition.

With reference to FIGS. 7A, 7B, 8A, 8B, 9A, and 9B, in embodiments, various specimen coating compositions are analyzed to study the effects of shear viscosity and extensional relaxation. With particular reference to FIGS. 7A and 7B, a first specimen coating composition 44 has a 0.16 Pa*s shear viscosity and a 0.001 s extensional relaxation time. With particular reference to FIGS. 8A and 8B, a second specimen coating composition 46 has a 0.009 Pa*s shear viscosity and a 0.001 extensional relaxation time. With particular reference to FIGS. 9A and 9B, a third specimen coating composition 48 has a 0.040 Pa*s shear viscosity and a 0.0025 s extensional relaxation time. The specimen image 32 of FIG. 7B corresponding to the first specimen coating composition 44 of FIG. 7A shows the resulting specimen coating layer 34 having moderate flow after deposition with moderate droplet placement accuracy, few stray droplets from satellites, and no splashing. The specimen image 32 of FIG. 8B corresponding to the second specimen coating composition 46 of FIG. 8A shows the resulting specimen coating layer 34 having excessive flow after deposition, and splashing on impact with the substrate 10. The specimen image 32 of FIG. 9B corresponding to the third specimen coating composition 48 of FIG. 9A shows the resulting specimen coating layer 34 having improved droplet placement accuracy, minimal flow after deposition, near zero stray droplets from satellites, and no splashing.

The coating composition may be utilized to form a coating layer on the substrate 10. The coating layer may be utilized as a basecoat, a clearcoat, a color coat, a top coat, a single-stage coat, a mid coat, a primer, a sealer, or combinations thereof. In certain embodiments, the coating composition is utilized to form a basecoat coating layer.

The term "basecoat" refers to a coating that is opaque and provides most of protection, color, hiding (also known as "opacity") and visual appearance. A basecoat typically contains color pigments, effect pigments such as metallic flakes pigments, rheology control agent, UV absorber and other coating additives. The term "basecoat coating composition" refers to a coating composition that can be used to form a basecoat. The term "basecoat layer" refers to a coating layer form from a basecoat coating composition. A basecoat layer can be formed by applying one or more layers of the same or different basecoat coating compositions. In automotive coatings, a substrate 10 is typically coated with a primer layer for protection and adhesion, then a basecoat layer over the primer layer, optionally a sealer on top of primer, for most of protection, color and most of visual appearance, and subsequently a clearcoat layer over the basecoat layer for further protection and visual appearance. Sometimes, a single coating layer, referred to as "top coat" can be used to provide the function of both the basecoat and the clearcoat. Additional coating layer can also be used. For example, a metal substrate can be treated with a phosphate material and coated with an electrocoat layer before applying the primer layer.

The term "mid coat" or "mid coat layer" refers to a colored non-opaque coating positioned between a basecoat layer and a clearcoat layer in a multi-layer coating system. To achieve some unique and attractive colors or visual effects, the automobile industry and other coating end use applications can use multi-layer coatings having three or more coating layers instead of the traditional "basecoat and clearcoat" two-layer coating system. The multi-layer system can usually comprise at least a first colored and opaque basecoat layer, a second non-opaque color coat deposited over at least a portion of the basecoat layer, and a third clearcoat layer deposited over at least a portion of the second non-opaque color coating layer. The second non-opaque color coat is typically referred to as a mid coat layer, which contains colored pigments. The mid coat is typically formulated to be non-opaque so the color of the basecoat underneath can be visible through the mid coat.

A system 50 for applying a first coating composition and a second coating composition is provided herein. The system 50 includes a first high transfer efficiency applicator including a first nozzle and the first nozzle defining a first nozzle orifice 92. The system further includes a second high transfer efficiency applicator 90 including a second nozzle and the second nozzle defining a second nozzle orifice 94. The system 50 further includes a first reservoir in fluid communication with the first high transfer efficiency applicator and configured to contain the first coating composition. The system 50 further includes a second reservoir in fluid communication with the second high transfer efficiency applicator 90 and configured to contain the second coating composition. The system 50 further includes a substrate 10 defining a target area. The first high transfer efficiency applicator is configured to receive the first coating composition from the first reservoir and configured to expel the first coating composition through the first nozzle orifice 92 to the target area of the substrate to form a first coating layer. The second high transfer efficiency applicator 90 is configured to receive the second coating composition from the second reservoir and configured to expel the second coating composition through the second nozzle orifice 94 to the first coating layer to form a second coating layer.

In certain embodiments, the first coating composition includes a basecoat coating composition and the second coating composition includes a clearcoat coating composition. In other embodiments, the first coating composition includes a binder and the second coating composition includes a crosslinker reactive with the binder, or the first coating composition includes a crosslinker and the second coating composition includes a binder reactive with the crosslinker.

Figure 14:
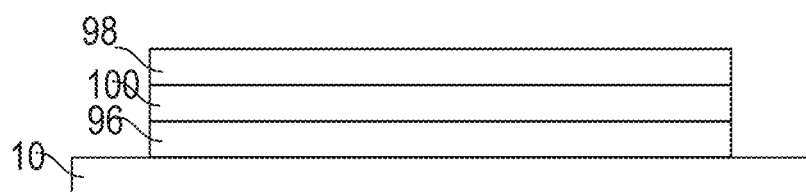
FIG. 14 is a cross-sectional perspective view illustrating a non-limiting embodiment of a multilayer coating including a coating layer formed from a coating composition.

With reference to FIG. 14, in embodiments, a primer coating layer 96 is formed from a primer coating composition and may be disposed on the substrate 10. The first coating layer 98 may be disposed on the primer coating layer 96 and the second coating layer 100 may be disposed on the first coating layer 98. The primer coating composition may be applied utilizing a conventional atomizing applicator.

The substrate 10 may include a metal-containing material, a plastic-containing material, or a combination thereof. In certain embodiments, the substrate 10 is substantially nonporous. The term "substantially" as utilized herein means that at least 95%, at least 96%, at least 97%, at least 98%, at least 99% of a surface of the coating layer is free of pores. The coating composition may be utilized to coat any type of substrate 10 known in the art. In embodiments, the substrate 10 is a vehicle, automobile, or automobile vehicle. "Vehicle" or "automobile" or "automobile vehicle" includes an automobile, such as, car, van, mini van, bus, SUV (sports utility vehicle); truck; semi truck; tractor; motorcycle; trailer; ATV (all terrain vehicle); pickup truck; heavy duty mover, such as, bulldozer, mobile crane and earth mover; airplanes; boats; ships; and other modes of transport. The coating composition may also be utilized to coat substrates in industrial applications such as buildings; fences; ceramic tiles; stationary structures; bridges; pipes; cellulosic materials (e.g., woods, paper, fiber, etc.). The coating composition may also be utilized to coat substrates in consumer products applications such as helmets; baseball bats; bicycles; and toys. It is to be appreciated that the term "substrate" as utilized herein can also refer to a coating layer disposed on an article that is also considered a substrate.

The coating layer may have a solvent resistance of at least 5 double MEK rubs, alternatively at least 20 double MEK rubs, or alternatively at least 20 double MEK rubs, on a nonporous substrate in accordance with ASTM D4752.

The coating layer may have a film tensile modulus of at least 100 MPa, alternatively at least 100 MPa, or alternatively at least 200 MPa, in accordance with ASTM 5026-15.

The coating layer formed from the coating composition including a crosslinker may have a crosslink density of at least 0.2 mmol/cm$^3$, alternatively at least 0.5 mmol/cm$^3$, or alternatively at least 1.0 mmol/cm$^3$, in accordance with ASTM D5026-15.

The coating layer may have a gloss value of at least 75, alternatively at least 88, or alternatively at least 92, at a 20 degree specular angle in accordance with ASTM 2813.

The coating layer may have a gloss retention of at least 50%, alternatively at least 70%, or alternatively at least 90%, of the initial gloss value after 2000 hours of weathering exposure in accordance with ASTM D7869.

The coating layer may have a thickness of at least 5 microns, alternatively at least 15 microns, or alternatively at least 50 microns, in accordance with ASTM D7091-13.

A system 50 for applying the coating composition to the substrate 10 utilizing the high transfer efficiency applicator 12 is also provided herein. The system 50 includes the high transfer efficiency applicator 12 which may be any high transfer efficiency applicator known in the art so long as it is suitable for printing the coating composition. The high transfer efficiency applicator 12 may be configured as continuous feed, drop-on-demand, or selectively both. The high transfer efficiency applicator 12 may apply the coating composition via valve jet, piezo-electric, thermal, acoustic, or ultrasonic membrane. The system 50 may include more than one high transfer efficiency applicator 12 with each configured to apply a different coating composition (e.g., different colors, solid or effect pigments, basecoat or clearcoat). However, it is to be appreciated that a single high transfer efficiency applicator 12 may be utilized to apply a variety of different coating compositions.

Figure 10A:
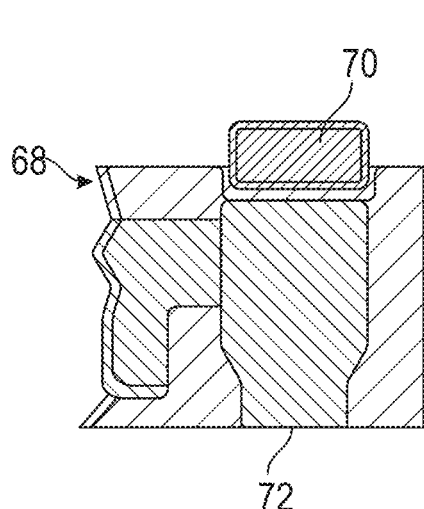
FIGS. 10A, 10B, 10C, and 10D are cross-sectional perspective views illustrating a non-limiting embodiment of a high transfer efficiency applicator.
Figure 10B:
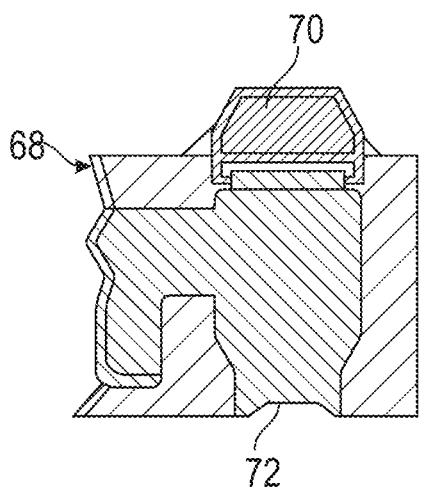
Figure 10C:
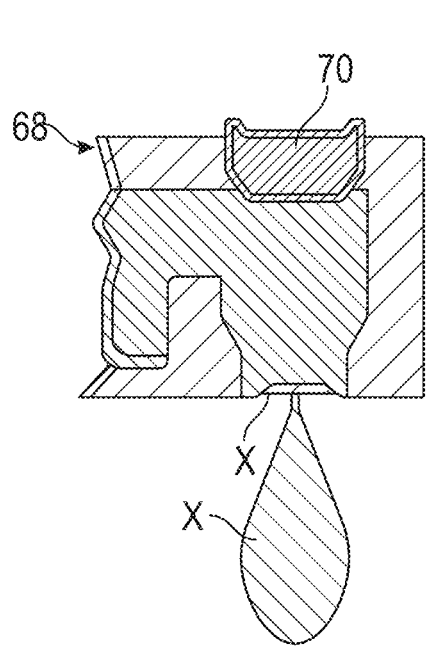
Figure 10D:
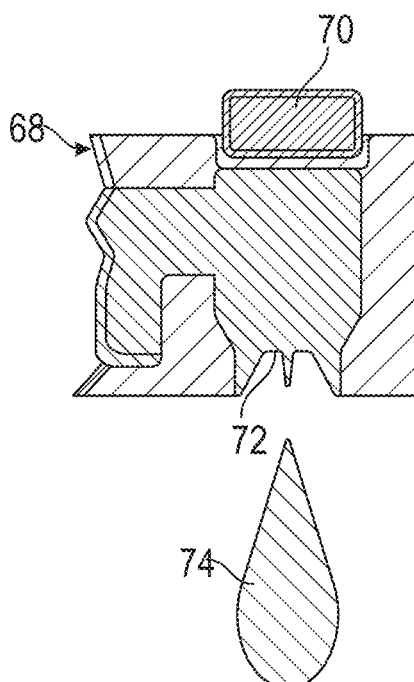

With reference to FIGS. 10A, 10B, 10C, and 10D, in embodiments, the high transfer efficiency applicator 12 is a piezoelectric applicator 68 configured to apply the coating composition drop-on-demand. The piezoelectric applicator 68 includes a piezoelectric element 70 configured to deform between a draw position, a rest position, and an application position. The piezoelectric applicator 68 further includes the nozzle through which a droplet 74 of the coating composition is applied. In FIG. 10A, the piezoelectric element 70 is in a rest position. In FIG. 10B, the piezoelectric element 70 is in a draw position to draw in the coating composition from the reservoir. In FIG. 10C, the piezoelectric element 70 is in an application position to expel the coating composition from the piezoelectric applicator 68 thereby forming the droplet 74. FIG. 10D, the piezoelectric element 70 returns to the rest position. In certain embodiments, the high transfer efficiency applicator 12 may have a jetting frequency of from about 100 to about 1,000,000 Hz, alternatively from about 10,000 Hz to about 100,000 Hz, or alternatively from about 30,000 Hz to about 60,000 Hz.

The high transfer efficiency applicator 12 may include a nozzle defining a nozzle orifice. It is to be appreciated that each high transfer efficiency applicator may include more than one nozzle, such as for applying a coating composition including effect pigments which may require a larger nozzle orifice. The nozzle orifice 72 may have a nozzle diameter (D) in an amount of from about 0.000001 to about 0.001, alternatively from about 0.000005 to about 0.0005, or alternatively from about 0.00002 to about 0.00018, meters (m). The nozzle orifice 72 may have a nozzle diameter (D) in an amount of at least 0.000001, alternatively at least 0.000005, or alternatively at least 0.00002. The nozzle orifice 72 may have a nozzle diameter (D) in an amount of no greater than 0.001, alternatively no greater than 0.0005, or alternatively no greater than 0.00018.

Figure 11:
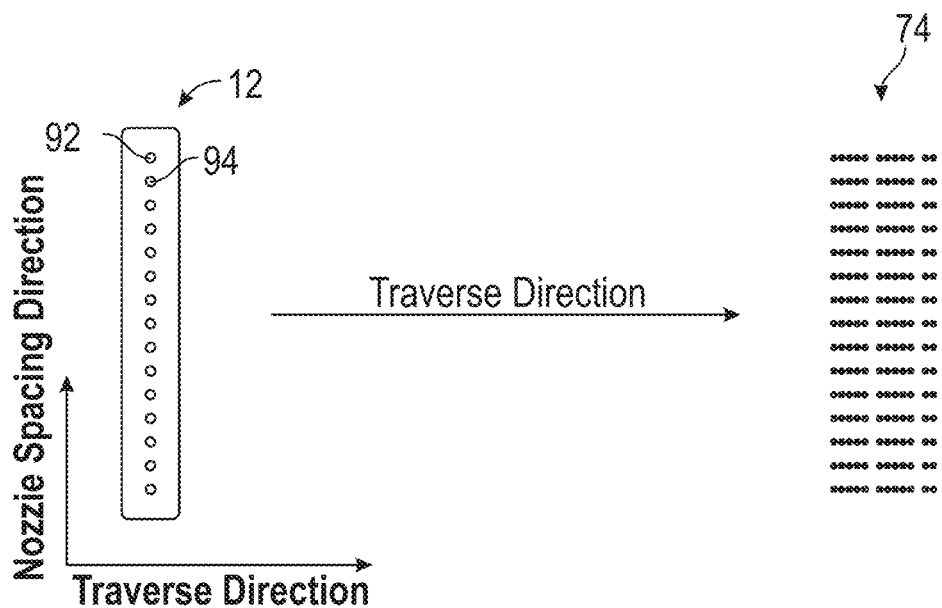
FIG. 11 is a perspective view illustrating a non-limiting embodiment of a high transfer efficiency applicator including a plurality of nozzles.

With reference to FIG. 11, in embodiments, the high transfer efficiency applicator 12 includes a plurality of nozzles 72. The nozzles 72 are oriented perpendicular to the traverse direction by which the high transfer efficiency applicator moves. As a result, the spacing of the droplets 72 of the coating composition is similar to the spacing of the nozzles 72 to one another.

Figure 12:
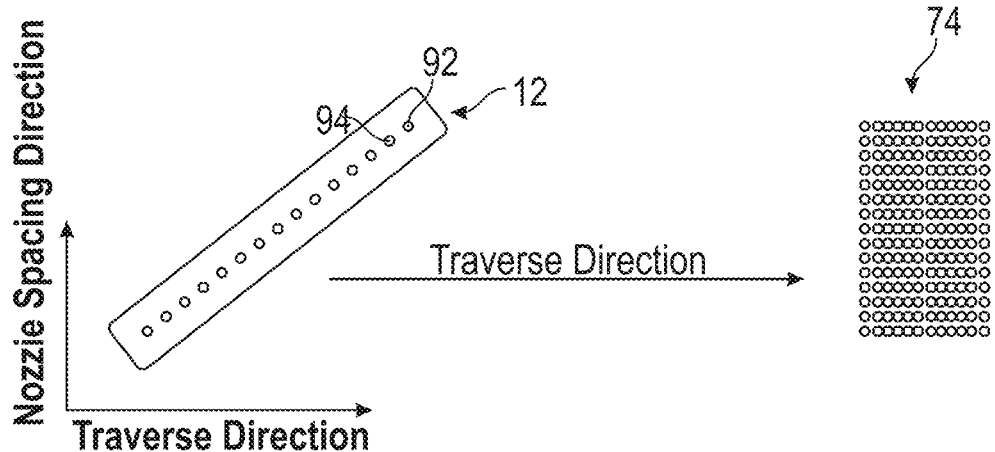
FIG. 12 is a perspective view illustrating another non-limiting embodiment of a high transfer efficiency applicator including a plurality of nozzles.

With reference to FIG. 12, in embodiments, the high transfer efficiency applicator includes a plurality of nozzles 72. The nozzles 72 are oriented diagonal relative to the traverse direction by which the high transfer efficiency applicator moves. As a result, the spacing of the droplets 74 of the coating composition is decreased relative to the spacing of the nozzles 72 to one another.

Figure 13:
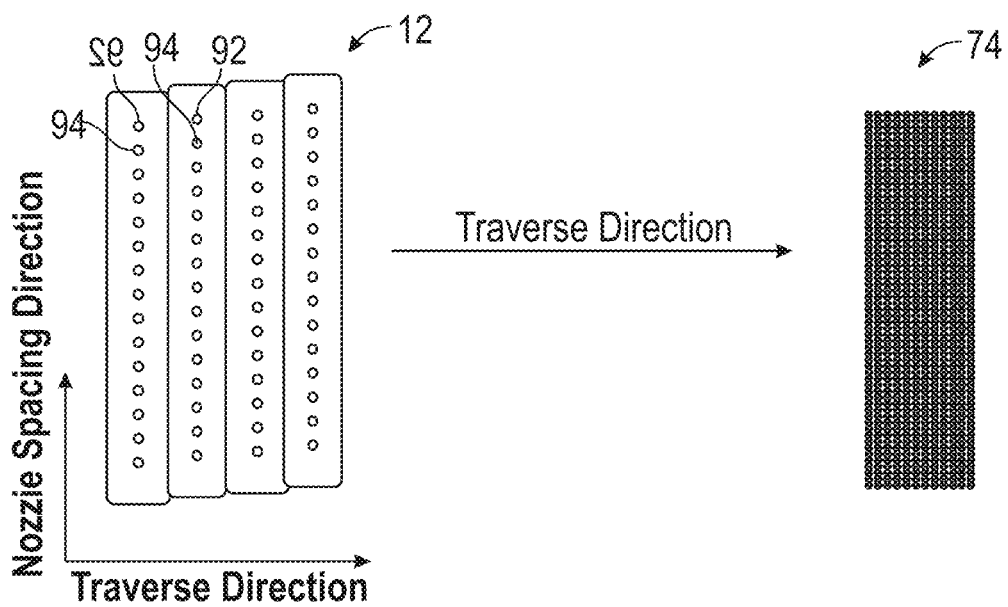
FIG. 13 is a perspective view illustrating a non-limiting embodiment of a high transfer efficiency applicator assembly including a four high transfer efficiency applicators.

With reference to FIG. 13, in embodiments, four high transfer efficiency applicators each include a plurality of nozzles 72. The four high transfer efficiency applicators 12 cooperate to form a high transfer efficiency applicators assembly 76. The nozzles 72 are oriented perpendicular relative to the traverse direction by which the high transfer efficiency applicator moves. The four high transfer efficiency applicators are offset from one another such that the spacing between nozzles 72 is reduced overall for the high transfer efficiency applicators assembly 76. As a result, the spacing of the droplets 74 of the coating composition is further decreased relative to the spacing of the nozzles 72 to one another.

In certain embodiments, a system 50 for applying a coating composition to a substrate 10 utilizing a high transfer efficiency applicator 12 is provided herein. The system 50 includes a high transfer efficiency applicator 12 including a nozzle. The nozzle defining a nozzle orifice and may have a nozzle diameter of from about 0.00002 m to about 0.0004 m. The system 50 further includes a reservoir in fluid communication with the high transfer efficiency applicator 12 and configured to contain the coating composition. The coating composition includes a carrier and a binder. The coating composition may have a viscosity of from about 0.002 Pa*s to about 0.2 Pa*s, a density of from about 838 kg/m$^3$ to about 1557 kg/m$^3$, a surface tension of from about 0.015 N/m to about 0.05 N/m, and a relaxation time of from about 0.0005 s to about 0.02 s. The high transfer efficiency applicator 12 is configured to receive the coating composition from the reservoir and configured to expel the coating composition through the nozzle orifice 72 to the substrate 10 to form a coating layer 78. It is to be appreciated that ranges for the nozzle diameter, viscosity, density, surface tension, and relaxation time may be defined by any of the ranges described herein.

The high transfer efficiency applicator 12 may be configured to expel the coating composition through the nozzle orifice 72 at an impact velocity of from about 0.2 m/s to about 20 m/s. Alternatively, the high transfer efficiency applicator 12 may be configured to expel the coating composition through the nozzle orifice 72 at an impact velocity of from about 0.4 m/s to about 10 m/s. The nozzle orifice 72 may have a nozzle diameter of from about 0.00004 m to about 0.00025 m. The coating composition may be expelled from the high transfer efficiency applicator 12 as a droplet 74 having a particle size of at least 10 microns.

In certain embodiments, at least 80% of the droplets 74 of the coating composition expelled from the high transfer efficiency applicator 12 contact the substrate 10. In other embodiments, at least 85%, alternatively at least 90%, alternatively at least 95%, alternatively at least 97%, alternatively at least 98%, alternatively at least 99%, or alternatively at least 99.9% of the droplets 74 of the coating composition expelled from the high transfer efficiency applicator 12 contact the substrate 10. Without being bound by theory, it is believed that an increase in the number of droplets 74 contacting the substrate 10 relative to the number of droplets 74 that do not contact the substrate 10 thereby entering the environment, improves efficiency of application of the coating composition, reduces waste generation, and reduces maintenance of the system 10.

In certain embodiments, at least 80% of the droplets 74 of the coating composition expelled from the high transfer efficiency applicator 12 are monodispersed such that the droplets 74 have a particle size distribution of less than 20%. In other embodiments, at least 85%, alternatively at least 90%, alternatively at least 95%, alternatively at least 97%, alternatively at least 98%, alternatively at least 99%, or alternatively at least 99.9% of the droplets 74 of the coating composition expelled from the high transfer efficiency applicator 12 are monodispersed such that the droplets 74 have a particle size distribution of less than 20%, alternatively less than 15%, alternatively less than 10%, alternatively less than 5%, alternatively less than 3%, alternatively less than 2%, alternatively less than 1%, or alternatively less than 0.1%. While conventional applicators rely on atomization to form "a mist" of atomized droplets of a coating composition having a dispersed particle size distribution, the monodispersed droplets 74 formed by the high transfer efficiency applicator 12 can be directed to the substrate 10 thereby resulting in an improved transfer efficiency relative to conventional applicators.

In certain embodiments, at least 80% of the droplets 74 of the coating composition expelled from the high transfer efficiency applicator 12 to the substrate 10 remain as a single droplet after contact with the substrate 10. In other embodiments, at least 85%, alternatively at least 90%, alternatively at least 95%, alternatively at least 97%, alternatively at least 98%, alternatively at least 99%, or alternatively at least 99.9% of the droplets 74 of the coating composition expelled from the high transfer efficiency applicator 12 to the substrate 10 remain as a single droplet after contact with the substrate 10. Without being bound by theory, it is believed that splashing of the coating composition resulting from impact with the substrate 10 can be minimized or eliminated by applying the coating composition utilizing the high transfer efficiency applicator 12.

Figure 6:
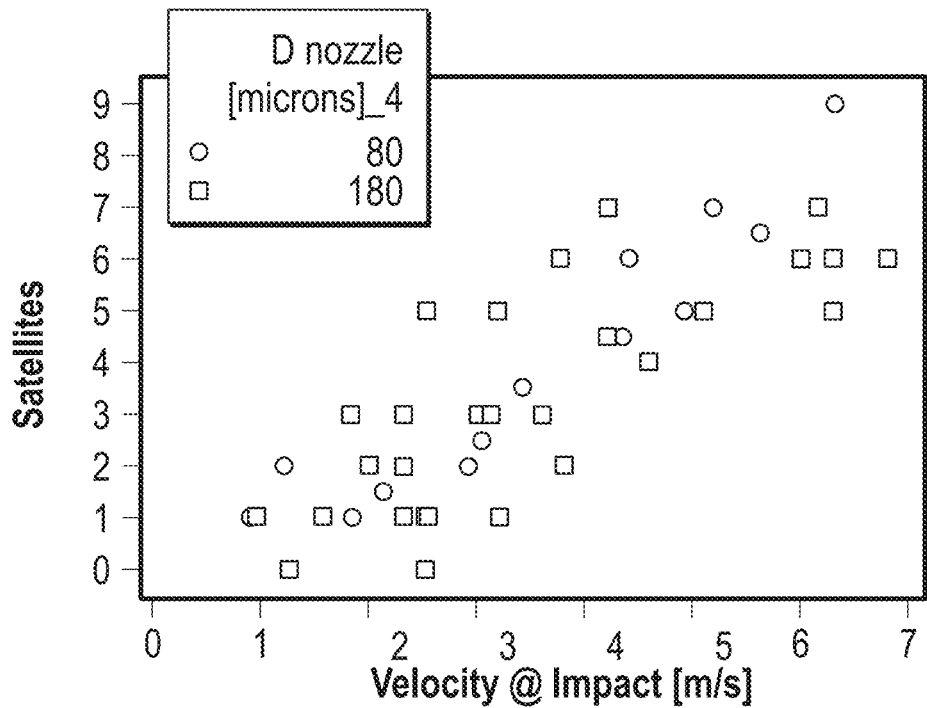
FIG. 6 is a chart illustrating a non-limiting embodiment of a general relationship between impact velocity and satellite droplet formation relative to nozzle diameter.

In certain embodiments, at least 80% of the droplets 74 of the coating composition expelled from the high transfer efficiency applicator 12 to the substrate 10 remain as a single droplet after expulsion from the nozzle orifice 72 of the high transfer efficiency applicator 12. In other embodiments, at least 85%, alternatively at least 90%, alternatively at least 95%, alternatively at least 97%, alternatively at least 98%, alternatively at least 99%, or alternatively at least 99.9% of the droplets 74 of the coating composition expelled from the high transfer efficiency applicator 12 to the substrate 10 remain as a single droplet after expulsion from the nozzle orifice 72 of the high transfer efficiency applicator 12. Without being bound by theory, it is believed that the formation of satellite droplet can be reduced or eliminated by applying the coating composition utilizing the high transfer efficiency applicator 12. With reference to FIG. 6, in certain embodiments, impact velocity and nozzle diameter have an impact on satellite droplet formation. Satellite droplet formation may be reduced by considering the impact velocity and the nozzle diameter.

In certain embodiments, the coating layer is a substantially uniform layer according to macroscopic analysis. The term "substantially" as utilized herein means that at least 95%, at least 96%, at least 97%, at least 98%, at least 99% of a surface of the coating layer covers a surface of the substrate 10 or a surface of an intervening layer between the substrate 10 and the coating layer. The phrase "macroscopic analysis" as utilized herein means that the analysis of the coating layer is performed based on visualization without a microscope.

Another system 50 for applying a first coating composition and a second coating composition is provided herein. The system includes a first high transfer efficiency applicator including a first nozzle and the first nozzle defining a first nozzle orifice 92. The system further includes a second high transfer efficiency applicator 90 including a second nozzle and the second nozzle defining a second nozzle orifice 94. The system 50 further includes a first reservoir in fluid communication with the first high transfer efficiency applicator and configured to contain the first coating composition. The system 50 further includes a second reservoir in fluid communication with the second high transfer efficiency applicator 90 and configured to contain the second coating composition. The system 50 further includes a substrate 10 defining a first target area 80 and a second target area 82. The first high transfer efficiency applicator is configured to receive the first coating composition from the first reservoir and configured to expel the first coating composition through the first nozzle orifice 92 to the first target area 80 of the substrate 10. The second high transfer efficiency applicator 90 is configured to receive the second coating composition from the second reservoir and configured to expel the second coating composition through the second nozzle orifice 94 to the second target area 82 of the substrate 10. In certain embodiments, the first target area 80 is adjacent the second target area 82.

In certain embodiments, the first high transfer efficiency applicator includes a plurality of the first nozzles 72 with each of the first nozzles 72 defining the first nozzle orifice 92. In these embodiments, the second high transfer efficiency applicator 90 includes a plurality of the second nozzles with each of the second nozzles defining the second nozzle orifice 94. The first high transfer efficiency applicator 88 is configured to expel the first coating composition through each of the first nozzle orifice 92s independent of one another and the second high transfer efficiency applicator 90 is configured to expel the second coating composition through each of the second nozzle orifice 94s independent of one another.

In various embodiments, the substrate 10 includes a first end 84 and a second end 86 with the first target area 80 of the substrate 10 and the second target area 82 of the substrate 10 disposed therebetween. The first high transfer efficiency applicator 88 and the second high transfer efficiency applicator 90 may be configured to move from the first end 84 to the second end 86. The first high transfer efficiency applicator 88 and the second high transfer efficiency applicator 90 may be configured to expel the first coating composition and the second coating composition through the first nozzle orifice 92 and the second nozzle orifice 94 along a single pass from the first end 84 to the second end 86.

A path may be defined extending between the first end and the second end. The first high transfer efficiency applicator 88 and the second high transfer efficiency applicator 90 are configured to move along the path. The first high transfer efficiency applicator 88 and the second high transfer efficiency applicator 90 are configured to expel the first coating composition and the second coating composition through the first nozzle orifice 92 and the second nozzle orifice 94 during a single pass along the path.

Figure 16:
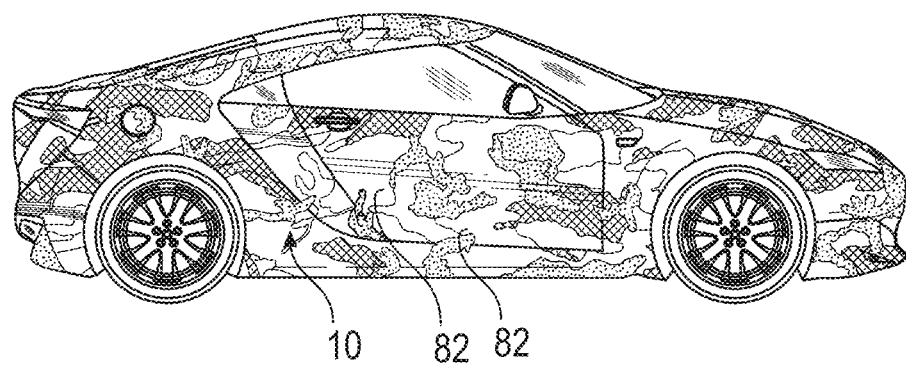
FIG. 16 is a perspective view illustrating a non-limiting embodiment of a substrate including a coating layer having a camouflage pattern.

With reference to FIG. 16, in one exemplary embodiment, the first target area 80 of the substrate 10 and a second target area 82 of the substrate 10 cooperate to form a camouflage pattern. The first high transfer efficiency applicator 88 and the second high transfer efficiency applicator 90 are configured to expel the first coating composition and the second coating composition through the first nozzle orifice 92 and the second nozzle orifice 94 to the first target area 80 and the second target area 82 to form a coating layer having the camouflage pattern during the single pass.

Figure 17:
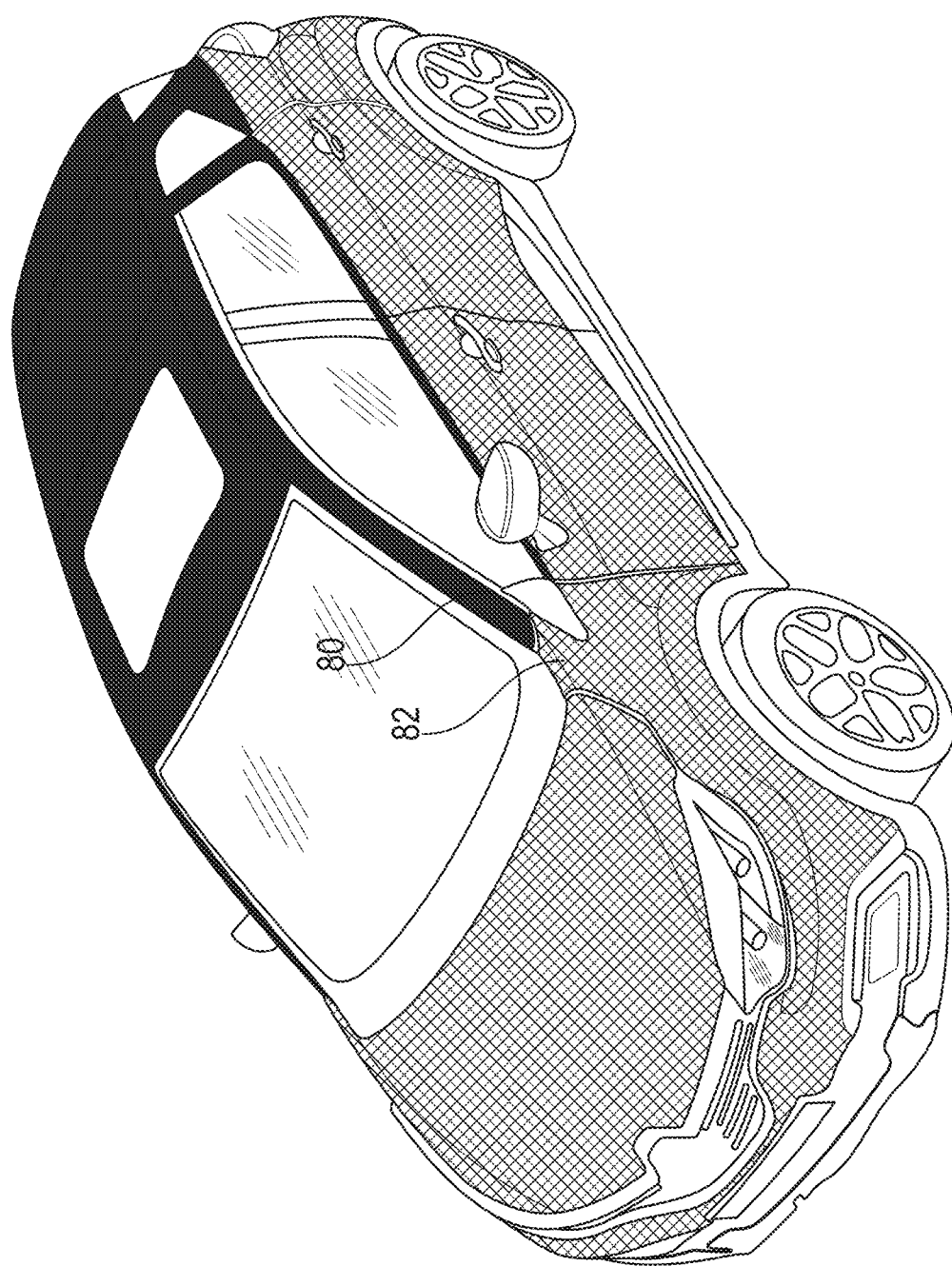
FIG. 17 is a perspective view illustrating a non-limiting embodiment of a substrate including a coating layer having a two-tone pattern.

With reference to FIG. 17, in another exemplary embodiment, the first target area 80 of the substrate 10 and a second target area 82 of the substrate 10 cooperate to form a two-tone pattern. The first high transfer efficiency applicator 88 and the second high transfer efficiency applicator 90 are configured to expel the first coating composition and the second coating composition through the first nozzle orifice 92 and the second nozzle orifice 94 to the first target area 80 and the second target area 82 to form a coating layer having the two-tone pattern during the single pass.

Figure 18:
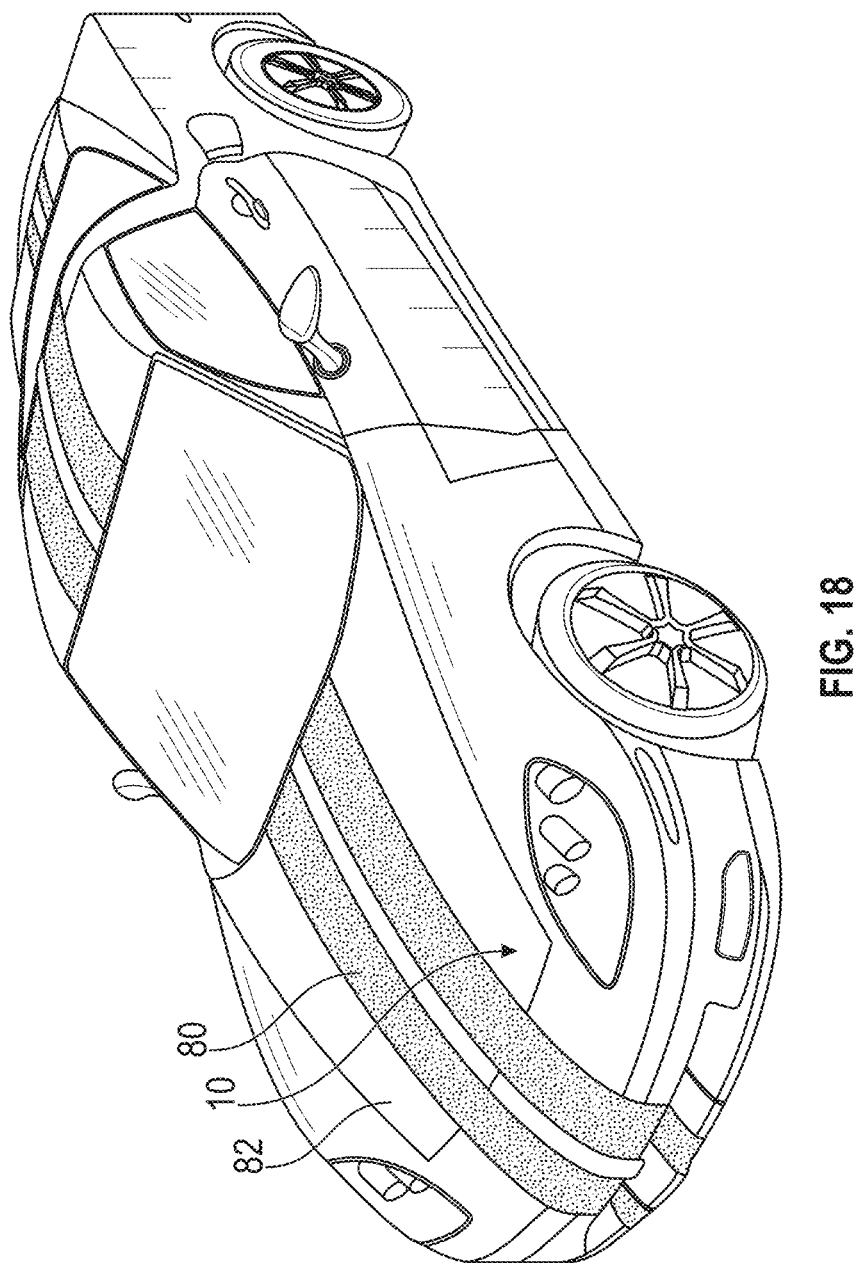
FIG. 18 is a perspective view illustrating a non-limiting embodiment of a substrate including a coating layer having a striping pattern.

With reference to FIG. 18, in yet another exemplary embodiment, the first target area 80 of the substrate 10 and a second target area 82 of the substrate 10 cooperate to form a striping pattern. The first high transfer efficiency applicator 88 and the second high transfer efficiency applicator 90 are configured to expel the first coating composition and the second coating composition through the first nozzle orifice 92 and the second nozzle orifice 94 to the first target area 80 and the second target area 82 to form a coating layer having the striping pattern during the single pass.

Figure 19:
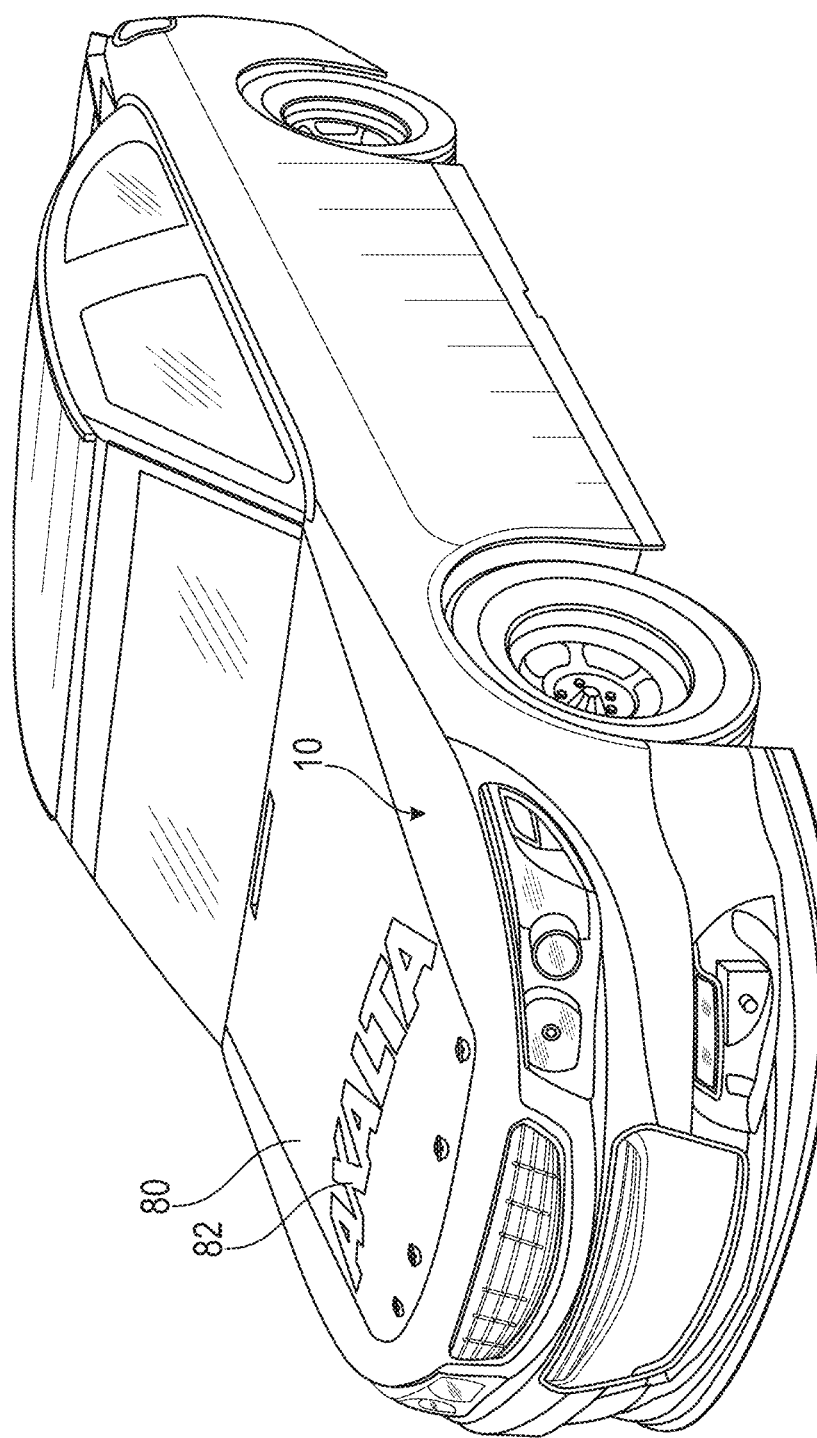
FIG. 19 is a perspective view illustrating a non-limiting embodiment of a substrate including a coating layer having an irregular pattern.

With reference to FIG. 19, in still another exemplary embodiment, the first target area 80 of the substrate 10 and a second target area 82 of the substrate 10 cooperate to form an irregular pattern. The first high transfer efficiency applicator 88 and the second high transfer efficiency applicator 90 are configured to expel the first coating composition and the second coating composition through the first nozzle orifice 92 and the second nozzle orifice 94 to the first target area 80 and the second target area 82 to form a coating layer having the irregular pattern during the single pass.

Figure 15:
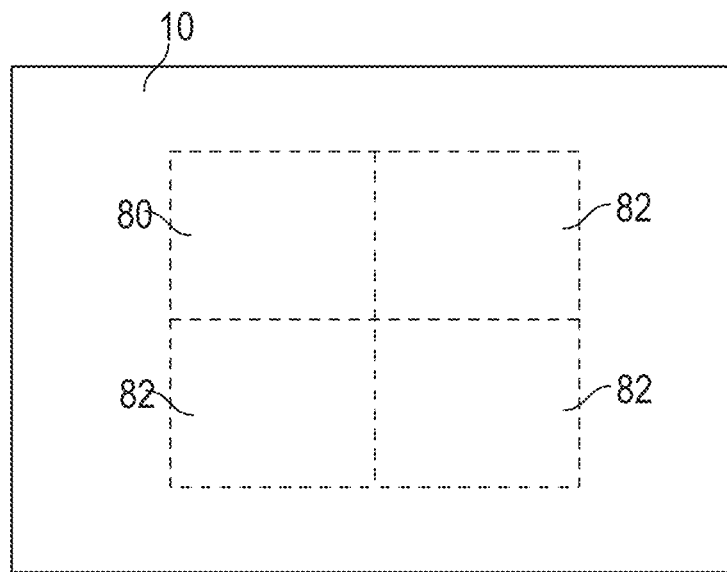
FIG. 15 is a perspective view illustrating a non-limiting embodiment of a substrate including a first target area 80 and a second target area 82.

With reference to FIG. 15, the first target area 80 of the substrate 10 and a second target area 82 of the substrate 10 may cooperate to form a rectangular array alternating between the first target area 80 and the second target area 82. The first high transfer efficiency applicator 88 and the second high transfer efficiency applicator 90 may be configured to expel the first coating composition and the second coating composition through the first nozzle orifice 92 and the second nozzle orifice 94 to the first target area 80 and the second target area 82 to form the coating layer during the single pass. In embodiments, the first coating composition includes a pigment and the second coating composition includes an effect pigment.

The pigment of the first coating composition may be a primary pigment. Non-limiting examples of suitable primary pigments include pigments with coloristic properties useful in the present invention including: blue pigments including indanthrone blue Pigment Blue 60, phthalocyanine blues, Pigment Blue 15:1, 15, 15:3 and 15:4, and cobalt blue Pigment Blue 28; red pigments including quinacridone reds, Pigment Red 122 and Pigment Red 202, iron oxide red Pigment Red 101, perylene reds scarlet Pigment Red 149, Pigment Red 177, Pigment Red 178, and maroon Pigment Red 179, azoic red Pigment Red 188, and diketo-pyrrolo-pyrrol reds Pigment red 255 and Pigment Red 264; yellow pigments including diarylide yellows Pigment Yellow 14, iron oxide yellow Pigment Yellow 42, nickel titanate yellow Pigment Yellow 53, indolinone yellows Pigment Yellow 110 and Pigment Yellow 139, monoazo yellow Pigment yellow 150, bismuth vanadium yellow pigment Pigment Yellow 184, disazo yellows Pigment Yellow 128 and Pigment Yellow 155; orange pigments including quinacridone orange pigments Pigment Yellow 49 and Pigment Orange 49, benzimidazolone orange pigment Pigment Orange 36; green pigments including phthalocyanine greens Pigment Green 7 and Pigment Green 36, and cobalt green Pigment Green 50; violet pigments including quinacridone violets Pigment Violet 19 and Pigment Violet 42, dioxane violet Pigment Violet 23, and perylene violet Pigment Violet 29; brown pigments including monoazo brown Pigment Brown 25 and chrome-antimony titanate Pigment Brown 24, iron chromium oxide Pigment Brown 29; white pigments such as anatase and rutile titanium dioxide (TiO2) Pigment White 6; and black pigments including carbon blacks Pigment Black 6 and Pigment Black 7, perylene black Pigment Black 32, copper chromate black Pigment Black 28.

The second coating composition may include an effect pigment. The effect pigment of the second coating composition is selected from the group of metallic flake pigments, mica-containing pigments, glass-containing pigments, and combinations thereof.

The second coating composition may include a functional pigment. The functional pigment may be selected from the groups of a radar reflective pigment, LiDAR reflective pigment, corrosion inhibiting pigment, and combinations thereof.

The second coating composition may include a functional additive configured to cooperate with the first coating composition to improve properties of the coating composition. The functional additive may be selected from the groups of anti-sag agent, pH modifier, catalyst, surface tension modifier, solubility modifier, adhesion promoter, and combinations thereof.

In embodiments, the plurality of the first nozzles of the first high transfer efficiency applicator 88 are arranged in a linear configuration relative to one another along a first axis and the plurality of the second nozzles of the second high transfer efficiency applicator 90 are arranged in a linear configuration relative to one another along a second axis, and wherein the first axis and the second axis are parallel to each other. The first high transfer efficiency applicator 88 may be coupled to the second high transfer efficiency applicator 90. The first high transfer efficiency applicator 88 and the second high transfer efficiency applicator 90 may cooperate to form a high transfer efficiency applicator assembly that is a unitary component.

Another system 50 for applying a coating composition is provided herein. The system 50 includes a first high transfer efficiency applicator 88 including a first nozzle and the first nozzle defining a first nozzle orifice 92. The system further includes a second high transfer efficiency applicator 90 including a second nozzle and the second nozzle defines a second nozzle orifice 94. The system 50 further includes a reservoir in fluid communication with the first high transfer efficiency applicator 88 and the second high transfer efficiency applicator 90. The reservoir is configured to contain the coating composition. The system 50 includes a substrate 10 defining a first target area 80 and a second target area 82. The first high transfer efficiency applicator 88 and the second high transfer efficiency applicator 90 are configured to receive the coating composition from the reservoir and configured to expel the coating composition through the first nozzle orifice 92 to the first target area 80 of the substrate 10 and to expel the coating composition through the second nozzle orifice 94 to the second target area 82 of the substrate 10.

The first high transfer efficiency applicator 88 includes a plurality of the first nozzles with each of the first nozzles defining the first nozzle orifice 92. The second high transfer efficiency applicator 90 includes a plurality of the second nozzles with each of the second nozzles defining the second nozzle orifice 94. The first high transfer efficiency applicator 88 is configured to expel the coating composition through each of the first nozzle orifices 90 independent of one another and the second high transfer efficiency applicator 90 is configured to expel the coating composition through each of the second nozzle orifices 94 independent of one another.

The substrate 10 includes a first end and a second end with the first target area 80 of the substrate 10 and the second target area 82 of the substrate 10 disposed therebetween. The first high transfer efficiency applicator 88 and the second high transfer efficiency applicator 90 are configured to move from the first end to the second end, and the first high transfer efficiency applicator 88 and the second high transfer efficiency applicator 90 are configured to expel the coating composition through the first nozzle orifice 92 and the second nozzle orifice 94 along a single pass from the first end to the second end.

A path is defined extending between the first end and the second end. The first high transfer efficiency applicator 88 and the second high transfer efficiency applicator 90 are configured to move along the path. The first high transfer efficiency applicator 88 and the second high transfer efficiency applicator 90 are configured to expel the coating composition through the first nozzle orifice 92 and the second nozzle orifice 94 during a single pass along the path.

The first target area 80 of the substrate 10 and a second target area 82 of the substrate 10 cooperate to form a rectangular array alternating between the first target area 80 and the second target area 82. The first high transfer efficiency applicator 88 and the second high transfer efficiency applicator 90 are configured to expel the coating composition through the first nozzle orifice 92 and the second nozzle orifice 94 to the first target area 80 and the second target area 82 to form a uniform coating layer during the single pass.

The plurality of the first nozzles of the first high transfer efficiency applicator 88 are arranged in a linear configuration relative to one another along a first axis and the plurality of the second nozzles of the second high transfer efficiency applicator 90 are arranged in a linear configuration relative to one another along a second axis. The first axis and the second axis are parallel to each other.

The plurality of the first nozzles includes a first nozzle A and a first nozzle B adjacent the first nozzle A. The first nozzle A and the first nozzle B are spaced from each other in a nozzle distance. The plurality of the second nozzles includes a second nozzle A adjacent the first nozzle A. The first nozzle A and the second nozzle A are spaced from each other in a high transfer efficiency applicator distance. The high transfer efficiency applicator distance is substantially the same as the first nozzle distance.

The plurality of the first nozzles and the plurality of second nozzles are spaced relative to each other to form a rectangular array and wherein the plurality of the first nozzles and the plurality of second nozzles are configured to alternate expelling of the coating composition between adjacent first and second nozzles of the rectangular array to reduce sag of the coating composition.

In various embodiments, the high transfer efficiency applicator 12 includes sixty nozzles aligned along a y-axis. However, it is to be appreciated that the print head 12 can include any number of nozzles. Each nozzle may be actuated independent of the other nozzles to apply the coating composition to the substrate 10. During printing, independent actuation of the nozzles can provide control for placement of each of the droplets of the coating composition on the substrate 10.

Two or more print heads 12 may be coupled together to form a print head assembly. In certain embodiments, the print heads 12 are aligned together such that the y-axis of each of the print heads 12 are parallel to the other y-axes. Further, the nozzles of each of the print heads 12 may be aligned with each other along an x-axis, which is perpendicular to the y-axis, such that an "array" is formed. One nozzle may be equally spaced from the other nozzles directly adjacent the one nozzle, relative to the x-axis and the y-axis. This configuration of nozzles may be suitable for applying the same coating composition by each of the print heads 12 to the substrate 10 as the print head assembly moves along the x-axis. Without being bound by theory, it is believed that equal spacing of the nozzles, relative to both the x-axis and the y-axis, may result in uniform application of the same coating composition on the substrate 10. Uniform application of the same coating composition may be suitable for single-color applications, two-tone color applications, and the like.

Alternatively, one set of nozzles along a first y-axis may be closely spaced to another set of nozzles relative to the spacing of each of the nozzles along the y-axis of a single high transfer efficiency applicator 12. This configuration of nozzles may be suitable for applying different coating compositions by each of the high transfer efficiency applicators 12 to the substrate 10. Different coating compositions utilized within the same high transfer efficiency applicator assembly may be suitable for logos, designs, signage, striped, camouflage appearance, and the like.

The nozzles of the high transfer efficiency applicator 12 may have any configuration known in the art, such as linear, concave relative to the substrate 10, convex relative to the substrate 10, circular, and the like. Adjustment of the configuration of the nozzles may be necessary to facilitate cooperation of the high transfer efficiency applicator 12 to substrates having irregular configurations, such as vehicles including mirrors, trim panels, contours, spoilers, and the like.

The high transfer efficiency applicator 12 may be configured to blend individual droplets to form a desired color. The high transfer efficiency applicator 12 may include nozzles to apply cyan coating compositions, magenta coating compositions, yellow coating compositions, and black coating compositions. The properties of coating compositions may be modified to promote blending. Further, agitation sources, such as air movement or sonic generators may be utilized to promote blending of the coating compositions. The agitation sources may be coupled to the high transfer efficiency applicator 12 or separate therefrom.

A system for applying a first coating composition, a second coating composition, and a third coating composition is also provided herein. The system includes a first high transfer efficiency applicator 88 including a first nozzle and the first nozzle defining a first nozzle orifice 92. The system includes a second high transfer efficiency applicator 90 including a second nozzle and the second nozzle defining a second nozzle orifice 94. The system further includes a third high transfer efficiency applicator including a third nozzle and the third nozzle defining a third nozzle orifice. The system further includes a first reservoir in fluid communication with the first high transfer efficiency applicator 88 and configured to contain the first coating composition. The system further includes a second reservoir in fluid communication with the second high transfer efficiency applicator 90 and configured to contain the second coating composition. The system further includes a third reservoir in fluid communication with the third high transfer efficiency applicator and configured to contain the third coating composition. The system further includes a substrate 10 defining a target area. The first high transfer efficiency applicator 88 is configured to receive the first coating composition from the first reservoir and configured to expel the first coating composition through the first nozzle orifice 92 to the target area of the substrate 10. The second high transfer efficiency applicator 90 is configured to receive the second coating composition from the second reservoir and configured to expel the second coating composition through the second nozzle orifice 94 to the target area of the substrate 10. The third high transfer efficiency applicator is configured to receive the third coating composition from the third reservoir and configured to expel the third coating composition through the third nozzle orifice to the target area of the substrate 10.

In embodiments, the first coating composition exhibits a first color space, the second coating composition exhibits a second color space, and the third coating composition exhibits a third color space. In certain embodiments, the first color space includes a cyan color space according to CMYK color model, the second color space includes a magenta color space according to CMYK color model, and the third color space includes a yellow color space according to CMYK color model. In other embodiments, the first color space includes a red color space according to RGB color model, the second color space includes a green color space according to RGB color model, and the third color space includes a blue color space according to RGB color model.

One or more of the first coating composition, the second coating composition, and the third coating composition may be expelled on another of the first coating composition, the second coating composition, and third coating composition for generating a color space different than the first color space, the second color space, and the third color space. In embodiments, the target area defines a plurality of sub-areas and wherein one or more of the first high transfer efficiency applicator 88, the second high transfer efficiency applicator 90, and the third high transfer efficiency applicator is configured to expel one or more of the first coating composition, the second coating composition, and the third coating composition to the one or more of the plurality of sub-areas to generate a halftone pattern of one or more of the first color space, the second color space, and the third color space.

The first high transfer efficiency applicator 88 may include a plurality of the first nozzles with each of the first nozzles defining the first nozzle orifice 92. The second high transfer efficiency applicator 90 may include a plurality of the second nozzles with each of the second nozzles defining the second nozzle orifice 94. The third high transfer efficiency applicator may include a plurality of the third nozzles with each of the third nozzles defining the third nozzle orifice. The first high transfer efficiency applicator 88 may be configured to expel the first coating composition through each of the first nozzle orifice 92s independent of one another. The second high transfer efficiency applicator 90 may be configured to expel the second coating composition through each of the second nozzle orifice 94s independent of one another. The third high transfer efficiency applicator may be configured to expel the third coating composition through each of the third nozzle orifices independent of one another.

The substrate 10 includes a first end and a second end with the target area of the substrate 10 disposed therebetween. The first high transfer efficiency applicator 88, the second high transfer efficiency applicator 90, and the third high transfer efficiency applicator may be configured to move from the first end to the second end. The first high transfer efficiency applicator 88, the second high transfer efficiency applicator 90, and the third high transfer efficiency applicator may be configured to expel the first coating composition, the second coating composition, and the third coating composition through the first nozzle orifice 92, the second nozzle orifice 94, and the third nozzle orifice along a single pass from the first end to the second end.

A path may be defined extending between the first end and the second end. The first high transfer efficiency applicator 88, the second high transfer efficiency applicator 90, and the third high transfer efficiency applicator may be configured to move along the path. The first high transfer efficiency applicator 88, the second high transfer efficiency applicator 90, and the third high transfer efficiency applicator may be configured to expel the first coating composition, the second coating composition, and the third coating composition through the first nozzle orifice 92, the second nozzle orifice 94, and the third nozzle orifice during a single pass along the path.

The first high transfer efficiency applicator 88, the second high transfer efficiency applicator 90, and the third high transfer efficiency applicator may be coupled together. In embodiments, the first high transfer efficiency applicator 88, the second high transfer efficiency applicator 90, and the third high transfer efficiency applicator cooperate to form a high transfer efficiency applicator assembly that is a unitary component.

In certain embodiments, the system further includes one or more additional high transfer efficiency applicators.

Certain substrates, such as vehicles, may require application of a coating composition to specific portion of its substrate 1010. Conventional dark coating layers, such as black, may not adequately reflect the signal generated by LiDAR at about 920 nm thereby impairing the LiDAR's ability to recognize the substrate 10 including the dark coating layer. Further, metallic coating layers, such as silver, may reflect the signal generated by the LiDAR in a direction away from the LiDAR thereby impairing the LiDAR's ability to recognize the substrate 10 including the metallic coating layer.

In certain embodiments, the coating composition includes LiDAR-reflective pigment that, when formed into a coating layer, may improve recognition of the substrate 10 by LiDAR. The size of coating layer formed from the coating composition including LiDAR-reflective pigment may be just large enough to be recognized by LiDAR while still maintaining the appearance provided by the conventional coating. Further, the coating composition including LiDAR-reflective pigment may be applied to specific locations on the vehicle (e.g., bumper, roof line, hood, side panel, mirrors, etc.) that are relevant to recognition by LiDAR while still maintaining the appearance provided by the conventional coating. The coating composition including LiDAR-reflective pigment may be any coating composition, such as a basecoat or a clear coat. The coating composition including LiDAR-reflective pigment may be applied to the substrate 10 by the high transfer efficiency applicator 12 in a pre-defined location without the need for masking the substrate 10 and wasting a portion of the coating composition including LiDAR-reflective pigment through low-transfer efficiency application methods, such as conventional spray atomization.

The LiDAR-reflective pigment may impact one or more properties of the coating composition. Adjustment of the properties of the coating composition may be necessary to render the coating composition suitable for application utilizing the high transfer efficiency applicator 12 including, but not limited to, viscosity ($\eta$), density ($\rho$), surface tension ($\sigma$), and relaxation time ($\lambda$). Further, adjustment of properties of the high transfer efficiency applicator 12 may be necessary to render the high transfer efficiency applicator 12 suitable for application, including, but not limited to, nozzle diameter (D) of the high transfer efficiency applicator 12, impact velocity (v) of the coating composition by the high transfer efficiency applicator 12, speed of the high transfer efficiency applicator 12, distance of the high transfer efficiency applicator 12 from the substrate 10, droplet size of the coating composition by the high transfer efficiency applicator 12, firing rate of the high transfer efficiency applicator 12, and orientation of the high transfer efficiency applicator 12 relative to the force of gravity.

In embodiments, the coating composition includes a radar reflective pigment or a LiDAR reflective pigment. In certain embodiments, the radar reflective pigment or the LiDAR reflective pigment may include, but is not limited to, Nickel manganese ferrite blacks (Pigment Black 30) and iron chromite brown-blacks (CI Pigment Green 17, CI Pigment Browns 29 and 35). Other commercially available infrared reflective pigments are Pigment Blue 28 Pigment Blue 36, Pigment Green 26, Pigment Green 50, Pigment Brown 33, Pigment Brown 24, Pigment Black 12 and Pigment Yellow 53. The LiDAR reflective pigment may also be referred to as an infrared reflective pigment.

The coating composition includes the LiDAR reflective pigment in an amount of from about 0.1 wt. % to about 5 wt. % based on a total weight of the coating composition. In embodiments, the coating layer has a reflectance at a wavelength from 904 nm to 1.6 microns. The substrate 10 may define a target area and a non-target area adjacent the target area. The high transfer efficiency applicator may be configured to expel the coating composition through the nozzle orifice 72 to the target area to form a coating layer having a reflectance at a wavelength from 904 nm to 1.6 microns. The non-target area may be substantially free of the coating layer.

In various embodiments, the substrate 10, such as the leading edge of a vehicle, is susceptible to damage from stones and other debris on the roadway during operation. An anti-chip coating composition may be applied to the substrate 10 by the high transfer efficiency applicator 12 in a pre-defined location without the need for masking the substrate 10 and wasting a portion of the anti-chip coating composition through low-transfer efficiency application methods, such as conventional spray atomization.

The anti-chip coating composition may include elastomeric polymers and additives resulting in a coating layer exhibiting increased stone chip resistance. The elastomeric polymers and additives may impact one or more properties of the coating composition. Adjustment of the properties of the coating composition may be necessary to render the coating composition suitable for application utilizing the high transfer efficiency applicator 12 including, but not limited to, viscosity ($\eta$), density ($\rho$), surface tension ($\sigma$), and relaxation time ($\lambda$). Further, adjustment of properties of the high transfer efficiency applicator 12 may be necessary to render the high transfer efficiency applicator 12 suitable for application, including, but not limited to, nozzle diameter (D) of the high transfer efficiency applicator 12, impact velocity (v) of the coating composition by the high transfer efficiency applicator 12, speed of the high transfer efficiency applicator 12, distance of the high transfer efficiency applicator 12 from the substrate 10, droplet size of the coating composition by the high transfer efficiency applicator 12, firing rate of the high transfer efficiency applicator 12, and orientation of the high transfer efficiency applicator 12 relative to the force of gravity.

In embodiments, the coating composition includes a binder including an elastomeric resin in an amount of at least 50 weight %, wherein the elastomeric resin has an Elongation to Break of at least 500% according to DIN 53 504. The binder may have a Tg of less than 0° C. In certain embodiments, the elastomeric resin is selected from the group of the elastomer is selected from the group of polyesters, polyurethanes, acrylics, and combinations thereof.

In embodiments, the coating layer has a chip resistance of at least 4B/7C according to SAE J400. Alternatively, the coating layer has a chip resistance of at least 5B/8C according to SAE J400. The substrate 10 may define a target area and a non-target area adjacent the target area. The high transfer efficiency applicator may be configured to expel the coating composition through the nozzle orifice 72 to the target area to form a coating layer having a chip resistance of at least 4B/7C according to SAE J400. The non-target area is substantially free of the coating layer. The analysis under SAE J400 is performed on a multilayer coating systems including primer, basecoat and clearcoat. In total the composite layering system is tested for mechanical integrity by applying chip resistance damage by stones or other flying objects. Following the method of SAE J400 (alternatively ASTM D-3170) using 2 kg of stone with diameter 8-16 mm, where both stone and test panels have been conditioned to −20° F. (−29° C.+/−2°), stones are projected to the test panel with 900 orientation using pressurized air at 70 psi (480 kPa+/−20) in time period less than 30 sec. After pulling tape to remove loose paint chips, the damage is assessed using a visual scale.

In various embodiments, the substrate 10 is susceptible to damage from corrosion. Although modern substrates include an electrocoat layer to prevent corrosion on interior and exterior surfaces of vehicles, an additional corrosion protection coating composition may be applied to the substrate 10 by the high transfer efficiency applicator 12 in a pre-defined location without the need for masking the substrate 10 and wasting a portion of the corrosion protection coating composition through low-transfer efficiency application methods, such as conventional spray atomization.

The corrosion protection coating composition may include pigments or additives that may impact one or more properties of the coating composition. Adjustment of the properties of the coating composition may be necessary to render the coating composition suitable for application utilizing the high transfer efficiency applicator 12 including, but not limited to, viscosity ($\eta_0$), density ($\rho$), surface tension ($\sigma$), and relaxation time ($\lambda$). Further, adjustment of properties of the high transfer efficiency applicator 12 may be necessary to render the high transfer efficiency applicator 12 suitable for application, including, but not limited to, nozzle diameter (D) of the high transfer efficiency applicator 12, impact velocity (v) of the coating composition by the high transfer efficiency applicator 12, speed of the high transfer efficiency applicator 12, distance of the high transfer efficiency applicator 12 from the substrate 10, droplet size of the coating composition by the high transfer efficiency applicator 12, firing rate of the high transfer efficiency applicator 12, and orientation of the high transfer efficiency applicator 12 relative to the force of gravity.

In embodiments, the coating composition further includes a corrosion inhibiting pigment. Any corrosion inhibiting pigment known in the art may be utilized such as Calcium Strontium Zinc Phosphosilicate. In other embodiments, double orthophosphates, in which one of the cations is represented by zinc can be used. For example, these may include Zn—Al, Zn—Ca, but also Zn—K, Zn—Fe, Zn—Ca—Sr or Ba—Ca and Sr—Ca combinations. It is possible to combine a phosphate anion with further anticorrosively efficient anions, such as silicate, molybdate, or borate. Modified phosphate pigments can be modified by organic corrosion inhibitors. Modified phosphate pigments can be exemplified by the following compounds. Aluminum(III) zinc(II) phosphate, Basic zinc phosphate, Zinc phosphomolybdate, Zinc calcium phosphomolybdate, Zinc borophosphate. Moreover, Zinc strontium phosphosilicate, Calcium barium phosphosilicate, Calcium strontium zinc phosphosilicate, and combinations thereof. Zinc 5-nitroisophthalate, Calcium 5-nitroisophthalate, Calcium cyanurate, metal salts of dinonylnaphthalene sulfonic acids, and combinations thereof can also be used.

The coating composition may include the corrosion inhibiting pigment in an amount of from about 3 wt. % to about 12 wt. % based on a total weight of the coating composition. In embodiments, the coating layer has a corrosion resistance as demonstrated by no more than 10 mm creep from scribe after 500 hours salt spray per ASTM B117. The substrate 10 may define a target area and a non-target area adjacent the target area. The high transfer efficiency applicator may be configured to expel the coating composition through the nozzle orifice 72 to the target area to form a coating layer having corrosion resistance as demonstrated by no more than 10 mm creep from scribe after 500 hours salt spray per ASTM B117. The non-target area may be substantially free of the coating layer.

Various substrates may include two or more discrete portions of different materials. For example, vehicles can include metal-containing body portions and plastic-containing trim portions. Due to the bake temperature limitations of plastics (80° C.) relative to metals (140° C.), the metal-containing body portions and the plastic-containing trim portions may be conventionally coated in separate facilities thereby increasing the likelihood for mismatched coated parts. A coating composition suitable for plastic substrates may be applied to the plastic substrates by the high transfer efficiency applicator 12 after application and bake of the coating composition suitable for metal substrates without the need for masking the substrate 10 and wasting a portion of the coating composition through low-transfer efficiency application methods, such as conventional spray atomization. The coating composition suitable for plastic substrates may be applied using a first high transfer efficiency applicator 88 12 and the coating composition suitable for metal substrates may be applied using a second high transfer efficiency applicator 90 12. The first high transfer efficiency applicator 88 12 and the second high transfer efficiency applicator 90 12 may form a high transfer efficiency applicator assembly.

The coating composition suitable for plastic substrates may include isocyanate-based crosslinkers whereas the coating composition for metal substrates may include melamine-based crosslinkers. The crosslinking technology of the coating composition may impact one or more properties of the coating composition. Adjustment of the properties of the coating composition may be necessary to render the coating composition suitable for application utilizing the high transfer efficiency applicator 12 including, but not limited to, viscosity ($\eta$), density ($\rho$), surface tension ($\sigma$), and relaxation time ($\lambda$). Further, adjustment of properties of the high transfer efficiency applicator 12 may be necessary to render the high transfer efficiency applicator 12 suitable for application, including, but not limited to, nozzle diameter (D) of the high transfer efficiency applicator 12, impact velocity (v) of the coating composition by the high transfer efficiency applicator 12, speed of the high transfer efficiency applicator 12, distance of the high transfer efficiency applicator 12 from the substrate 10, droplet size of the coating composition by the high transfer efficiency applicator 12, firing rate of the high transfer efficiency applicator 12, and orientation of the high transfer efficiency applicator 12 relative to the force of gravity.

A system for applying a first coating composition and a second coating composition is provided herein. The system includes an atomizing applicator. The system further includes a high transfer efficiency applicator comprising a nozzle and the nozzle defining a nozzle orifice. The system further includes a first reservoir in fluid communication with the atomizing applicator and configured to contain the first coating composition. The system further includes a second reservoir in fluid communication with the high transfer efficiency applicator and configured to contain the second coating composition. The system further includes a substrate assembly comprising a metal-containing substrate and a plastic-containing substrate, the metal-containing substrate coupled to the plastic-containing substrate. The atomizing applicator is configured to receive the first coating composition from the first reservoir and configured to apply the first coating composition to the metal-containing substrate. The high transfer efficiency applicator is configured to receive the second coating composition from the second reservoir and configured to expel the second coating composition through the second nozzle orifice 94 to the plastic-containing substrate.

In embodiments, the atomizing applicator is configured to generate a mist of atomized droplets of the first coating composition. In certain embodiments, the atomizing applicator includes a Bell spray applicator. However, it is to be appreciated that any conventional atomizing spray applicator may be utilized.

A method of applying a first coating composition and a second coating composition utilizing an atomizing applicator and a high transfer efficiency applicator is also provided herein. The high transfer efficiency applicator includes a nozzle and the nozzle defines a nozzle orifice. The method includes the step of providing a substrate assembly including a metal-containing substrate and a plastic-containing substrate. The metal-containing substrate may be coupled to the plastic-containing substrate. The method further includes the step of applying the first coating composition utilizing the atomizing applicator to the metal-containing substrate. The method further includes the step of applying the second coating composition through the nozzle orifice 72 of the high transfer efficiency applicator to the plastic-containing substrate.

The high transfer efficiency applicator 12 may be configured to apply the coating composition at an impact velocity (v) in an amount of from about 0.01 to about 100, alternatively from about 0.1 to about 50, or alternatively from about 1 to about 12, meters per second (m/s). The high transfer efficiency applicator 12 may be configured to apply the coating composition at an impact velocity (v) in an amount of at least 0.01, alternatively at least 0.1, or alternatively at least 1, m/s. The high transfer efficiency applicator 12 may be configured to apply the coating composition at an impact velocity (v) in an amount of no greater than 100, alternatively no greater than 50, or alternatively no greater than 12, m/s.

The high transfer efficiency applicator 12 may further include a reservoir in fluid communication with the high transfer efficiency applicator 12 and configured to contain the coating composition. The reservoir may be directly couple to the high transfer efficiency applicator 12 or indirectly coupled to the high transfer efficiency applicator 12 via one or more tubes. More than one reservoir with each of the reservoirs containing different coating compositions (e.g., different colors, solid or effect pigments, basecoat or clearcoat, 2 pack-coating compositions) may be coupled to the high transfer efficiency applicator 12 for providing the different coating compositions to the same high transfer efficiency applicator 12. The high transfer efficiency applicator 12 is configured to receive the coating composition from the reservoir and configured to expel the coating composition through the nozzle orifice 72 to the substrate 10.

A non-limiting example of the system 50 including the coating composition and the high transfer efficiency applicator 12 may be configured to exhibit the following properties.

| Properties | Exemplary Minimum | Exemplary Maximum |
|---|---|---|
| Viscosity ($\eta_0$) of the coating composition at 10,000 1/sec | about 0.01 Pa·s (about 10 cP) | about 0.06 Pa·s (about 60 cP) |
| Density ($\rho$) of the coating composition | about 0.00103 kg/m$^3$ (about 8.6 lbs/gal) | about 0.00120 kg/m$^3$ (about 10 lbs/gal) |
| Surface Tension ($\sigma$) of the coating composition | about 0.024 N/m (about 24 mN/m) | about 0.05 N/m (about 50 mN/m) |
| Relaxation Time ($\lambda$) of the coating composition | about 0.0005 s (about 0.5 msec) | about 0.01 s (about 10 msec) |
| Nozzle Diameter (D) of the high transfer efficiency applicator 12 | about 0.00002 m (about 20 μm) | about 0.00018 m (about 180 μm) |
| Impact Velocity (v) of the high transfer efficiency applicator 12 | about 1 m/s | about 12 m/s |

When the coating composition is utilized to form the basecoat coating layer, a first basecoat layer having one color may be formed with a second basecoat layer, disposed on the first basecoat layer, having a second color. This configuration for the basecoat coating layer may be utilized for vehicles including two-tone colors (see FIG. 17), racing stripes, off-color panels such as the roof or hood, graphics, writing, or a combination thereof. However, it is to be appreciated that any substrate may benefit from such a configuration.

The first basecoat layer may be applied to the substrate 10 utilizing a conventional spraying apparatus, such as a Bell applicator, and the second basecoat layer may then be applied to the first basecoat layer utilizing the high transfer efficiency applicator 12. One or more considerations can be used in this non-limiting example, such as considering the impact of the surface tension of the first basecoat layer on the second basecoat layer. As a non-limiting example, the surface tension of the first basecoat layer may be increased to improve flow of the coating composition as being applied to the first basecoat layer utilizing the high transfer efficiency applicator 12. This improved flow may be desirable when printing the coating composition on a full panel of a vehicle. As another non-limiting example, the surface tension of the first basecoat layer may be decreased to improve improved boundary retention and/or resolution of the coating composition as being applied to the first basecoat layer utilizing the high transfer efficiency applicator 12. This improved boundary retention and/or resolution may be desirable when printing the coating composition as a design, a writing, and the like. Further, one may consider the impact of wet-on-wet application between the first basecoat layer and the second basecoat layer. For example, carrier selection and additive selection may have an effect on the suitability for the coating composition to be applied to the first basecoat as a wet-on-wet application.

Other considerations may include print head speed of the high transfer efficiency applicator 12, distance of the high transfer efficiency applicator 12 from the substrate 10, firing rate of the high transfer efficiency applicator 12, and orientation of the substrate 10 relative to gravity. Further considerations may relate to drying of the coating composition after application to the substrate 10. Due to the lack of atomization generated during application of the coating composition to the substrate 10 utilizing the print head 12, drying components may be included in the system 50. Examples of suitable drying components may include, but are not limited to, infrared lamps, ultraviolet light lamps, forced air dryers, and the like. It is to be appreciated that these drying components may be coupled to the print head 12 or separate from the print head 12, but configured to cooperate with the print head 12 to facilitate drying of the coating composition.

The coating composition includes various components, such as binders, pigments, extender pigments, dyes, rheology modifiers, carriers, such as organic solvents, water, and non-aqueous solvents, catalysts, conventional additives, or combinations thereof. In embodiments the carrier is selected from the group of water, a non-aqueous solvent, and a combination thereof. Conventional additives may include, but are not limited to, dispersants, antioxidants, UV stabilizers and absorbers, surfactants, wetting agents, leveling agents, antifoaming agents, anti-cratering agents, or combinations thereof. In embodiments, the coating composition is suitable for application to the substrate 10 utilizing the high transfer efficiency applicator 12 on the basis that the coating composition includes certain components and/or includes certain components in a specific amount/ratio.

The term "binder" refers to film forming constituents of the coating composition. Typically, a binder can include polymers, oligomers, or a combination thereof that are essential for forming a coating having desired properties, such as hardness, protection, adhesion, and others. Additional components, such as carriers, pigments, catalysts, rheology modifiers, antioxidants, UV stabilizers and absorbers, leveling agents, antifoaming agents, anti-cratering agents, or other conventional additives may not be included in the term "binder" unless any of these additional components are film forming constituents of the coating composition. One or more of those additional components can be included in the coating composition. In certain embodiments, the binder includes polymers.

In embodiments, the polymer has a crosslinkable-functional group, such as an isocyanate-reactive group. The term "crosslinkable-functional group" refers to functional groups that are positioned in the oligomer, in the polymer, in the backbone of the polymer, in the pendant from the backbone of the polymer, terminally positioned on the backbone of the polymer, or combinations thereof, wherein these functional groups are capable of crosslinking with crosslinking-functional groups (during the curing step) to produce a coating in the form of crosslinked structures. Typical crosslinkable-functional groups can include hydroxyl, thiol, isocyanate, thioisocyanate, acetoacetoxy, carboxyl, primary amine, secondary amine, epoxy, anhydride, ketimine, aldimine, or a workable combination thereof. Some other functional groups such as orthoester, orthocarbonate, or cyclic amide that can generate hydroxyl or amine groups once the ring structure is opened can also be suitable as crosslinkable-functional groups.

The coating composition may include a polyester-polyurethane polymer, a latex polymer, a melamine resin, or combinations thereof. It is to be appreciated that other polymers may be included in the coating composition.

The polyester of the polyester-polyurethane polymer may be linear or branched. Useful polyesters can include esterification products of aliphatic or aromatic dicarboxylic acids, polyols, diols, aromatic or aliphatic cyclic anhydrides and cyclic alcohols. Non-limiting examples of suitable cycloaliphatic polycarboxylic acids are tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic, and cyclobutanetetracarboxylic acid. The cycloaliphatic polycarboxylic acids can be used not only in their cis but also in their trans form and as a mixture of both forms. Further non-limiting examples of suitable polycarboxylic acids can include aromatic and aliphatic polycarboxylic acids, such as, for example, phthalic acid, isophthalic acid, terephthalic acid, halogenophthalic acids, such as, tetrachloro- or tetrabromophthalic acid, adipic acid, glutaric acid, azelaic acid, sebacic acid, fumaric acid, maleic acid, trimellitic acid, and pyromellitic acid. Combinations of polyacids, such as a combination of polycarboxylic acids and cycloaliphatic polycarboxylic acids can be suitable. Combinations of polyols can also be suitable.

Non-limiting suitable polyhydric alcohols include ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, polyethylene glycol and polypropylene glycol. If desired, monohydric alcohols, such as, for example, butanol, octanol, lauryl alcohol, ethoxylated or propoxylated phenols may also be included along with polyhydric alcohols to control the molecular weight.

Non-limiting examples of suitable polyesters include a branched copolyester polymer. The branched copolyester polymer and process for production described in U.S. Pat. No. 6,861,495, which is hereby incorporated by reference, can be suitable. Monomers with multifunctional groups such as AxBy (x,y=1 to 3, independently) types including those having one carboxyl group and two hydroxyl groups, two carboxyl groups and one hydroxyl group, one carboxyl group and three hydroxyl groups, or three carboxyl groups and one hydroxyl group can be used to create branched structures. Non-limiting examples of such monomers include 2,3 dihydroxy propionic acid, 2,3 dihydroxy 2-methyl propionic acid, 2,2 dihydroxy propionic acid, 2,2-bis(hydroxymethyl) propionic acid, and the like.

The branched copolyester polymer can be conventionally polymerized from a monomer mixture containing a chain extender selected from the group of a hydroxy carboxylic acid, a lactone of a hydroxy carboxylic acid, and a combination thereof; and one or more branching monomers. Some of the suitable hydroxy carboxylic acids include glycolic acid, lactic acid, 3-hydroxypropionic acid, 3-hydroxybutyric acid, 3-hydroxyvaleric acid, and hydroxypyvalic acid. Some of the suitable lactones include caprolactone, valerolactone; and lactones of the corresponding hydroxy carboxylic acids, such as, e.g., 3-hydroxypropionic acid, 3-hydroxybutyric acid, 3-hydroxyvaleric acid, and hydroxypyvalic acid. In certain embodiments, caprolactone can is utilized. In embodiments, the branched copolyester polymer can be produced by polymerizing, in one step, the monomer mixture that includes the chain extender and hyper branching monomers, or by first polymerizing the hyper branching monomers followed by polymerizing the chain extenders. It is to be appreciated that the branched copolyester polymer can be formed from acrylic core with extending monomers described above.

The polyester-polyurethane polymer can be produced from the polyester and polyisocyanates. The polyester can be polymeric or oligomeric organic species with at least two hydroxyl-functionalities or two-mercapto functionalities and their mixtures thereof. Polyesters and polycarbonates with terminal hydroxy groups can be effectively used as the diols.

The polyurethane polymers may be produced by reacting polyisocyanate(s) with polyol(s) in the excess. In certain embodiments, low molar mass polyols defined by an empirical and structural formula, such as polyhydric alcohols are utilized to form the polyurethane polymer. Non-limiting examples of polyhydric alcohols include ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, polyethylene glycol and polypropylene glycol. In other embodiments, oligomeric or polymeric polyols with number-average molar masses of, for example, up to 8000, alternatively up to 5000, alternative up to 2000, and/or, for example, corresponding hydroxyl-functional polyethers, polyesters or polycarbonates are utilized to form the polyurethane polymer.

Non-limiting examples of suitable polyisocyanates include aromatic, aliphatic or cycloaliphatic di-, tri- or tetra-isocyanates, including polyisocyanates having isocyanurate structural units, such as, the isocyanurate of hexamethylene diisocyanate and isocyanurate of isophorone diisocyanate; the adduct of two molecules of a diisocyanate, such as, hexamethylene diisocyanate and a diol such as, ethylene glycol; uretidiones of hexamethylene diisocyanate; uretidiones of isophorone diisocyanate or isophorone diisocyanate; the adduct of trimethylol propane and meta-tetramethylxylene diisocyanate. Other polyisocyanates disclosed herein can also be suitable for producing polyurethanes.

Aqueous polyurethane binders and their production are well known to the skilled person. Typical and useful non-limiting examples of aqueous polyurethane binders comprise aqueous polyurethane binder dispersions which can typically be made by first forming an NCO-functional hydrophilic polyurethane prepolymer by addition reaction of polyol type compounds and polyisocyanates, conversion of the so-formed polyurethane prepolymer into the aqueous phase and then reacting the aqueously dispersed NCO-functional polyurethane prepolymer with an NCO-reactive chain extender like, for example, a polyamine, a hydrazine derivative or water. Such aqueous polyurethane binder dispersions as have been used as binders in waterborne base coat compositions as are conventional in the production of base coat/clear coat two-layer coatings of car bodies and body parts can be used in coating composition A; non-limiting examples of aqueous polyurethane binder dispersions which can be used in coating composition A can be found in U.S. Pat. Nos. 4,851,460, 5,342,882 and US 2010/0048811 A1, which are expressly incorporated herein by reference.

One non-limiting example of a polyester-polyurethane polymer is a polyurethane dispersion resin formed from a linear polyester diol resin (reaction product of monomers 1,6-hexanediol, adipic acid, and isophthalic acid) and isophorone diisocyanate. This polyester-polyurethane polymer has a weight average molecular weight of about 30,000, a solids content of about 35 wt. %, and a particle size of about 250 nanometers.

Another non-limiting example of a polyester-polyurethane polymer is a polyurethane dispersion resin formed from a linear polycarbonate-polyester and isophorone diisocyanate. This polyester-polyurethane polymer has a weight average molecular weight of about 75,000, a solids content of about 35 wt. %, and a particle size of about 180 nanometers.

In certain embodiments, the coating composition including the polyester-polyurethane polymer may exhibit an increase in the elasticity of the coating composition as compared to a coating composition free of the polyester-polyurethane polymer. An increase in elasticity of the coating composition may improve suitability of the coating composition for application to the substrate 10 utilizing the high transfer efficiency applicator 12 by increasing relaxation time of the coating composition. In various embodiments, the polyester-polyurethane polymer having the weight average molecular weight of 75,000, when included in the coating composition, increases the relaxation time of the coating composition as compared to a coating composition including the polyester-polyurethane polymer having the weight average molecular weight of 30,000. It is to be appreciated that the relationship of increasing weight average molecular weight to increasing relaxation time of the coating composition may not be limited to polyester-polyurethane polymers. For example, polymers having weight average molecular weights of at least 300,000, when incorporated into the coating composition, may result in the coating composition exhibiting an increased relaxation time relative to a coating composition including the polymer with a weight average molecular weights of less than 300,000. It is further to be appreciated that incorporation of at least minor concentrations of high molecular weight polymers (e.g., at least 300,000) in the coating composition may be used to improve suitability of the coating composition by at least minimizing the formation of satellite droplet.

The coating composition may include the polyester-polyurethane polymer in an amount of from about 0.1 to about 50, alternatively from about 1 to about 20, or alternatively from about 1 to about 10, wt. %, based on a total weight of the coating composition. In exemplary embodiments, the coating composition includes a polyester-polyurethane polymer having the tradename Bayhydrol® U 241 which is commercially available from Covestro AG of Leverkusen, Germany.

The latex polymers, such as aqueous (meth)acryl copolymer latex binders and their production, are well known to the skilled person. Aqueous (meth)acryl copolymer latex binders can typically be made by free-radical emulsion copolymerization of olefinically unsaturated free-radically copolymerizable comonomers. For example, WO2006/118974 A1, WO2008/124136 A1, WO2008/124137 A1 and WO2008/124141 A1, which are expressly incorporated herein by reference, disclose aqueous (meth)acryl copolymer latex binders and their use as binders in waterborne base coat compositions as are conventional in the production of base coat/clear coat two-layer coatings of car bodies and body parts. The aqueous (meth)acryl copolymer latex binders disclosed in WO2006/118974 A1, WO2008/124136 A1, WO2008/124137 A1 and WO2008/124141 A1, which are expressly incorporated herein by reference, are non-limiting examples of aqueous (meth)acryl copolymer latex binders which can be used in the coating composition.

Melamine resins may be partially or fully etherified with one or more alcohols like methanol or butanol. A non-limiting example is hexamethoxymethyl melamine. Non-limiting examples of suitable melamine resins include monomeric melamine, polymeric melamine-formaldehyde resin, or a combination thereof. The monomeric melamines include low molecular weight melamines which contain, on an average, three or more methylol groups etherized with a $C_1$ to $C_5$ monohydric alcohol such as methanol, n-butanol, or isobutanol per triazine nucleus, and have an average degree of condensation up to about 2 and, in certain embodiments, in the range of from about 1.1 to about 1.8, and have a proportion of mononuclear species not less than about 50 percent by weight. By contrast the polymeric melamines have an average degree of condensation of more than about 1.9. Some such suitable monomeric melamines include alkylated melamines, such as methylated, butylated, isobutylated melamines and mixtures thereof. Many of these suitable monomeric melamines are supplied commercially. For example, Cytec Industries Inc., West Patterson, N.J. supplies Cymel® 301 (degree of polymerization of 1.5, 95% methyl and 5% methylol), Cymel® 350 (degree of polymerization of 1.6, 84% methyl and 16% methylol), 303, 325, 327, 370 and XW3106, which are all monomeric melamines. Suitable polymeric melamines include high amino (partially alkylated, —N, —H) melamine known as Resimene® BMP5503 (molecular weight 690, polydispersity of 1.98, 56% butyl, 44% amino), which is supplied by Solutia Inc., St. Louis, Mo., or Cymel®1158 provided by Cytec Industries Inc., West Patterson, N.J. Cytec Industries Inc. also supplies Cymel® 1130@80 percent solids (degree of polymerization of 2.5), Cymel® 1133 (48% methyl, 4% methylol and 48% butyl), both of which are polymeric melamines.

The coating composition may include the melamine resin in an amount of from about 0.1 to about 50, alternatively from about 1 to about 20, or alternatively from about 1 to about 10, wt. %, based on a total weight of the coating composition. In exemplary embodiments, the coating composition includes a melamine-formaldehyde resin having the tradename Cymel® 303 which is commercially available from Cytec Industries Inc. of West Patterson, N.J.

The binder of the coating composition may further include a crosslinking agent that can react with the crosslinkable-functional groups of the polymers of the binder, to form a crosslinked polymeric network, herein referred to as a crosslinked network. It is to be appreciated that the crosslinking agent is not necessary in all coating compositions, but may be utilized in the coating composition to improve inter-coat adhesion, such as between the basecoat and the clearcoat, and for curing, such as within the clearcoat.

The term "crosslinking agent" refers to a component having "crosslinking-functional groups" that are functional groups positioned in each molecule of the compounds, oligomer, polymer, the backbone of the polymer, pendant from the backbone of the polymer, terminally positioned on the backbone of the polymer, or a combination thereof, wherein these functional groups are capable of crosslinking with the crosslinkable-functional groups (during the curing step) to produce a coating in the form of crosslinked structures. One of ordinary skill in the art would recognize that certain combinations of crosslinking-functional group and crosslinkable-functional groups would be excluded, since they would fail to crosslink and produce the film forming crosslinked structures. The coating composition may include more than one type of crosslinking agent that have the same or different crosslinking-functional groups. Typical crosslinking-functional groups can include hydroxyl, thiol, isocyanate, thioisocyanate, acetoacetoxy, carboxyl, primary amine, secondary amine, epoxy, anhydride, ketimine, aldimine, orthoester, orthocarbonate, cyclic amide, or combinations thereof.

Polyisocyanates having isocyanate-functional groups may be utilized as the crosslinking agent to react with the crosslinkable-functional groups, such as hydroxyl-functional groups and amine-functional groups. In certain embodiments, only primary and secondary amine-functional groups may be reacted with the isocyanate-functional groups. Suitable polyisocyanate can have on average 2 to 10, alternately 2.5 to 8, or alternately 3 to 8, isocyanate functionalities. Typically, the coating composition has a ratio of isocyanate-functional groups on the polyisocyanate to crosslinkable-functional group (e.g., hydroxyl and/or amine groups), of from about 0.25:1 to about 3:1, alternatively from about 0.8:1 to about 2:1, or alternatively from about 1:1 to about 1.8:1. In other embodiments, melamine compounds having melamine-functional groups may be utilized as the crosslinking agent to react with the crosslinkable-functional groups.

Non-limiting examples of suitable polyisocyanates include any of the conventionally used aromatic, aliphatic or cycloaliphatic di-, tri- or tetra-isocyanates, including polyisocyanates having isocyanurate structural units, such as, the isocyanurate of hexamethylene diisocyanate and isocyanurate of isophorone diisocyanate; the adduct of 2 molecules of a diisocyanate, such as, hexamethylene diisocyanate; uretidiones of hexamethylene diisocyanate; uretidiones of isophorone diisocyanate or isophorone diisocyanate; isocyanurate of meta-tetramethylxylylene diisocyanate; and a diol such as, ethylene glycol.

Polyisocyanate-functional adducts having isocyanaurate structural units can also be used, for example, the adduct of 2 molecules of a diisocyanate, such as, hexamethylene diisocyanate or isophorone diisocyanate, and a diol such as ethylene glycol; the adduct of 3 molecules of hexamethylene diisocyanate and 1 molecule of water (commercially available from Bayer Corporation of Pittsburgh, Pennsylvania under the trade name Desmodur® N); the adduct of 1 molecule of trimethylol propane and 3 molecules of toluene diisocyanate (commercially available from Bayer Corporation of Pittsburgh, Pennsylvania under the trade name Desmodur® L); the adduct of 1 molecule of trimethylol propane and 3 molecules of isophorone diisocyanate or compounds, such as 1,3,5-triisocyanato benzene and 2,4,6-triisocyanatotoluene; and the adduct of 1 molecule of pentaerythritol and 4 molecules of toluene diisocyanate.

The coating composition may include monomeric, oligomeric, or polymeric compounds that are curable by ultraviolet (UV), electron beam (EB), laser, and the like. Placement of a UV, EB, or laser source on the high transfer efficiency applicator 12 may result in direct photo initiation of each droplet that is applied to the substrate 10 by the high transfer efficiency applicator 12. The increase in use of monomers relative to polymers can increase the curable solids of the coating composition without increasing the viscosity of the coating composition thereby reducing the volatile organic carbons (VOCs) released into the environment. However, the increase in use of monomers relative to polymers may impact one or more properties of the coating composition. Adjustment of the properties of the coating composition may be necessary to render the coating composition suitable for application utilizing the high transfer efficiency applicator 12 including, but not limited to, viscosity ($\eta_0$), density ($\rho$), surface tension ($\sigma$), and relaxation time ($\lambda$). Further, adjustment of properties of the high transfer efficiency applicator 12 may be necessary to render the high transfer efficiency applicator 12 suitable for application, including, but not limited to, nozzle diameter (D) of the high transfer efficiency applicator 12, impact velocity (v) of the coating composition by the high transfer efficiency applicator 12, speed of the high transfer efficiency applicator 12, distance of the high transfer efficiency applicator 12 from the substrate 10, droplet size of the coating composition by the high transfer efficiency applicator 12, firing rate of the high transfer efficiency applicator 12, and orientation of the high transfer efficiency applicator 12 relative to the force of gravity.

A coating composition for application to a substrate 10 utilizing a high transfer efficiency applicator is provided herein. The coating composition includes monomeric, oligomeric, or polymeric compounds having a number average molecular weight of from about 400 to about 20,000 and having a free-radically polymerizable double bond. The coating composition includes a photo initiator. The coating composition has an Ohnesorge number (Oh) of from about 0.01 to about 12.6. The coating composition has a Reynolds number (Re) of from about 0.02 to about 6,200. The coating composition has a Deborah number (De) of from greater than 0 to about 1730.

The coating composition may include the monomeric, oligomeric, or polymeric compounds in an amount of from about 20 wt. % to about 90 wt. % based on a total weight of the coating composition. The coating composition may include the photo initiator in an amount of from about 0.1 wt. % to about 2 wt. % based on a total weight of the coating composition. It is to be appreciated that the coating composition including the monomeric, oligomeric, or polymeric compounds may have up to 100% solids content based on a total weight of the coating composition.

The high transfer efficiency applicator is configured to receive the coating composition from the reservoir and configured to expel the coating composition through the nozzle orifice 72 to the substrate 10 to form a coating layer. The coating layer may be formed in the presence of high-energy radiation. The high-energy radiation may be generated by a device configured to generate ultra violet light, a laser, an electron beam, or combinations thereof. The device may be coupled to the high transfer efficiency applicator and configured to direct the high-energy radiation toward the coating composition after expulsion through the nozzle orifice 72 of the high transfer efficiency applicator.

The coating compositions are waterborne, and include about 40 wt % to about 90 wt % water, alternatively about 40 wt % to about 70 wt % water, based on the total weight of the composition. The film forming component of the coating composition can include any UV curable water-dispersible or latex polymer. A "latex" polymer means a dispersion of polymer particles in water; a latex polymer typically requires a secondary dispersing agent (e.g., a surfactant) for creating a dispersion or emulsion of polymer particles in water. A "water-dispersible" polymer means the polymer is itself capable of being dispersed into water (i.e., without requiring the use of a separate surfactant) or water can be added to the polymer to form a stable aqueous dispersion (i.e., the dispersion should have at least one month shelf stability at normal storage temperatures). Such water-dispersible polymers can include nonionic or anionic functionality on the polymer, which assist in rendering them water-dispersible. For such polymers, external acids or bases are typically required for anionic stabilization.

Suitable UV curable polymers include, but are not limited to, polyurethanes, epoxies, polyamides, chlorinated polyolefins, acrylics, oil-modified polymers, polyesters, and mixtures or copolymers thereof. The UV curable polymers in the coating composition can include a wide variety of functional groups to modify their properties for a particular application, including, for example, acetoacetyl, (meth)acryl (wherein "(meth)acryl" refers to any of methacryl, methacrylate, acryl or acrylate), vinyl, vinyl ether, (meth)allyl ether (wherein (meth)allyl ether refers to an allyl ether and a methallyl ether), or mixtures thereof.

Acetoacetyl functionality may be incorporated into the UV curable polymer through the use of: acetoacetoxyethyl acrylate, acetoacetoxypropyl methacrylate, allyl acetoacetate, acetoacetoxybutyl methacrylate, 2,3-di(acetoacetoxy) propyl methacrylate, 2-(acetoacetoxy)ethyl methacrylate, t-butyl acetoacetate, diketene, and the like, or combinations thereof. In general, any polymerizable hydroxy functional or other active hydrogen containing monomer can be converted to the corresponding acetoacetyl functional monomer by reaction with diketene or other suitable acetoacetylating agent (see, e.g., Comparison of Methods for the Preparation of Acetoacetylated Coating Resins, Witzeman, J. S.; Dell Nottingham, W.; Del Rector, F. J. Coatings Technology; Vol. 62, 1990, 101 (and references contained therein)). In coating compositions, the acetoacetyl functional group is incorporated into the polymer via 2-(acetoacetoxy)ethyl methacrylate, t-butyl acetoacetate, diketene, or combinations thereof.

Coating compositions may incorporate a free radically polymerizable component that includes at least one ingredient including free radically polymerizable functionality. Representative examples of free radically polymerizable functionality that is suitable include (meth)acrylate groups, olefinic carbon-carbon double bonds, allyloxy groups, alpha-methyl styrene groups, (meth)acrylamide groups, cyanate ester groups, (meth)acrylonitrile groups, vinyl ethers groups, combinations of these, and the like. The term "(meth)acryl", as used herein, encompasses acryl and/or methacryl unless otherwise expressly stated. Acryl moieties are may be utilized relative to methacryl moieties in many instances, as acryl moieties tend to cure faster.

Prior to initiating curing, free radically polymerizable groups may provide compositions with relatively long shelf life that resist premature polymerization reactions in storage. At the time of use, polymerization can be initiated on demand with good control by using one or more suitable curing techniques. Illustrative curing techniques include but are not limited to exposure to thermal energy; exposure to one or more types of electromagnetic energy such as visible light, ultraviolet light, infrared light, or the like; exposure to acoustic energy; exposure to accelerated particles such as e-beam energy; contact with chemical curing agents such as by using peroxide initiation with styrene and/or a styrene mimetic; peroxide/amine chemistry; combinations of these; and the like. When curing of such functionality is initiated, crosslinking may proceed relatively rapidly so resultant coatings develop early green strength. Such curing typically proceeds substantially to completion under wide range of conditions to avoid undue levels of leftover reactivity.

In addition to free radically polymerizable functionality, the free radically polymerizable ingredient(s) incorporated into the free radically polymerizable component may include other kinds of functionality, including other types of curing functionality, functionality to promote particle dispersion, adhesion, scratch resistance, chemical resistance, abrasion resistance, combinations of these, and the like. For example, in addition to free radically polymerizable functionality, the free radically polymerizable ingredient(s) may also include additional crosslinkable functionality to allow the composition to form an interpenetrating polymer network upon being cured. One example of such other crosslinkable functionality includes OH and NCO groups, which are co-reactive to form urethane linkages. The reaction between OH and NCO often may be promoted by using a suitable crosslinking agent and catalyst. To help disperse particle additives, particularly ceramic particles, the ingredient(s) of the free radically polymerizable component may include pendant dispersant moieties such as acid or salt moieties of sulfonate, sulfate, phosphonate, phosphate, carboxylate, (meth)acrylonitrile, ammonium, quaternary ammonium, combinations of these, and the like. Other functionality can be selected to promote adhesion, gloss, hardness, chemical resistance, flexibility, and the like. Examples include epoxy, slime, siloxane, alkoxy, ester, amine, amide, urethane, polyester; combinations of these, and the like.

The one or more free radically polymerizable ingredients incorporated into the free radically polymerizable component may be aliphatic and/or aromatic. For outdoor applications, aliphatic materials tend to show better weatherability.

The one or more free radically polymerizable ingredients incorporated into the free radically polymerizable component may be linear, branched, cyclic, fused, combinations of these, or the like. For instance, branched resins may be utilized in some instances, as these resins may tend to have lower viscosity than linear counterparts of comparable molecular weight In those embodiments in which the coating compositions are fluid dispersions, the free radically polymerizable component may function as at least a portion of the fluid carrier for particulate ingredients of the compositions. The coating compositions are as solvent-free as practical such that the radiation curable component functions as substantially the entirety of the fluid carrier. Some free radically polymerizable ingredients may, by themselves, exist as solids at room temperature, but tend to be readily soluble in one or more of the other ingredients used to provide the free radically polymerizable component. When cured, the resultant matrix serves as a binder for the other ingredients of the composition.

Illustrative embodiments of radiation curable components desirably include a reactive diluent comprising one or more free radically polymerizable ingredients that have a weight average molecular weight under about 750, alternatively in the range from about 50 to about 750, alternatively from about 50 to about 500. The reactive diluent functions as a diluent, as an agent to reduce the viscosity of the coating composition, as a coating binder/matrix when cured, as crosslinking agents, and/or the like.

The radiation curable component also optionally includes at least one free radically polymerizable resin in admixture with the reactive diluent. Generally, if the molecular weight of a resin is too large, the compositions may tend to be too viscous for easy handling. This also can impact the appearance of the resultant coating. On the other hand, if the molecular weight is too low, the toughness or resilience of the resultant compositions may suffer. It also can be more difficult to control film thickness, and the resultant coatings may tend to be more brittle than desired. Balancing these concerns, the term resin generally encompasses free radically polymerizable materials having a weight average molecular weight of about 750 or greater, alternatively from about 750 to about 20,000, alternatively about 750 to about 10,000, alternatively about 750 to about 5000, and alternatively about 750 to about 3000. Often, such one or more resins if solid by themselves at about room temperature are soluble in the reactive diluent so that the radiation curable component is a single, fluid phase. As used herein, molecular weight refers to weight average molecular weight unless otherwise expressly stated.

Desirably, the reactive diluent includes at least one ingredient that is mono functional with respect to free radically polymerizable functionality, at least one ingredient that is disfunctional with respect to free radically polymerizable functionality, and at least one ingredient that is trifunctional or higher functionality with respect to free radically polymerizable functionality. Reactive diluents including this combination of ingredients help to provide cured coatings with excellent abrasion resistance while maintaining high levels of toughness.

Representative examples of monofunctional, free radically polymerizable ingredients suitable for use in the reactive diluent include styrene, alpha-methylstyrene, substituted styrene, vinyl esters, vinyl ethers, lactams such as N-vinyl-2-pyrrolidone, (meth)acrylamide, N-substituted (meth)acrylamide, octyl(meth)acrylate, nonylphenol ethoxylate(meth)acrylate, isononyl(meth)acrylate, 1,6-hexanediol(meth)acrylate, isobornyl(meth)acrylate, 2-(2-ethoxyethoxy)ethyl(meth)acrylate, 2-ethylhexyl(meth)acrylate, lauryl(meth)acrylate, beta-carboxyethyl(meth)acrylate, isobutyl(meth)acrylate, cycloaliphatic epoxide, alpha-epoxide, 2-hydroxyethyl(meth)acrylate, (meth)acrylonitrile, maleic anhydride, itaconic acid, isodecyl(meth)acrylate, dodecyl(meth)acrylate, n-butyl(meth)acrylate, methyl (meth)acrylate, hexyl(meth)acrylate, (meth)acrylic acid, N-vinylcaprolactam, stearyl(meth)acrylate, hydroxy functional caprolactone ester(meth)acrylate, octodecyl(meth)acrylate, isooctyl(meth)acrylate, hydroxyethyl(meth)acrylate, hydroxymethyl(meth)acrylate, hydroxypropyl(meth)

acrylate, hydroxyisopropyl(meth)acrylate, hydroxybutyl (meth)acrylate, hydroxyisobutyl(meth)acrylate, tetrahydrofurfuryl(meth)acrylate, combinations of these, and the like. If one or more of such monofunctional monomers are present, these may comprise from 0.5 to about 50, alternatively 0.5 to 35, and alternatively from about 0.5 to about 25 weight percent of the radiation curable component based on the total weight of the free radically polymerizable component.

In some embodiments, a monofunctional component of the reactive diluent includes a lactam having pendant free radically polymerizable functionality and at least one other ingredient that is monofunctional with respect to free radical polymerizability. At least one of such additional monofunctional ingredients has a weight average molecular weight in the range of from about 50 to about 500. The weight ratio of the lactam to the one or more other monofunctional ingredients desirably is in the range from about 1:50 to 50:1, alternatively 1:20 to 20:1, alternatively about 2:3 to about 3:2. In one illustrative embodiment, using N-vinyl-2-pyrrolidone and octodecylacrylate at a weight ratio of about 1:1 would provide a suitable monofunctional component of the reactive diluent.

The di, tri, and/or higher functional constituents of the reactive diluent help to enhance one or more properties of the cured composition, including crosslink density, hardness, abrasion resistance, chemical resistance, scratch resistance, or the like. In many embodiments, these constituents may include from 0.5 to about 50, alternatively 0.5 to 35, and alternatively from about 0.5 to about 25 weight percent of the free radically polymerizable component based on the total weight of the free radically polymerizable component. Examples of such higher functional, radiation curable monomers include ethylene glycol di(meth)acrylate, hexanediol di(meth)acrylate, triethylene glycol di(meth)acrylate, tetraethylene glycol di(meth)acrylate, trimethylolpropane tri(meth)acrylate (TMPTA), ethoxylated trimethylolpropane tri(meth)acrylate, glycerol tri(meth)acrylate, pentaerythritol tri(meth)acrylate, pentaerythritol tetra(meth)acrylate, and neopentyl glycol di(meth)acrylate, 1,6 hexanediol di(meth) acrylate, dipentaerythritol penta(meth)acrylate, combinations of these, and the like. Additional free radically polymerizable monomers that would be suitable include those described in PCT Publication No. WO 02/077109.

In many embodiments, it is desirable if the reactive diluent includes at least one trifunctional or higher functionality material having a molecular weight in the range from about 50 to about 500 to promote abrasion resistance. The amount of such trifunctional or higher functionality materials used in the reactive diluent may vary over a wide range. In many desirable embodiments, at least about 15 weight percent, alternatively at least about 20 weight percent, at least about 25 weight percent, and even at least 45 weight percent of the reactive diluent is at least trifunctional or higher with respect to free radically polymerizable functionality based upon the total weight of the reactive diluent. These desirable embodiments incorporate an atypically high amount of tri- or higher functionality for increased crosslink density and corresponding high hardness and scratch resistance, but yet show excellent toughness.

Generally, one would expect that using so much crosslink density would obtain high hardness and scratch resistance at too much expense in terms of toughness and/or resilience. The conventional expectation would be that the resultant compositions to be too brittle to be practical. However, a relatively large content of tri- or higher functionality can be incorporated in the reactive diluent while still maintaining very good levels of toughness and resilience. As discussed below, in some embodiments the diluent materials may be combined along with performance enhancing free radically polymerizable resins, and various selected particles, including ceramic particles, organic particles, certain other additives, and combinations thereof.

The resultant free radically polymerizable components also have rheological properties to support relatively substantial particle distributions. This means that the free radically polymerizable component can be loaded to very high levels with particles and other additives that help to promote desirable characteristics such as scratch resistance, toughness, durability, and the like. In many embodiments, the composite mixture of the free radically polymerizable materials and the particle components may have pseudoplastic and thixotropic properties to help control and promote smoothness, uniformity, aesthetics, and durability of the resultant cured compositions. In particular, the desirable thixotropic properties help reduce particle settling after application. In other words, the free radically polymerizable component provides a carrier in which the particle distribution remains very stable during storage and after being applied onto a substrate 10. This stability includes helping to maintain particles at the composition surface to a large extent after application to a substrate 10. By maintaining particle populations at the surface, high scratch resistance at the surface is maintained.

In some embodiments, at least one of the constituents of the reactive diluent optionally includes epoxy functionality in addition to free radically polymerizable functionality. In an illustrative embodiment, a diacrylate ingredient with a weight average molecular weight of about 500 to 700 and including at least one backbone moiety derived from epoxy functionality is incorporated into the reactive diluent. One example of such a material is commercially available under the trade designation CN120 from Sartomer Co., Inc. A blend containing 80 parts by weight of this oligomer with 20 parts by weight of TMPTA is also available from this source under the trade designation CN120C80. In some embodiments, using from about 1 to about 25, alternatively about 8 to 20 parts by weight of this oligomer per about 1 to about 50 parts by weight, alternatively 5 to 20 parts by weight of the monofunctional constituents of the reactive diluent would be suitable. In an exemplary embodiment, using about 15 to 16 parts by weight of the CN120-80 admixture per about 12 parts by weight of monofunctional ingredients would be suitable.

In addition to the reactive diluent, a free radically polymerizable component may include one or more free radically polymerizable resins. When the free radically polymerizable component includes one or more free radically polymerizable resins, the amount of such resins incorporated into the compositions may vary over a wide range. As general guidelines the weight ratio of the free radically polymerizable resin(s) to the reactive diluent often may be in the range from about 1:20 to about 20:1, alternatively 1:20 to 1:1, alternatively 1:4 to 1:1, and alternatively about 1:2 to 1:1.

In illustrative embodiments, the free radically polymerizable resin component desirably includes one or more resins such as (meth)acrylated urethanes (i.e., urethane (meth)acrylates), (meth)acrylated epoxies (i.e., epoxy (meth)acrylates), (meth)acrylated polyesters (i.e., polyester (meth)acrylates), (meth)acrylated(meth)acrylics, (meth) acrylated silicones, (meth)acrylated amines, (meth)acrylated amides; (meth)acrylated polysulfones; (meth)acrylated polyesters, (meth)acrylated polyethers (i.e., polyether (meth)acrylates), vinyl(meth)acrylates, and (meth)acrylated oils. In practice, referring to a resin by its class (e.g., polyurethane, polyester, silicone, etc.) means that the resin includes at least one moiety characteristic of that class even if the resin includes moieties from another class. Thus, a polyurethane resin includes at least one urethane linkage but also might include one or more other kinds of polymer linkages as well.

Representative examples of free radically polymerizable resin materials include radiation curable (meth)acrylates, urethanes and urethane (meth)acrylates (including aliphatic polyester urethane (meth)acrylates) such as the materials described in U.S. Pat. Nos. 5,453,451, 5,773,487 and 5,830, 937. Additional free radically polymerizable resins that would be suitable include those described in PCT Publication No. WO 02/077109. A wide range of such materials are commercially available.

Embodiments of the resin component include at least a first free radically polymerizable polyurethane resin that has a glass transition temperature (Tg) of at least 50° C. and is at least trifunctional, alternatively at least tetrafunctional, alternatively at least pentafunctional, and alternatively at least hexafunctional with respect to free radically polymerizable functionality. This first resin desirably has a Tg of at least about 60° C., alternatively at least about 80° C., and alternatively at least about 100° C. In one mode of practice, a free radically polymerizable urethane resin having a Tg of about 50° C. to 60° C., and that is hexavalent with respect to (meth)acrylate functional would be suitable. An exemplary embodiment of such a hexafunctional resin is commercially available under the trade designation Genomer 4622 from Rahn.

In some embodiments, the first resin is used in combination with one or more other kinds of resins. Optionally, at least one of such other resins is also free radically polymerizable. For example, some embodiments incorporate the first resin in combination with at least a second free radically polymerizable resin that can be mono or multifunctional with respect to free radically polymerizable moieties. If present, the second free radically polymerizable resin can have a Tg over a wide range, such as from −30° C. to 120° C. In some embodiments, the second resin has a Tg of less than 50° C., alternatively less than about 30° C., and alternatively than about 10° C. Many embodiments of the second resin are polyurethane materials. An exemplary embodiment of such a resin is commercially available under the trade designation Desmolux U500 (formerly Desmolux XP2614) from Bayer MaterialScience AG.

Resins can be selected to achieve desired gloss objectives. For example, formulating a composition with a first free radically polymerizable resin having a relatively high Tg over about 50° C. in combination with an optional second free radically polymerizable resin having a relatively low Tg, such as below about 30° C., is helpful to provide coatings with mid-range gloss (e.g., about 50 to about 70) or high-range gloss (greater than about 70). Formulating with only one or more free radically polymerizable resins having a relatively higher Tg tends to be helpful to provide coatings with lower gloss (e.g., below about 50).

The weight ratio of the first and second resins may vary over a wide range. To provide coatings with excellent abrasion resistance and toughness with respect to embodiments in which the Tg of the second resin is under about 50° C., it is desirable if the ratio of the second, lower Tg resin to the first, higher Tg resin is in the range from about 1:20 to 20:1, alternatively less than 1:1, such as in the range from about 1:20 to about 1:1, alternatively about 1:20 to about 4:5, or alternatively about 1:20 to about 1:3. In one illustrative embodiment, a weight ratio of about 9:1 would be suitable.

An exemplary embodiment of a free radically polymerizable component comprising a reactive diluent with an atypically high content of trifunctional or higher functionality includes from about 1 to about 10, alternatively about 4 to about 8 parts by weight of a lactam such as N-vinyl-2-pyrrolidone, about 1 to about 10, alternatively about 2 to about 8 parts by weight of another monofunctional material having a molecular weight under about 500 such as octodecyl acrylate, about 5 to about 25, alternatively about 7 to about 30 parts by weight of a difunctional reactive diluent such as 1,6-hexane diacrylate; about 1 to about 8, alternatively about 2 to 5 parts by weight of a trifunctional reactive diluent having a molecular weight under about 500 such as trimethylol propane triacrylate TMPTA, about 1 to about 20 parts by weight of a trifunctional oligomer having a molecular weight in the range from about 500 to about 2000, about 1 to about 40 parts by weight of a difunctional oligomer having epoxy functionality and a molecular weight in the range from about 500 to about 2000, about 1 to about 15 parts by weight of the first resin, and about 1 to about 15 parts by weight of the second resin.

In alternative embodiments, the coating includes a first coat which provides a colored illustration, such as a pattern, by the application of colored coatings with the aid of the high transfer efficiency applicator. A second, transparent coat consisting of one or more covering layers (or top coats) is superposed on this first coat for the purpose of protecting said first, colored coat.

In an embodiment, coating compositions are employed, including, for example, pigments, oligomers, reactive diluents and other additives familiar to the person skilled in the art. Suitable pigments are, for example, Pigment Yellow 213, PY 151, PY 93, PY 83, Pigment Red 122, PR 168, PR 254, PR 179, Pigment Red 166, Pigment Red 48:2, Pigment Violet 19, Pigment Blue 15:1, Pigment Blue 15:3, Pigment Blue 15:4, Pigment Green 7, Pigment Green 36, Pigment Black 7 or Pigment White 6. Suitable oligomers are, for example, aliphatic and aromatic urethane acrylates, polyether acrylates and epoxyacrylates, which acrylates may optionally be monofunctional or polyfunctional, e.g. difunctional, trifunctional to hexafunctional, and decafunctional. Suitable reactive diluents are, for example, dipropylene glycol diacrylate, tripropylene glycol diacrylate, tetrahydrofurfuryl acrylate, isobornyl acrylate and isodecyl acrylate. Further additives may be added to the inks for adjustment of their properties, such as, for example, dispersant additives, antifoams, photoinitiators, and UV absorbers.

In an embodiment, covering layers are employed. Suitable covering layers are, for example, products based on single-component (1K) or two-component (2K) isocyanate cross-linking systems (polyurethanes) or based on 1K or 2K epoxy systems (epoxy resins). In certain embodiments, 2K systems are employed. The covering layer employed according to the invention can be transparent or translucent.

In two-component isocyanate crosslinking systems, isocyanates such as, for example, oligomers based on hexamethylene diisocyanate (HDI), diphenylmethane diisocyanate (MDI), isophorone diisocyanate (IPDI), or toluidine diisocyanate (TDI), e.g. isocyanurates, biuret, allophanates, and adducts of the isocyanates mentioned with polyhydric alcohols and mixtures thereof are employed as the curing component. Polyols such as, for example, OH group-containing polyesters, polyethers, acrylates and polyurethane, and mixtures thereof, are employed as the binding component, which polyols may be solvent-based, solvent-free, or water-dilutable.

In two-component epoxy systems, epoxy resins such as, for example, glycidyl ethers of bisphenols such as bisphenol A or bisphenol F and epoxidized aliphatic parent substances, and mixtures thereof, are employed as the binding component. NH-functional substances such as, for example, amines, amides and adducts of epoxy resins and amines, and mixtures thereof, are employed as the curing component.

In the case of polyol-containing binders, customary commercial isocyanate curing agents and in the case of epoxy resin-containing binders, NH-functional curing agents can be employed as the curing component.

The mixing ratios of the binder and curing components are selected such that the weights of the respective components, in each case based on the amount of substance of the reactive groups, are present in an OH:NCO or epoxy:NH ratio in the range of from 1:0.7 to 1:1.5, alternatively from 1:0.8 to 1:1.2 or alternatively 1:1.

A 3-layer coating can be employed in various industrial sectors. The basecoat is formed by primers that can be applied to wood, metal, glass, and plastics materials. Examples of suitable primers for use are products based on single-component (1K) or two-component (2K) isocyanate crosslinking systems (polyurethanes) or based on 1K or 2K epoxy systems (epoxy resins).

As introduced above, the coating composition may further include pigment. Any pigment known in the art for use in coating compositions may be utilized in the coating composition. Non-limiting examples of suitable pigments include metallic oxides, metal hydroxide, effect pigments including metal flakes, chromates, such as lead chromate, sulfides, sulfates, carbonates, carbon black, silica, talc, china clay, phthalocyanine blues and greens, organo reds, organo maroons, pearlescent pigments, other organic pigments and dyes, and combinations thereof. If desired, chromate-free pigments, such as barium metaborate, zinc phosphate, aluminum triphosphate and combinations thereof, can also be utilized.

Further non-limiting examples of suitable effect pigments include bright aluminum flake, extremely fine aluminum flake, medium particle size aluminum flake, and bright medium coarse aluminum flake; mica flake coated with titanium dioxide pigment also known as pearl pigments; and combinations thereof. Non-limiting examples of suitable colored pigments include titanium dioxide, zinc oxide, iron oxide, carbon black, mono azo red toner, red iron oxide, quinacridone maroon, transparent red oxide, dioxazine carbazole violet, iron blue, indanthrone blue, chrome titanate, titanium yellow, mono azo permanent orange, ferrite yellow, mono azo benzimidazolone yellow, transparent yellow oxide, isoindoline yellow, tetrachloroisoindoline yellow, anthanthrone orange, lead chromate yellow, phthalocyanine green, quinacridone red, perylene maroon, quinacridone violet, pre-darkened chrome yellow, thio-indigo red, transparent red oxide chip, molybdate orange, molybdate orange red, and combinations thereof.

As also introduced above, the coating composition may further include extender pigments. While extender pigments are generally utilized to replace higher cost pigments in coating compositions, the extender pigments as contemplated herein may increase shear viscosity of the coating composition as compared to a coating composition free of the extender pigments. An increase in shear viscosity of the coating composition may improve suitability of the coating composition for application to the substrate 10 utilizing the high transfer efficiency applicator 12. The extender pigment may have a particle size of from about 0.01 to about 44 microns. The extender pigment may have a variety of configurations including, but not limited to, nodular, platelet, acicular, and fibrous. Non-limiting examples of suitable extender pigments include whiting, barytes, amorphous silica, fumed silica, diatomaceous silica, china clay, calcium carbonate, phyllosilicate (mica), wollastonite, magnesium silicate (talc), barium sulfate, kaolin, and aluminum silicate.

The coating composition may include the extender pigment in an amount of from about 0.1 to about 50, alternatively from about 1 to about 20, or alternatively from about 1 to about 10, wt. %, based on a total weight of the coating composition. In certain embodiments, the coating composition includes magnesium silicate (talc), barium sulfate, or a combination thereof. In various embodiments, inclusion of barium sulfate as the extender pigment results in a coating composition having greater shear viscosity as compared to inclusion of talc as the extender pigment.

As also introduced above, the coating composition may further include dyes. Non-limiting examples of suitable dyes include triphenylmethane dyes, anthraquinone dyes, xanthene and related dyes, azo dyes, reactive dyes, phthalocyanine compounds, quinacridone compounds, and fluorescent brighteners, and combinations thereof. The coating composition may include the dye in an amount of from about 0.01 to about 5, alternatively from about 0.05 to about 1, or alternatively from about 0.05 to about 0.5, wt. %, based on a total weight of the coating composition. In certain embodiments, the coating composition includes a 10% black dye solution, such as Sol. Orasol Negro RL.

As also introduced above, the coating composition may further include rheology modifiers. Many different types of rheology modifiers can be used in coating compositions may be utilized in the coating composition. For example, a rheology modifier can be used that may increase rheology of the coating composition as compared to a coating composition free of the rheology modifier. An increase in rheology of the coating composition may improve suitability of the coating composition for application to the substrate 10 utilizing the high transfer efficiency applicator 12. Non-limiting examples of suitable rheology modifiers include urea-based compounds, laponite propylene glycol solutions, acrylic alkali emulsions, and combinations thereof. The coating composition may include the rheology modifier in an amount of from about 0.01 to about 5, alternatively from about 0.05 to about 1, or alternatively from about 0.05 to about 0.5, wt. %, based on a total weight of the coating composition. In certain embodiments, the coating composition includes the laponite propylene glycol solution, the acrylic alkali emulsion, or a combination thereof. The laponite propylene glycol solution includes a synthetic layered silicate, water, and polypropylene glycol. The synthetic layered silicate is commercially available from Altana AG of Wesel, Germany under the trade name Laponite RD. The acrylic alkali emulsion is commercially available from BASF Corporation of Florham Park, New Jersey under the tradename Viscalex® HV 30.

As also introduced above, the coating composition may further include organic solvents. In embodiments, the coating composition is a solventborne coating composition when the organic solvent content is greater than about 50 wt. %, alternatively greater than 60 wt. %, alternatively greater than 70 wt. %, alternatively greater than 80 wt. %, or alternatively greater than 90 wt. %, based on a total weight of liquid carrier in the coating composition. Non-limiting examples of suitable organic solvents can include aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate, and a combination thereof. In embodiments, the evaporation rate of the solvent may have an impact on the suitability of the coating composition for printing. Certain co-solvents may be incorporated into the coating composition having increased or decreased evaporation rates thereby increasing or decreasing the evaporation rate of the coating composition.

As also introduced above, the coating composition may further include water. In embodiments, the coating composition is a waterborne coating composition when the water content is greater than about 50 wt. %, alternatively greater than 60 wt. %, alternatively greater than 70 wt. %, alternatively greater than 80 wt. %, or alternatively greater than 90 wt. %, based on a total weight of liquid carrier in the coating composition. The coating composition may have a pH of from about 1 to about 14, alternatively from about 5 to about 12, or alternatively from about 8 to about 10.

As also introduced above, the coating composition may further include a catalyst. The coating composition may further include a catalyst to reduce curing time and to allow curing of the coating composition at ambient temperatures. The ambient temperatures are typically referred to as temperatures in a range of from 18° C. to 35° C. Non-limiting examples of suitable catalysts may include organic metal salts, such as, dibutyl tin dilaurate, dibutyl tin diacetate, dibutyl tin dichloride, dibutyl tin dibromide, zinc naphthenate; triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts and other catalysts, or a combination thereof. Non-limiting examples of suitable acid catalysts may include carboxylic acids, sulfonic acids, phosphoric acids or a combination thereof. In some embodiments, the acid catalyst can include, for example, acetic acid, formic acid, dodecyl benzene sulfonic acid, dinonyl naphthalene sulfonic acid, para-toluene sulfonic acid, phosphoric acid, or a combination thereof. The coating composition may include the catalysts in an amount of from about 0.01 to about 5, alternatively from about 0.05 to about 1, or alternatively from about 0.05 to about 0.5, wt. %, based on a total weight of the coating composition.

As also introduced above, the coating composition may further include conventional additives. The coating composition may further include an ultraviolet light stabilizer. Non-limiting examples of such ultraviolet light stabilizers include ultraviolet light absorbers, screeners, quenchers, and hindered amine light stabilizers. An antioxidant can also be added to the coating composition. Typical ultraviolet light stabilizers can include benzophenones, triazoles, triazines, benzoates, hindered amines and mixtures thereof. A blend of hindered amine light stabilizers, such as Tinuvin® 328 and Tinuvin®123, all commercially available from Ciba Specialty Chemicals of Tarrytown, New York, under the trade name Tinuvin®, can be utilized.

Non-limiting examples of suitable ultraviolet light absorbers include hydroxyphenyl benzotriazoles, such as, 2-(2-hydroxy-5-methylphenyl)-2H-benzotrazole, 2-(2-hydroxy-3,5-di-tert.amyl-phenyl)-2H-benzotriazole, 2[2-hydroxy-3,5-di(1,1-dimethylbenzyl)phenyl]-2H-benzotriazole, reaction product of 2-(2-hydroxy-3-tert.butyl-5-methyl propionate)-2H-benzotriazole and polyethylene ether glycol having a weight average molecular weight of 300, 2-(2-hydroxy-3-tert.butyl-5-iso-octyl propionate)-2H-benzotriazole; hydroxyphenyl s-triazines, such as, 2-[4((2,-hydroxy-3-dodecyloxy/tridecyloxypropyl)-oxy)-2-hydroxyphenyl]-4,6-bis(2,4-dimethylphenyl)-1,3,5-triazine, 2-[4(2-hydroxy-3-(2-ethylhexyl)-oxy)-2-hydroxyphenyl]-4,6-bis(2,4-dimethylphenyl)1,3,5-triazine, 2-(4-octyloxy-2-hydroxyphenyl)-4,6-bis(2,4-dimethylphenyl)-1,3,5-triazine; hydroxybenzophenone U.V. absorbers, such as, 2,4-dihydroxybenzophenone, 2-hydroxy-4-octyloxybenzophenone, and 2-hydroxy-4-dodecyloxybenzophenone.

Non-limiting examples of suitable hindered amine light stabilizers include N-(1,2,2,6,6-pentamethyl-4-piperidinyl)-2-dodecyl succinimide, N(1acetyl-2,2,6,6-tetramethyl-4-piperidinyl)-2-dodecyl succinimide, N-(2hydroxyethyl)-2,6,6,6-tetramethylpiperidine-4-ol-succinic acid copolymer, 1,3,5 triazine-2,4,6-triamine, N,N'''-[1,2-ethanediybis[[[4,6-bis[butyl(1,2,2,6,6-pentamethyl-4-piperidinyl)amino]-1,3,5-triazine-2-yl]imino]-3,1-propanediyl]]bis[N, N'''-dibutyl-N', N'''-bis(1,2,2,6,6-pentamethyl-4-piperidinyl)], poly-[[6-[1,1,3,3-tetramethylbutyl)-amino]-1,3,5-trianzine-2,4-diyl][2,2,6,6-tetramethylpiperidinyl)-imino]-1,6-hexane-diyl[(2,2,6,6-tetramethyl-4-piperidinyl)-imino]), bis(2,2,6,6-tetramethyl-4-piperidinyl)sebacate, bis(1,2,2,6,6-pentamethyl-4-piperidinyl)sebacate, bis(1-octyloxy-2,2,6,6-tetramethyl-4-piperidinyl)sebacate, bis(1,2,2,6,6-pentamethyl-4-piperidinyl)[3,5bis(1,1-dimethylethyl-4-hydroxy-phenyl)methyl]butyl propanedioate, 8-acetyl-3-dodecyl-7,7,9,9,-tetramethyl-1,3,8-triazaspiro(4,5)decane-2,4-dione, and dodecyl/tetradecyl-3-(2,2,4,4-tetramethyl-2l-oxo-7-oxa-3,20-diazal dispiro(5.1.11.2)henicosan-20-yl) propionate.

Non-limiting examples of suitable antioxidants include tetrakis[methylene(3,5-di-tert-butylhydroxy hydrocinnamate)]methane, octadecyl 3,5-di-tert-butyl-4-hydroxyhydrocinnamate, tris(2,4-di-tert-butylphenyl) phosphite, 1,3,5-tris(3,5-di-tert-butyl-4-hydroxybenzyl)-1,3,5-triazine-2,4,6 (1H,3H,5H)-trione and benzenepropanoic acid, 3,5-bis(1,1-dimethyl-ethyl)-4-hydroxy-C7-C9 branched alkyl esters. In certain embodiments, the antioxidant includes hydroperoxide decomposers, such as Sanko® HCA (9,10-dihydro-9-oxa-10-phosphenanthrene-10-oxide), triphenyl phosphate and other organo-phosphorous compounds, such as, Irgafos® TNPP from Ciba Specialty Chemicals, Irgafos® 168 from Ciba Specialty Chemicals, Ultranox® 626 from GE Specialty Chemicals, Mark PEP-6 from Asahi Denka, Mark HP-10 from Asahi Denka, Irgafos® P-EPQ from Ciba Specialty Chemicals, Ethanox 398 from Albemarle, Weston 618 from GE Specialty Chemicals, Irgafos® 12 from Ciba Specialty Chemicals, Irgafos® 38 from Ciba Specialty Chemicals, Ultranox® 641 from GE Specialty Chemicals, and Doverphos® S-9228 from Dover Chemicals.

The coating compositions may further include other additives known in the art for use in coating compositions. Non-limiting examples of such additives can include wetting agents, leveling and flow control agents, for example, Resiflow®S (polybutylacrylate), BYK® 320 and 325 (high molecular weight polyacrylates), BYK® 347 (polyether-modified siloxane) under respective trade names, leveling agents based on (meth)acrylic homopolymers; rheological control agents; thickeners, such as partially crosslinked polycarboxylic acid or polyurethanes; and antifoaming agents. The other additives can be used in conventional amounts familiar to those skilled in the art. In embodiments, the wetting agents, leveling agents, flow control agents, and surfactants of the coating composition can affect the surface tension of the coating composition and thus may have an impact on the suitability of the coating composition for printing. Certain wetting agents, leveling agents, flow control agents, and surfactants may be incorporated into the coating composition for increasing or decreasing the surface tension of the coating composition.

Depending upon the type of crosslinking agent, the coating composition of this invention can be formulated as one-pack (1K) or two-pack (2K) coating composition. One-pack coating compositions may be air-dry coatings or un-activated coatings. The term "air-dry coating" or "un-activated coating" refers to a coating that dries primarily by solvent evaporation and does not require crosslinking to form a coating film having desired properties. If polyisocyanates with free isocyanate groups are used as the crosslinking agent, the coating composition can be formulated as a two-pack coating composition in that the crosslinking agent is mixed with other components of the coating composition only shortly before coating application. If blocked polyisocyanates are, for example, used as the crosslinking agent, the coating compositions can be formulated as a one-pack (1K) coating composition.

"Two-pack coating composition" or "two component coating composition" means a thermoset coating composition comprising two components stored in separate containers. These containers are typically sealed to increase the shelf life of the components of the coating composition. The components are mixed prior to use to form a pot mix. The pot mix is applied as a layer of desired thickness on a substrate surface, such as an automobile body or body parts. After application, the layer is cured under ambient conditions or bake cured at elevated temperatures to form a coating on the substrate surface having desired coating properties, such as high gloss, smooth appearance, and durability.

The coating composition may have a solids content of from about 5 to about 90, alternatively from 5 to about 80, or alternatively about 15 to about 70, wt. %. The solids content may be determined in accordance with ASTM D2369-10. In certain embodiments, the higher solids content for the coating composition may be desired due to the coating composition not undergoing atomization utilizing conventional spray equipment.

The coating composition may include a primary or color giving pigment in an amount of from about 0.1 to about 30 weight % (wt. %), alternatively from about 0.5 wt. % to about 20 wt. %, or alternatively from about 1 wt. % to about 10 wt. %, based on a total weight of the coating composition.

The coating composition may include the binder in an amount of from about 5 to about 70 wt. %, alternatively from about 10 to about 50 wt. %, or alternatively from about 15 to about 25 wt. %, based on a total weight of the coating composition.

The coating composition may include a crosslinker in an amount of from about 1 to about 20 wt. %, alternatively from about 2 to about 10 wt. %, or alternatively from about 4 to about 6 wt. %, based on a total weight of the coating composition.

The coating composition may be substantially free of a dye. The term "substantially" as utilized herein means that the coating composition may include insignificant amounts of dye such that the color and/or properties of the coating composition are not impacted by the addition of the insignificant amount of the dye which still being considered substantially free of a dye. In embodiments, the coating composition being substantially free of a dye includes no greater than 5 wt. %, alternatively no greater than 1 wt. %, or alternatively no greater than 0.1 wt. %.

The system 50 may include a primer layer overlying the substrate 10, a basecoat layer overlying the primer layer, and a clearcoat layer overlying the basecoat layer. It is to be appreciated that the system 50 can include an additional layer or layers, such as any of the coating layers described above, with the additional layers disposed in any position between, above, or below the primer layer, the basecoat layer, and/or the clearcoat layer. In embodiments, the coating composition may be utilized to form the primer layer, the basecoat layer, the clearcoat layer, or combinations thereof. In certain embodiments, the coating composition is utilized to form the basecoat layer.

A process for coating a substrate 10 utilizing the coating composition is also provided herein. The process includes the step of applying a first coating composition, including the coating composition described above, over at least a portion of the substrate 10 to form a first wet coating layer. The process may further include the step of curing or drying the first wet coating layer at a temperature in a range of from about 18° C. (64° F.) to about 180° C. (356° F.) to form a first dry coating layer over the substrate 10. The first wet coating layer may be cured or dried for an amount of time from about 10 minutes to about 3 days. The process may further include the step of allowing the first wet coating layer to flash. The process may further include the step applying a second coating composition to the substrate 10 to form a multi-layer coating. In certain embodiments, the second coating composition may be applied over the first wet coating layer to form a second wet coating layer and curing the first and the second wet coating layers together to form the multi-layer coating, wherein the second coating composition is the same or different from the first coating composition. In other embodiments, the second coating composition is applied over the first dry coating layer to form a second wet coating layer and curing the second wet coating layer to form the multi-layer coating, wherein the second coating composition is the same or different from the first coating composition. In various embodiments, the first coating composition is a basecoat composition and the second coating composition is a clearcoat composition. In other embodiments, both the first coating composition and the second coating composition are basecoat compositions.

A method of applying a coating composition to the substrate 10 utilizing the high transfer efficiency applicator 12 including a nozzle is provided herein. The nozzle defines a nozzle orifice having a nozzle diameter of from 0.00002 m to 0.0004 m. The coating composition includes the carrier and the binder. The coating composition may have a viscosity of from about 0.002 Pa*s to about 0.2 Pa*s, a density of from about 838 kg/m$^3$ to about 1557 kg/m$^3$, a surface tension of from about 0.015 N/m to about 0.05 N/m, and a relaxation time of from about 0.0005 s to about 0.02 s. The method includes the step of providing the coating composition to the high transfer efficiency applicator 12. The method further includes the step of applying the coating composition to the substrate 10 through the nozzle orifice 72 to form the coating layer. It is to be appreciated that ranges for the nozzle diameter, viscosity, density, surface tension, and relaxation time may be defined by any of the ranges described herein.

A method of applying a coating composition to the substrate 10 utilizing the high transfer efficiency applicator 12 including a nozzle is provided herein. The nozzle defines a nozzle orifice having a nozzle diameter of from 0.00002 m to 0.0004 m. The coating composition includes the carrier and the binder. The coating composition may have an Ohnesorge number (Oh) of from about 0.01 to about 12.6, the coating composition may have a Reynolds number (Re) of from about 0.02 to about 6,200, and the coating composition may have a Deborah number (De) of from greater than 0 to about 1730, The method includes the step of providing the coating composition to the high transfer efficiency applicator 12. The method further includes the step of applying the coating composition to the substrate 10 through the nozzle orifice 72 to form the coating layer.

A method of applying a first coating composition and a second coating composition utilizing a first high transfer efficiency applicator 88 and a second high transfer efficiency applicator 90 is also provided herein. The first high transfer efficiency applicator 88 includes a first nozzle and the first nozzle defines a first nozzle orifice 92. The second high transfer efficiency applicator 90 includes a second nozzle and the second nozzle defines a second nozzle orifice 94. The method includes the step of providing a substrate 10 defining a first target area 80 and a second target area 82. The method further includes the step of applying the first coating composition through the first nozzle orifice 92 to first target area 80 of the substrate 10. The method further includes the step of applying the second coating composition through the second nozzle orifice 94 to second target area 82 of the substrate 10.

The first high transfer efficiency applicator 88 includes a plurality of the first nozzles with each of the first nozzles defining the first nozzle orifice 92. The second high transfer efficiency applicator 90 includes a plurality of the second nozzles with each of the second nozzles defining the second nozzle orifice 94. The step of applying the first coating composition is further defined as expelling the first coating composition through each of the first nozzle orifice 92s independent of one another. The step of applying the second coating composition is further defined as expelling the second coating composition through each of the second nozzle orifice 94s independent of one another.

The substrate 10 includes a first end and a second end with the first target area 80 of the substrate 10 and the second target area 82 of the substrate 10 disposed therebetween. The method further includes the step of moving the first high transfer efficiency applicator 88 and the second high transfer efficiency applicator 90 from the first end to the second end. The steps of expelling the first coating composition and the second coating composition through the first nozzle orifice 92 and the second nozzle orifice 94 are performed along a single pass from the first end to the second end.

A method of applying a coating composition utilizing a first high transfer efficiency applicator 88 and a second high transfer efficiency applicator 90. The first high transfer efficiency applicator 88 includes a first nozzle. The first nozzle defines a first nozzle orifice 92. The second high transfer efficiency applicator 90 includes a second nozzle. The second nozzle defines a second nozzle orifice 94. The method includes the step of providing a substrate 10 defining a first target area 80 and a second target area 82. The method includes the step of applying the coating composition through the first nozzle orifice 92 to first target area 80 of the substrate 10. The method includes the step of applying the coating composition through the second nozzle orifice 94 to second target area 82 of the substrate 10.

The first high transfer efficiency applicator 88 includes a plurality of the first nozzles with each of the first nozzles defining the first nozzle orifice 92. The second high transfer efficiency applicator 90 includes a plurality of the second nozzles with each of the second nozzles defining the second nozzle orifice 94. The step of applying the coating composition is further defined as expelling the coating composition through each of the first nozzle orifice 92s independent of one another. The step of applying the coating composition is further defined as expelling the coating composition through each of the second nozzle orifice 94s independent of one another.

The substrate 10 includes a first end and a second end with the first target area 80 of the substrate 10 and the second target area 82 of the substrate 10 disposed therebetween. The method further includes the step of moving the first high transfer efficiency applicator 88 and the second high transfer efficiency applicator 90 from the first end to the second end. The steps of expelling the coating composition through the first nozzle orifice 92 and the second nozzle orifice 94 are performed along a single pass from the first end to the second end.

Another system for applying the coating composition by the high transfer efficiency applicator 12 is also provided herein. The system may exhibit improved efficiency, reduced environmental impact, and reduced cost due to reduced waste. The system may include a reduced number of air handlers due to the elimination of overspray and atomization by low transfer efficiency application methods. The system may exhibit a reduction or elimination of waste treatment due to the elimination of overspray and atomization by low transfer efficiency application methods. The system may exhibit a reduction or elimination of masking and demasking of the substrate 10 due to the ability of the high transfer efficiency applicator 12 to directly apply droplets 74 of the coating composition to the substrate 10. The system may exhibit a reduction or elimination of clean-up and maintenance of environmental systems or booth surfaces due to the elimination of overspray and atomization by low transfer efficiency application methods. The system may exhibit a reduction or elimination of baking processes by utilizing UV/EB/laser excitable coatings with the high transfer efficiency applicator 12 and an appropriate energy source.

Another system for applying a coating composition to a substrate 10 utilizing a high transfer efficiency applicator is provided herein. The system includes a high transfer efficiency applicator including a nozzle. The nozzle defines a nozzle orifice having a nozzle diameter in an amount of from about 0.00002 m to about 0.0004 m. The system further includes a reservoir in fluid communication with the high transfer efficiency applicator and configured to contain the coating composition. The high transfer efficiency applicator is configured to receive the coating composition from the reservoir and configured to expel the coating composition through the nozzle orifice 72 to the substrate 10 to form a coating layer. At least 80% of the droplets of the coating composition expelled from the high transfer efficiency applicator contact the substrate 10.

In certain embodiments, the substrate 10 is disposed within an environment including an overspray capture device 102. An air flow may move through the environment and to the overspray capture device 102. No more than 20 wt. % of the coating composition expelled from the high transfer efficiency applicator may contact the overspray capture device 102, based on a total weight of the coating composition. In other embodiments, no more than 15 wt. %, alternatively no more than 10 wt. %, alternatively no more than 5 wt. %, alternatively no more than 3 wt. %, alternatively no more than 2 wt. %, or alternatively no more than 0.1 wt. %, of the coating composition expelled from the high transfer efficiency applicator may contact the overspray capture device 102, based on a total weight of the coating composition. The overspray capture device 102 may include a filter, a scrubber, or combinations thereof.

Additional considerations may include, but are not limited to:

Multipass printing is preferred. strictly one pass will result in a visible defect. While one might consider multipass to be an inherently slower printing process, one could think about a pseudo-multipass process using 2 or more staggered printheads printed in a single pass manner. Such a process (as well as true multipass) could offer the latitude of increasing the film build by depositing more paint or, alternatively, jetting smaller droplets which may have other advantages.

Printing on vertical surfaces. Because of the low viscosity requirements for jetting, the usual approach for enabling printing on vertical surfaces of imparting shear thinning to coating formulation may not be possible. Alternative approaches that could be considered include:

A. Two printhead jetting: in addition to a high transfer efficiency applicator to deposit paint onto substrate 10, a second high transfer efficiency applicator is used to deposit an "activator" of some sorts. This activator when contacting/mixing with the paint on substrate 10 will cause the paint to thicken thereby inhibiting sagging/slumping. Examples of such activators might be to induce a pH or solvency change.

B. Temperature change: paint in the high transfer efficiency applicator is at an elevated temperature, but after jetting, temperature is reduced due to both ambient conditions as well as solvent evaporation prior to deposition on substrate 10.

In other embodiments, an electronic imaging device may be utilized to generate a target image data of a target coating to be applied to the substrate utilizing the high transfer efficiency applicator. The target image data may relate to color, brightness, hue, chroma, or other appearance features. A color matching protocol may be utilized to analyze the target image data pixel by pixel to generate application instructions. In certain embodiments, a mathematical model can be utilized to determine values of the target image data based on the pixels within an image to generate target image values. The resulting one or more target image values may be compared to a sample database that has produced similar sample image values based on sample coatings, where the sample coatings are prepared and analyzed to provide a sample coating formula that provides a specific appearance.

A system for applying a coating composition to a substrate utilizing a high transfer efficiency applicator is provide herein. The system includes a storage device for storing instructions for performing a matching protocol. The system further includes one or more data processors configured to execute the instructions to: receive, by one or more data processors, target image data of a target coating, the target image data generated by an electronic imaging device; and apply the target image data to a matching protocol to generate application instructions.

The system further includes a high transfer efficiency applicator including a nozzle and the nozzle defines a nozzle orifice having a nozzle diameter of from about 0.00002 m to about 0.0004 m. The system further includes a reservoir in fluid communication with the high transfer efficiency applicator and configured to contain the coating composition. The high transfer efficiency applicator is configured to receive the coating composition from the reservoir and configured to expel the coating composition through the nozzle orifice 72 to the substrate to form a coating layer. The high transfer efficiency applicator is configured expel the coating composition based on the application instructions.

EXAMPLES

Examples 1-5 below describe the preparation of various coating compositions of this disclosure.

| Component | Ex. 1 | Ex. 2 | Ex. 3 | Ex. 4 | Ex. 5 |
|---|---|---|---|---|---|
| Layered silicate rheology control agent | 0.01 | — | 0.01 | 0.01 | 0.01 |
| Alkali swellable emulsion thickening agent | 0.14 | — | 0.14 | 0.14 | 0.14 |
| Polyester-Polyurethane Dispersion I | 6.0 | 6.0 | 6.0 | 6.0 | 6.0 |
| Styrene-acrylic latex dispersion | 4.3 | 4.3 | 4.3 | 4.3 | 4.3 |
| Polyester-Polyurethane Dispersion II | 3.5 | 3.5 | — | 3.5 | 3.5 |
| Polyester-Polyurethane Dispersion III | — | — | 3.5 | — | — |
| Melamine-formaldehyde resin | 2.5 | 2.5 | 2.5 | 2.5 | 2.5 |
| Dispersion of micronized talc extender pigment | 1.2 | 1.2 | 1.2 | — | — |
| Dispersion of micronized barium sulfate extender pigment | — | — | — | 1.2 | 2.4 |
| Dispersion of amorphous carbon black pigment | 0.9 | 0.9 | 0.9 | 0.9 | 0.9 |
| Dispersion of indanthrone blue 60 pigment | 0.1 | 0.1 | 0.1 | 0.1 | 0.1 |
| Solution of 1.2 chrome complex black dye | 0.29 | 0.29 | 0.29 | 0.29 | 0.29 |
| Properties | | | | | |
| Viscosity (mPa s) (250 1/s) | 120 | 10 | 133 | 146 | 146 |
| pH | 8.9 | 8.9 | 8.8 | 9.0 | 8.9 |
| Solids Content (wt. %) | 20.3 | — | 21.0 | 21.2 | 22.2 |

Layered silicate rheology control agent is provided in a solution of water and polypropylene glycol which is similar to a solution commercially available from Altana under the trade name Laponite RD.

Alkali swellable emulsion thickening agent is provided as solution in 10% water which is similar to a solution commercially available from BASF under the trade name Rheovis AS1130.

Polyester-Polyurethane Dispersion I is a polyester-polyurethane polymer having the tradename Bayhydrol® U 241 which is commercially available from Covestro AG of Leverkusen, Germany.

Styrene-acrylic latex dispersion is formed by a two-step emulsion polymerization process.

Polyester-Polyurethane Dispersion II is a polyurethane dispersion resin formed from a linear polyester diol resin (reaction product of monomers 1,6-hexanediol, adipic acid, and isophthalic acid) and isophorone diisocyanate. This polyester-polyurethane polymer has a weight average molecular weight of about 30,000, a solids content of about 35 wt. %, and a particle size of about 250 nanometers.

Polyester-Polyurethane Dispersion III is a polyurethane dispersion resin formed from a linear polycarbonate-polyester and isophorone diisocyanate. This polyester-polyurethane polymer has a weight average molecular weight of about 75,000, a solids content of about 35 wt. %, and a particle size of about 180 nanometers.

Melamine-formaldehyde resin is similar to a hexa (methoxymethyl)melamine (HMMM) commercially available from Allnex under the trade name Cymel 303.

Dispersion of micronized talc extender pigment is similar to an extender pigment commercially available from Imerys under the trade name Mistron Monomix.

Dispersion of micronized barium sulfate extender pigment is similar to an extender pigment commercially available from Huntsman under the trade name Blanc Fixe F.

Dispersion of amorphous carbon black pigment is similar to a carbon black pigment commercially available from Birla Carbon under the trade name Raven 5000 Ultra II.

Dispersion of indanthrone blue 60 pigment is similar to an extender pigment commercially available from Heucotech under the trade name Monolite Blue 3RX H.

Solution of 1,2 chrome complex black dye is similar to an extender pigment commercially available from BASF under the trade name Orasol Black X55.

Figure 20:
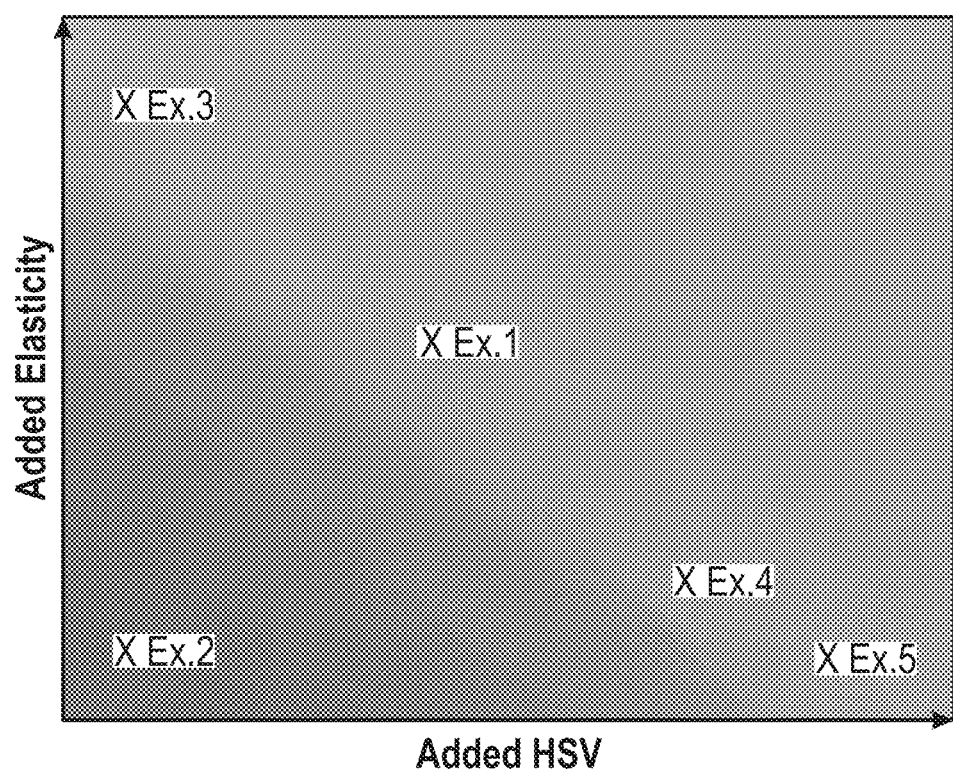
FIG. 20 is a graphical representation of properties of various coating compositions.

With reference to FIG. 20, each of the exemplary coating compositions exhibits a difference in elasticity and shear viscosity based on the components of the exemplary coating compositions.

Examples 6-10 below describe the preparation of various coating compositions of this disclosure. A conventional black monocoat with 11 to 75 weight percent reduction with butyl acetate was evaluated which is compositionally similar to a black monocoat commercially available from Axalta Coating Systems under the tradename ChromaDyne™. The examples have the following properties.

| Component | Ex. 6 | Ex. 7 | Ex. 8 | Ex. 9 | Ex. 10 |
|---|---|---|---|---|---|
| Conventional black monocoat | 100 | 100 | 100 | 100 | 100 |
| Butyl acetate | 11 | 20 | 45 | 75 | 45 |
| Cellulose Acetate Butyrate | — | — | — | — | 0.01 |
| Properties | | | | | |
| Viscosity at 1000 sec1 (mPa.s) | 49.7 | 31.1 | 11.8 | 5.4 | 12.1 |
| Surface tension (mN/m) | 27.5 | 26.8 | 26.7 | 26.5 | 27.2 |

Conventional black monocoat is similar to a black monocoat commercially available from Axalta Coating Systems under the tradename ChromaDyne™

Cellulose Acetate Butyrate is commercially available from Eastman Chemical Company under the trade name CAB 381-20. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A system for applying a first coating composition and a second coating composition, the system comprising:
   an atomizing applicator;
   a high transfer efficiency applicator comprising an array of nozzles wherein each nozzle defines a nozzle orifice having a diameter of from 0.00002 m to 0.0004 m;
   a first reservoir in fluid communication with the atomizing applicator and configured to contain the first coating composition;
   a second reservoir in fluid communication with the high transfer efficiency applicator and configured to contain the second coating composition;
   a substrate assembly comprising a metal-containing substrate and a plastic-containing substrate, the metal-containing substrate coupled to the plastic-containing substrate;
   wherein the atomizing applicator is configured to receive the first coating composition from the first reservoir and configured to apply the first coating composition to the metal-containing substrate; and
   wherein the high transfer efficiency applicator is configured to receive the second coating composition from the second reservoir and configured to apply the second coating composition to the plastic-containing substrate through the nozzle orifice without atomization such that at least 99.9% of the applied second coating composition contacts the plastic-containing substrate,
   wherein the second coating composition has a solids content of from about 5 to about 70 weight % based on a total weight of the second coating composition as measured in accordance with ASTM D2369 and comprises: a carrier; a binder present in an amount of from 5 to about 70 weight percent based on a total weight of the second coating composition; and a crosslinker present in an amount of from about 0.1 to about 25 weight percent based on a total weight of the second coating composition,
   wherein the second coating composition has a viscosity of from about 0.0002 Pa*s to about 0.2 Pa*s as measured according to ASTM 7867-13 with cone-plate or parallel at a shear rate of 1000 sec-1;
   wherein the second coating composition has an Ohnesorge number (Oh) of from about 0.01 to about 12.6;
   wherein the second coating composition has a Reynolds number (Re) of from about 0.02 to about 6.200;
   wherein the second coating composition has a Deborah number (De) of from greater than 0 to 1730;
   wherein the second coating composition has a density of from about 838 kg/m$^3$ to about 1557 kg/m$^3$;
   wherein the second coating composition has a surface tension of from about 0.015 N/m to about 0.05 N/m; and
   wherein the second coating composition has a relaxation time of from about 0.00001 to about 1 s.

2. The system of claim 1, wherein the atomizing applicator is configured to generate a mist of atomized droplets of the first coating composition.

3. The system of claim 2, wherein the atomizing applicator comprises a Bell spray applicator.

4. The system of claim 1, wherein the second coating composition is expelled from the high transfer efficiency applicator as a droplet having a particle size of at least 10 microns.

5. The system of claim 1, wherein the at least 80% of the droplets of the second coating composition expelled from the high transfer efficiency applicator to the plastic-containing substrate remain as a single droplet after contact with the plastic-containing substrate.

6. The system of claim 1, wherein the Ohnesorge number (Oh) is from 0.01 to 12.6 and is defined based upon the following equations V and VI, in view of the Reynolds number (Re), $$Oh \text{ is no greater than } 10^{\wedge}(-0.5006*\log(Re)+1.2135) \quad \text{(V), and}$$

$$Oh \text{ is at least } 0^{\wedge}(-0.5435*\log(Re)-1.0324) \quad \text{(VI),}$$

wherein the Reynolds number (Re) is from 0.02 to 6,200.

7. The system of claim 1, wherein the second coating composition has an Ohnesorge number (Oh) of from about 0.05 to about 1.8, wherein the second coating composition has a Reynolds number (Re) of from about 0.3 to about 660, and wherein the coating composition has a Deborah number (De) of from greater than 0 to about 46.

8. The system of claim 1, wherein the Ohnesorge number (Oh) is from 0.05 to 1.8 and is defined based upon the following equations VII and VIII, in view of the Reynolds number (Re), $$\text{Oh is no greater than } 10^{\wedge}(-0.5067*\log(Re)+0.706) \quad \text{(VII), and}$$

$$\text{Oh is at least } 10^{\wedge}(-0.5724*\log(Re)-0.4876) \quad \text{(VIII),}$$

wherein the Reynolds number (Re) is from 0.3 to 660.

9. The system of claim 1, wherein the second coating composition has a solids content of from 15 to about 70 weight %, based on a total weight of the second coating composition, in accordance with ASTM D2369.

10. The system of claim 1, wherein the second coating composition further comprises a primary pigment in an amount of from about 0.1 to about 20 weight % based on a total weight of the second coating composition.

11. The system of claim 1, wherein the second coating composition comprises the binder in an amount of from about 15 to about 70 weight % based on a total weight of the second coating composition.

12. A coating layer formed from the second coating composition of claim 1.

13. The coating layer of claim 12 having
a solvent resistance of at least 5 double MEK rubs on a nonporous substrate in accordance with ASTM D4752;
a film tensile modulus of at least 100 MPa in accordance with ASTM 5026-15; and
a crosslink density of at least 0.5 mmol/cm$^3$ in accordance with ASTM D5026-15.

14. The coating layer of claim 12 having a gloss value of at least 75 at a 20 degree specular angle in accordance with ASTM 2813.

15. The coating layer of claim 12 having a gloss retention of at least 70% of the initial gloss value after 2000 hours of weathering exposure in accordance with ASTM D7869.

16. The coating layer of claim 12 having a thickness of at least 5 microns in accordance with ASTM D7091-13.

17. A method of applying a first coating composition and a second coating composition utilizing an atomizing applicator and a high transfer efficiency applicator, the high transfer efficiency applicator comprising an array of nozzles wherein each nozzle defines a nozzle having a diameter of from 0.00002 m to 0.00004, the method comprises:
providing a substrate assembly comprising a metal-containing substrate and a plastic-containing substrate, the metal-containing substrate coupled to the plastic-containing substrate;
applying the first coating composition utilizing the atomizing applicator to the metal-containing substrate; and
applying the second coating composition to the plastic-containing substrate through the nozzle orifice without atomization such that at least 99.9% of the applies second coating composition contacts the plastic-containing substrate,
wherein the second coating composition has a solids content of from about 5 to about 70 weight % based on a total weight of the second coating composition as measured in accordance with ASTMB D2369 and comprises: a carrier, a binder present in an amount of 5 to about 70 weight percent based on a total weight of the second coating composition; and a crosslinker present in an amount of from about 0.1 to about 25 weight percent based on a total weight of the second coating composition,
wherein the second coating composition has a viscosity of from about 0.002 Pa*s to about 0.2 Pa*s measured according to ASTM 7867-13 with cone-plate or parallel plates at a shear rate of 1000 sec-1;
wherein the second coating composition has an Ohnesorge number (Oh) of from about 0.01 to about 12.6;
wherein the second coating composition has a Reynolds number (Re) of from about 0.02 to about 6.200:
wherein the second coating composition has a Deborah number (De) of from greater than 0 to 1730;
wherein the second coating composition has a density of from about 838 kg/m$^3$ to about 1557 kg/m$^3$;
wherein the second coating composition has a surface tension of from about 0.015 N/m to about 0.05 N/m; and
wherein the second coating composition has a relaxation time of from about 0.00001 to about 1 s.

* * * * *